(12) United States Patent
Eaton et al.

(10) Patent No.: US 6,983,370 B2
(45) Date of Patent: Jan. 3, 2006

(54) SYSTEM FOR PROVIDING CONTINUITY BETWEEN MESSAGING CLIENTS AND METHOD THEREFOR

(75) Inventors: Eric Thomas Eaton, Lake Worth, FL (US); David Jeffery Hayes, Lake Worth, FL (US); Von Alan Mock, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 875 days.

(21) Appl. No.: 09/995,338

(22) Filed: Nov. 27, 2001

(65) Prior Publication Data

US 2003/0101343 A1 May 29, 2003

(51) Int. Cl.
*G06F 1/26* (2006.01)
(52) U.S. Cl. .................. 713/182; 713/153; 713/161; 713/189; 713/193; 713/200; 713/201
(58) Field of Classification Search ............... 713/182, 713/153, 161, 189, 193, 200, 201
See application file for complete search history.

(56) References Cited

U.S. PATENT DOCUMENTS

| | | | |
|---|---|---|---|
| 4,811,377 A | | 3/1989 | Krolopp et al. |
| 5,535,436 A | | 7/1996 | Yoshida et al. |
| 6,038,296 A | | 3/2000 | Brunson et al. |
| 6,041,229 A | | 3/2000 | Turner |
| 6,101,531 A | * | 8/2000 | Eggleston et al. .......... 709/206 |
| 6,189,098 B1 | * | 2/2001 | Kaliski, Jr. ................ 713/168 |

* cited by examiner

*Primary Examiner*—Thomas R. Peeso
(74) *Attorney, Agent, or Firm*—Randi L. Karpinia; Sylvia Chen

(57) ABSTRACT

A messaging communication system (10) includes a plurality of messaging clients (12). A first messaging client (14) establishes a first communication connection (16) operating using a plurality of client data (25). The first messaging client (14) transfers the plurality of client data (25) to a second messaging client (20). The second messaging client (20) establishes a second communication connection (22) operating using the plurality of client data (25).

67 Claims, 24 Drawing Sheets

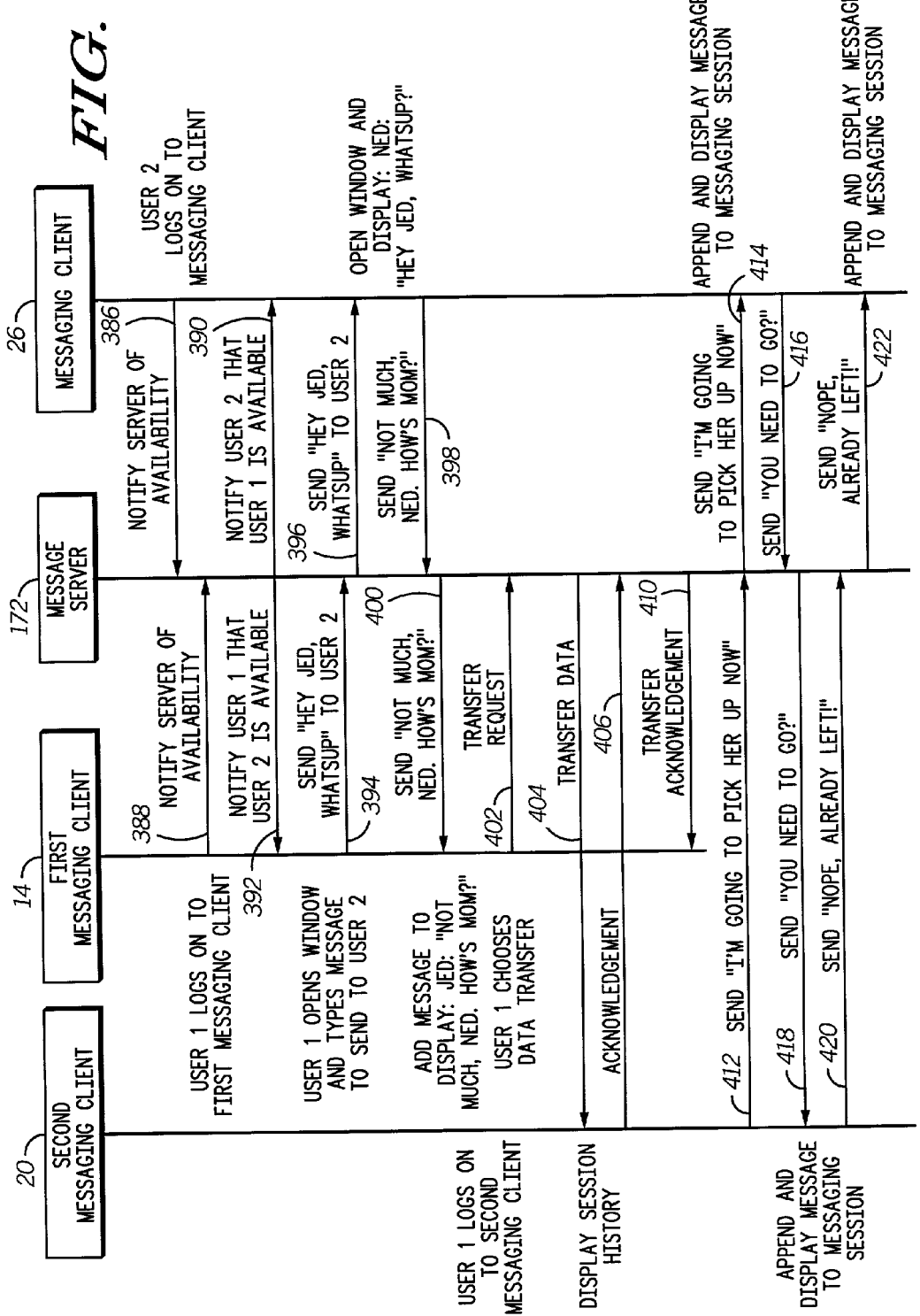

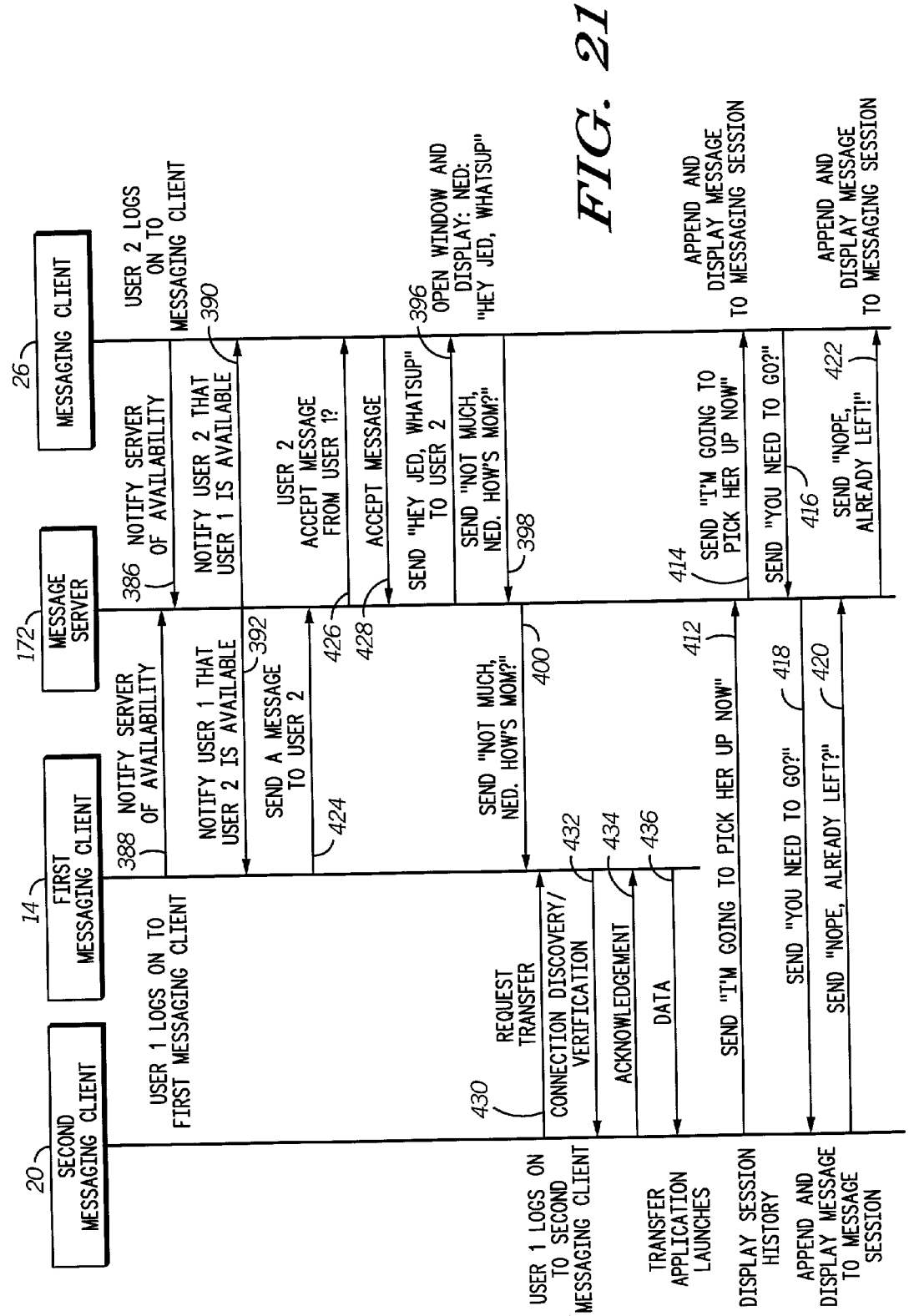

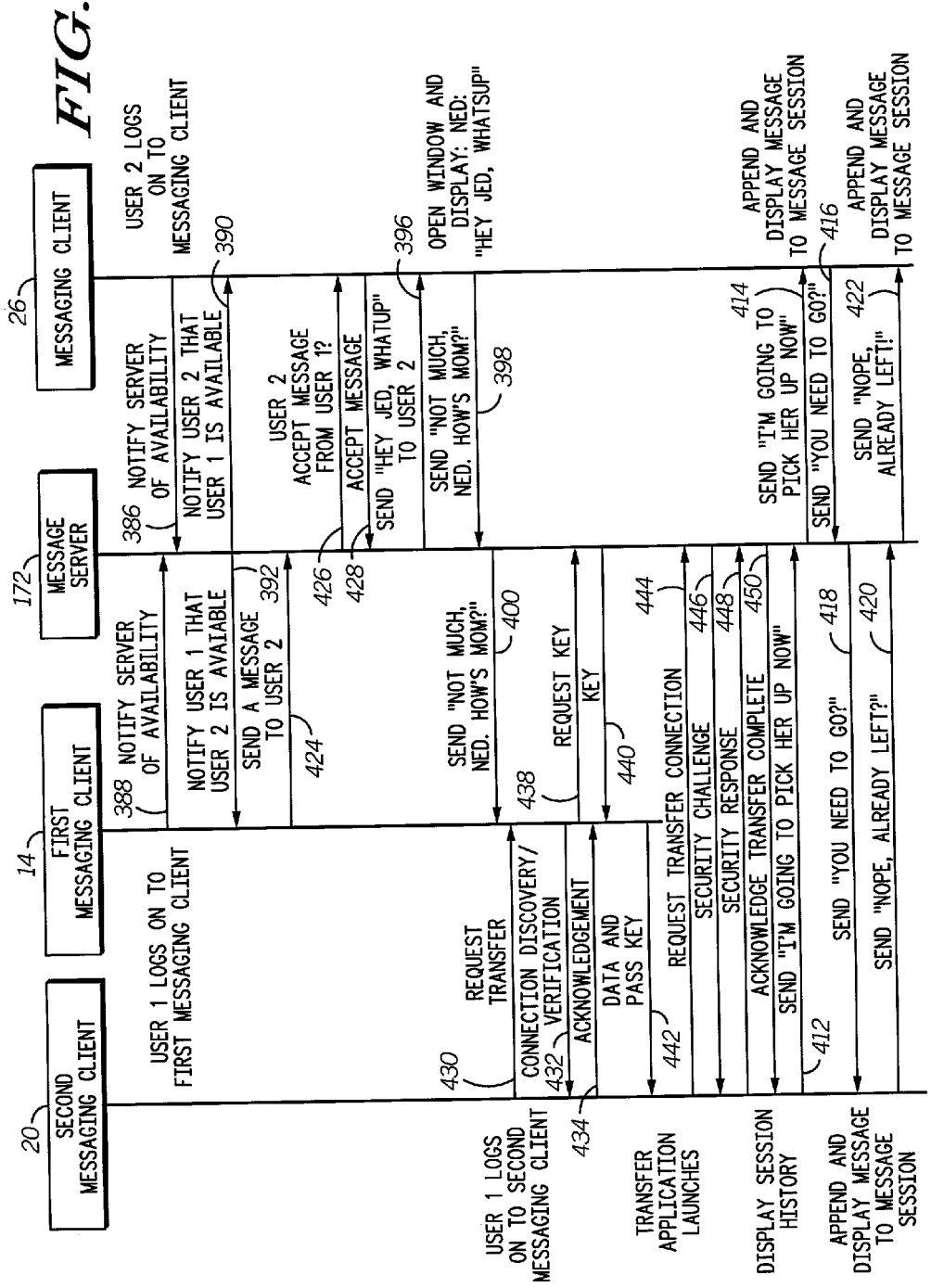

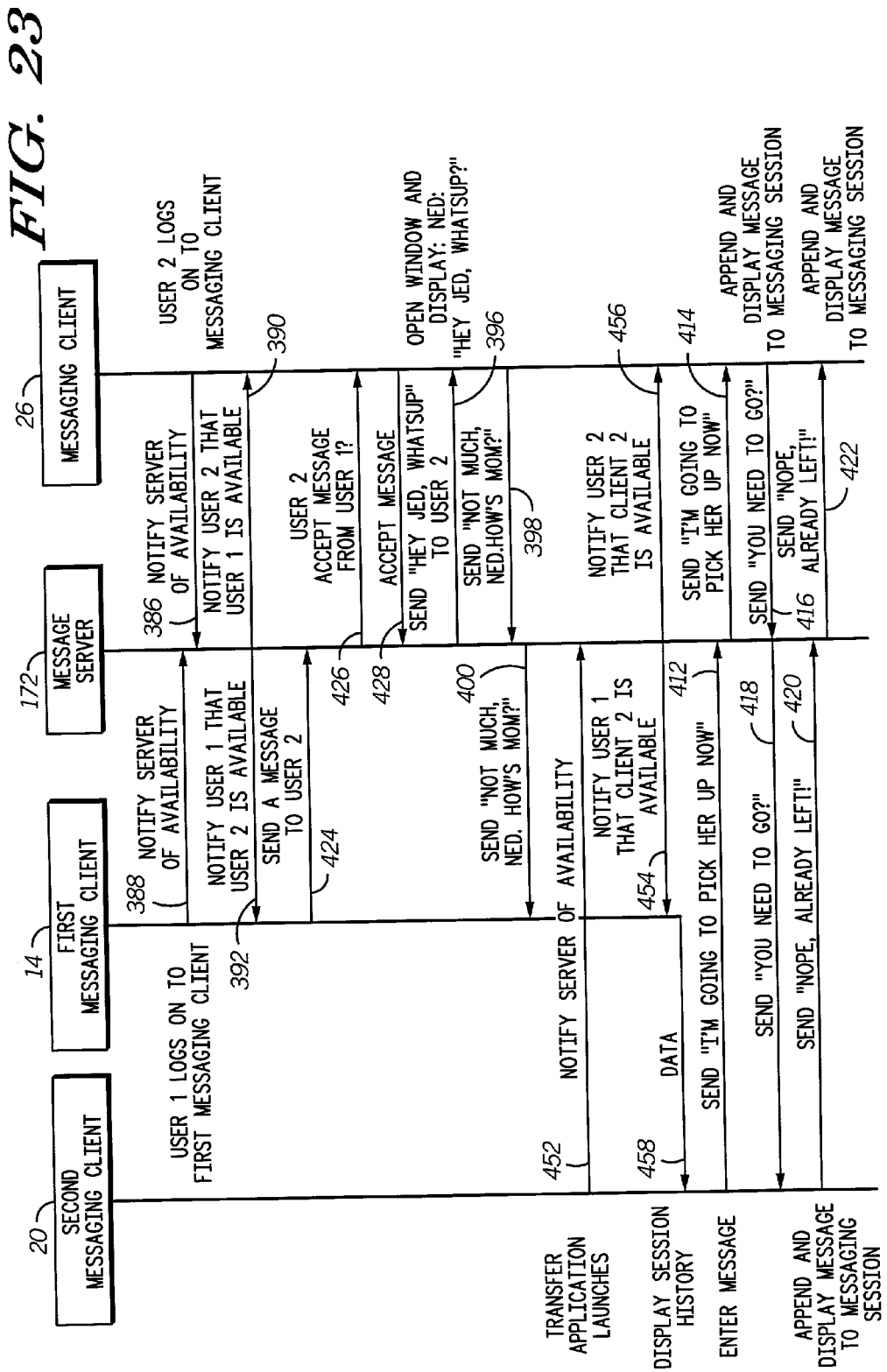

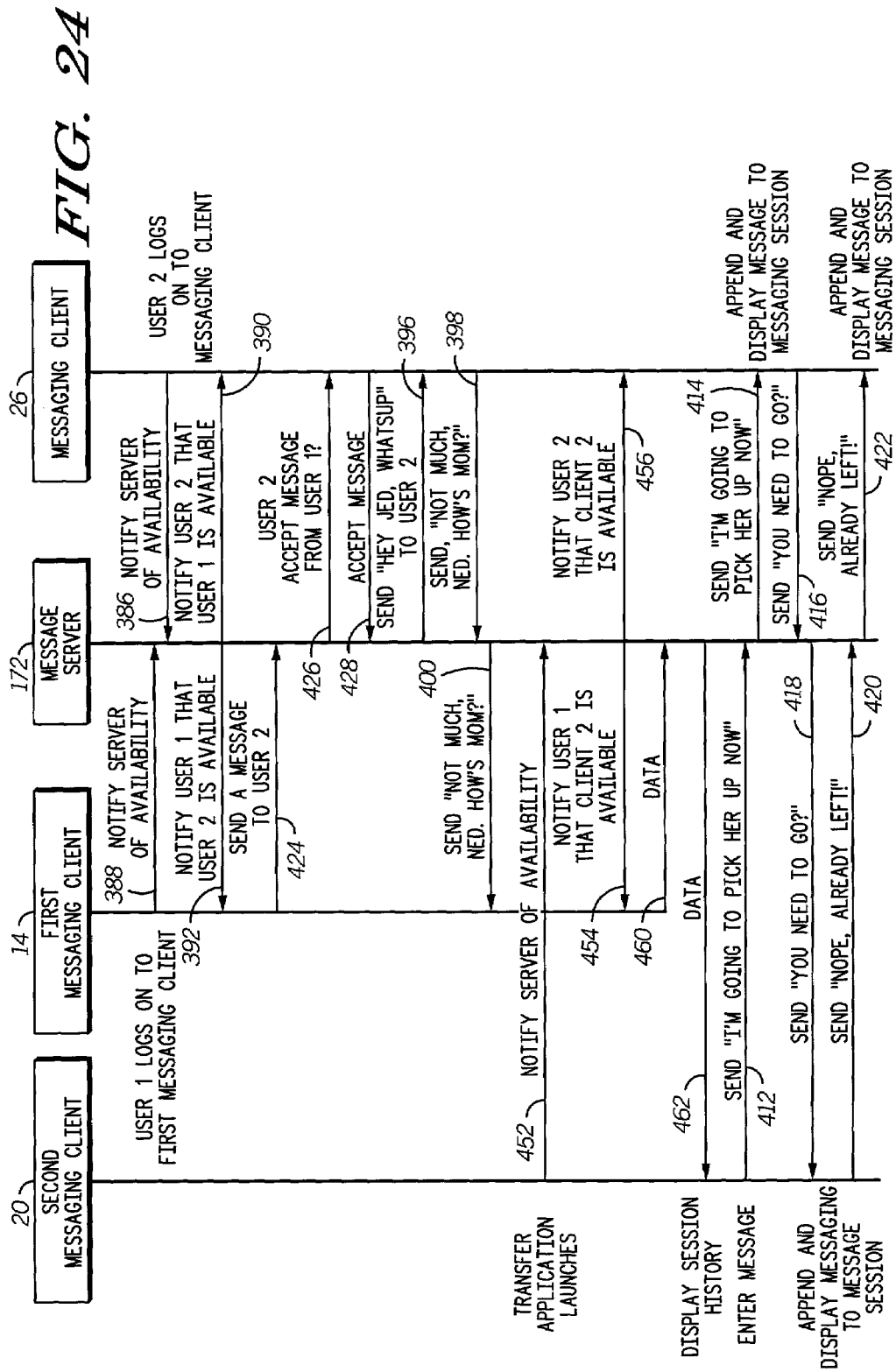

SYSTEM FOR PROVIDING CONTINUITY BETWEEN MESSAGING CLIENTS AND METHOD THEREFOR

BACKGROUND OF THE INVENTION

1. Field of the Invention

This invention relates in general to communication systems and in particular to communication systems incorporating capabilities to provide continuity between messaging clients.

2. Description of the Related Art

With the proliferation of the Internet, the way people communicate is changing. Electronic communication such as electronic mail (email), and real time electronic messaging (e.g. instant messaging and chat messaging) is quickly replacing traditional telephonic communication and handwritten letters. Real time electronic messaging allows the simultaneous access to a message or a plurality of messages by multiple account users, with each account user capable of inputting a message or a plurality of messages to a messaging session. Each inputted message is relayed to messaging clients operating on messaging devices (such as computers) of the other account users who have chosen to participate in that messaging session. The other session participants can respond with their own messages, which are likewise relayed to all the participating devices. These messages are typically text messages that are delivered to the intended recipient(s) of the message in a real time manner. However, these messages may be in a variety of different media formats or combinations thereof such as audio, animation, video, images, etc. A session history of the messages received and transmitted by all participants involved in the messaging session is typically maintained on the individual participants' devices and typically presented on the screen of the respective device in the form of a scrolling dialog. This text history constitutes one of the attributes of the look and feel of the real time electronic messaging experience.

There are currently several standard methods available for account users to participate in messaging communications. For example, personal instant messaging typically occurs between two individuals. An individual can establish a private chat room so that multiple users can participate in a common on-line conversation. Participants gain access to the private chat room by accepting an invitation from the creator of the private chat room. Non-restricted public chat rooms are available to anyone interested in the topic being discussed by simply selecting the desired chat room descriptor on the account user's device. In addition to the non-restricted public chat rooms there are limited access public chat rooms. An example of one such restriction is the limiting of the number of account users allowed to participate in the chat room. Electronic gaming is available to participants who register and login to join at least one other participant in playing one or more games. Communication of participants' "moves" are made through electronic message communications in messaging sessions.

Each messaging session can have various types of session attributes such as session type, session connection info, participants, filter settings, colors, relative font sizes, etc. The account user can also have various types of preferences such as colors, relative font sizes, buddy lists, nicknames, and parental control settings. These are only a few examples of the attributes and preferences that can effect a messaging session.

Several different devices, such as personal computers, interactive broadcast receivers and mobile communication devices, can be utilized to participate in messaging communications. Although these different devices can be utilized to participate in a messaging communication they all do not have the same set of features and capabilities. For example, display size, support for different media types, and cost of sending messages can all be different for different devices. Some messaging service providers maintain the same user preference settings such as screen names, buddy list groups, electronic mailboxes, and parental control settings regardless of which device is used to access the service. By having this capability the service providers are providing continuity of user preferences from device to device, which simplifies the use of multiple devices in the messaging system.

In order to utilize real time electronic messaging, a device is pre-configured with, or the user installs, application client software distributed by a particular service provider. The client software connects to a message server for communication. To access the message server, via a logon procedure, the client sends the routing information (e.g. IP address and number of the port assigned to the client, mobile phone number) of the device being used, the account user's username, the account user's password, and the account user's current availability setting to the message server. The message server temporarily stores the routing and availability information for the account user's device. In response to the account user's login information (username and password), the message server provides the messaging client with the account user's contact list. The message server then determines the presence and availability of the account users in that contact list. If the message server finds any of the contacts logged in (i.e. presence setting is online), it sends a message back to the messaging client on the account user's device with the presence and availability information for that account user. The message server also sends the account user's presence and availability information to the people that have the account user in their contact list. The account user can click on the name of a person in his/her contact list who is online, and a window is created in which the account user can enter a message. The account user enters a message and clicks "send" to communicate with that person. The other person gets the message and can respond. Messages between account users may be addressed directly to the account user's device or may be addressed to the username and sent via the message server.

The window that the session participants see on their respective messaging devices typically includes a scrolling dialog of the session history. Each participant's messages appear in this window on all participating devices. Messages can have different attributes such as message formatting, sender identification, timestamps and others. For example, messages related to a particular electronic game could contain graphics enhancing the "look and feel" of the electronic game for the participants.

When the messaging session is complete, the account users close the message window for that messaging session. When the account user signs off, his/her messaging client sends a message to the message server to terminate the account user's participation in the plurality of messaging sessions. The message server then sends an update of the account user's presence and availability information to the people that have the account user in their contact list to indicate the account user has signed off. Finally, the message server discards the routing and availability information for the account user's device.

Some messaging services support access of a single account from multiple devices. Further, some messaging services also support simultaneous login of devices on the same account. Still further, some messaging services utilize a resource extension to describe the device that is being utilized to communicate. For example an account user logging in with a mobile device can choose to use "mobile device" as their resource extension while logging into the same account from the home personal computer may utilize a resource extension of "home computer".

When using messaging services that allow access from multiple devices, an account user can log on with a first messaging device and engage in conversations with other account users and later log on with a second messaging device. For example, users of mobile devices would typically benefit if a messaging session in progress on a fixed network device could be continued on a mobile device. This would allow the account user to continue the messaging session when the account user is no longer in proximity to the fixed network device. In addition the account user would benefit if a messaging session that was in progress on a mobile device could be continued on a fixed network device that may have a superior user interface.

In order to switch to a different device with existing technology, the account user may have to cause the currently connected device to disconnect from the message server. The account user would then have to cause the second device to connect to the message server and login. Finally, the account user would have to re-initiate each messaging session (one-to-one, public chat, private chat, electronic game) that was in progress on the first device. The disadvantage of this method is the numerous manual operations required of the account user to change devices. A further disadvantage is the lack of messaging session continuity. For example, the second device will not have the session history that was available on the first device, and the second device may not be able to re-connect to chat rooms that restrict the number of active account users since another account user may have connected to the chat room after the account user's first device disconnected.

What is needed is a system and method for maintaining continuity between messaging clients.

BRIEF DESCRIPTION OF THE DRAWINGS

The present invention will be described by way of exemplary embodiments, but not limitations, illustrated in the accompanying drawings in which like references denote similar elements, and in which:

FIGS. 20 to 24 are signaling flow diagrams illustrating the interaction between the elements of the messaging communication system of FIGS. 1 and 8, in accordance with the preferred embodiment of the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
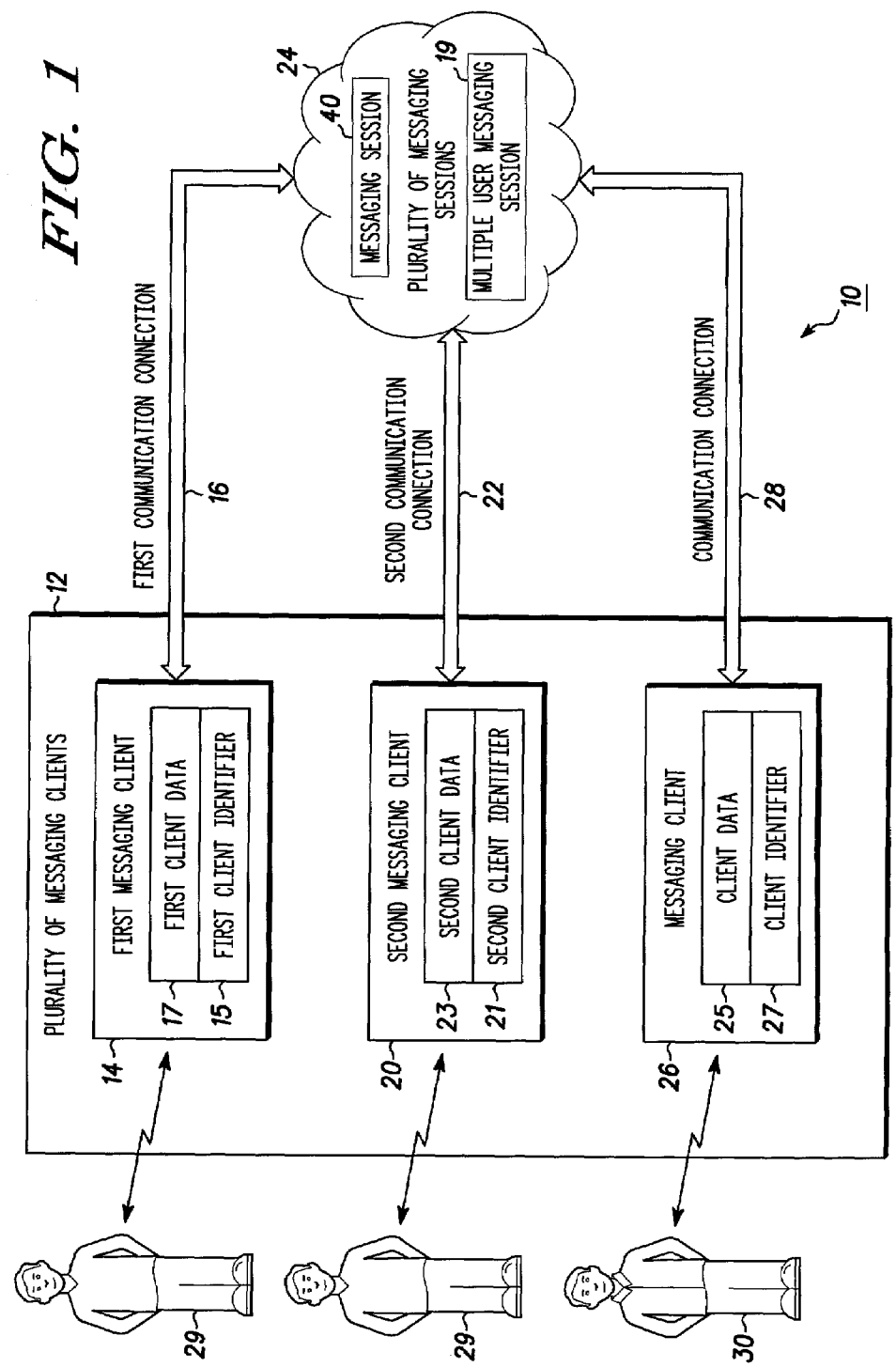
FIG. 1 is an electronic block diagram of a messaging communication system, in accordance with the preferred embodiment of the present invention.

Referring to FIG. 1, an electronic block diagram of a messaging communication system 10 in accordance with the present invention is shown. As illustrated, the messaging communication system 10 preferably includes a plurality of messaging clients 12 for participation within a plurality of messaging sessions 24. As illustrated, the plurality of messaging sessions 24 can include a messaging session 40 and/or a multiple user messaging session 19. The plurality of messaging sessions 24, for example, can include the communication of a plurality of electronic messages such as chat sessions, instant message sessions, and electronic mail, facilitating substantially real time communication among the plurality of messaging clients 12. Similarly, the plurality of messaging sessions 24 can include communication of gaming messages for one or more gaming sessions (e.g. battleship, checkers, chess, tic tac toe and doom). It will be appreciated by one of ordinary skill in the art that the plurality of messaging sessions 24 can include any of the messaging sessions mentioned herein or an equivalent. Each of the plurality of messaging clients 12 such as a first messaging client 14 and a second messaging client 20 includes client software to interface within the messaging communication system 10. The client software, for example, can include a software application for communication through an Internet service provider. Further, the client software can include a software application for participation in one or more electronic games offered by a gaming software provider. It will be appreciated by one of ordinary skill in the art that the client software can be any of those mentioned herein or an equivalent. Further, it will be appreciated by one of ordinary skill in the art that in accordance with the present invention, the interface capabilities of the client software can also be designed into client hardware of a messaging client. Each messaging client 26 of the plurality of messaging clients 12 further includes a client identifier 27. For example, the first messaging client 14 includes a first client identifier 15 and the second messaging client 20 includes a second client identifier 21. The client identifier 27 of the messaging client 26 is a unique identification within the messaging communication system 10 for directing messages to a particular messaging client. For example, the client identifier 27 can be an address of a mobile device or an IP address and number of the port of a fixed network device. To communicate within at least one of the plurality of messaging sessions 24 the messaging client 26 establishes a communication connection 28. For example, the first messaging client 14 establishes a first communication connection 16 for communication within at least one of the plurality of messaging sessions 24. Similarly, the second messaging client 20 establishes a second communication connection 22 for communication within at least one of the plurality of messaging sessions 24. It will be appreciated by one of ordinary skill in the art that the communication connection 28, the first communication connection 16, and the second communication connection 22 can be a physical connection, or alternatively can be a logical connection where the act of connecting and disconnecting is a logical one. Each messaging client 26 of the plurality of messaging clients 12 is operated by at least one account user 30. The account user 30 is an individual who uses one or more messaging clients to communicate with other account users within the plurality of messaging sessions 24. It will be appreciated by one of ordinary skill in the art that the account user 30 can communicate using one or more messaging clients. For example, a first account user 29 can establish communication within the plurality of messaging sessions 24 using the first messaging client 14, and, in accordance with the present invention, also using the second messaging client 20.

Figure 2:
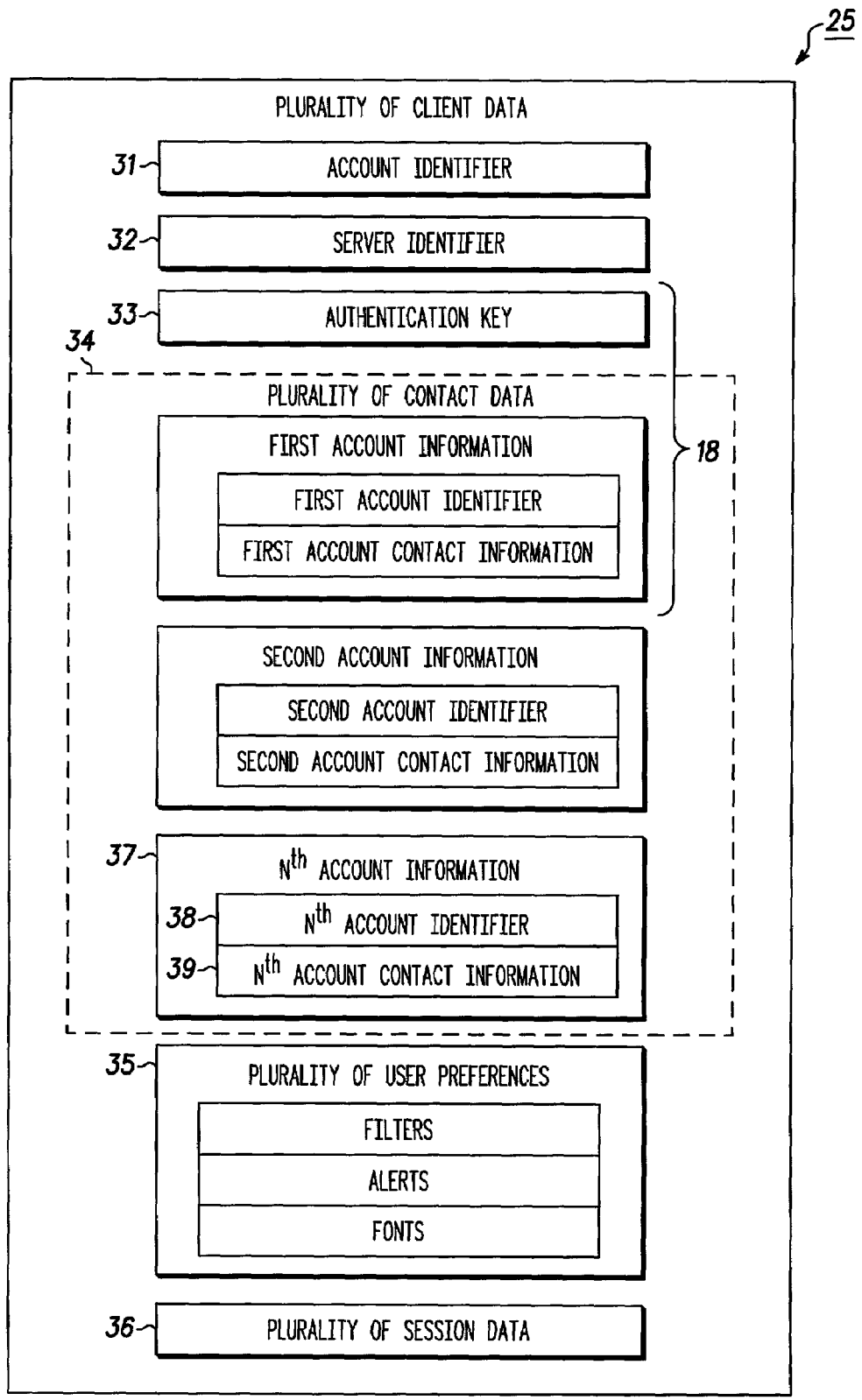
FIG. 2 illustrates client data for use within the messaging communication system of FIG. 1, in accordance with the preferred embodiment of the present invention.

Each messaging client 26 preferably includes a plurality of client data 25. The plurality of client data 25 includes data associated with the messaging client 26 and data associated with each messaging session for which the messaging client 26 is currently participating, has participated in, or plans to participate in. The plurality of client data 25 can be divided up into one or more client data portions 18 as illustrated in FIG. 2. The first messaging client 14 includes a first client data 17 and the second messaging client 20 includes a second client data 23. FIG. 2 illustrates the plurality of client data 25 included within the messaging client 26 of FIG. 1. It will be appreciated by one of ordinary skill in the art that the plurality of client data 25 as illustrated in FIG. 2 can be the first client data 17 or the second client data 23. As illustrated, the plurality of client data 25 preferably includes a client version identifier (not shown), an account identifier 31, a server identifier 32, an authentication key 33, a plurality of contact data 34, a plurality of user preferences 35, and a plurality of session data 36. It will be appreciated by one of ordinary skill in the art that the plurality of client data 25 can include any of the client data mentioned herein or an equivalent.

The client version identifier is preferably the name and version or other similar indication of the messaging client being used. The account identifier 31 is preferably a user name or other identification of the account user 30 currently using the messaging client 26. In an embodiment of the present invention in which a message server is utilized to manage the plurality of messaging sessions 24, the server identifier 32 identifies the message server. For example, the server identifier 32 can be a wireless address, an IP (internet protocol) address, or an IP address accompanied by a number of the port assigned to the message server. The authentication key 33 preferably includes a code that is used to authenticate the account user 30 to the messaging communication system 10. For example, the authentication key 33 could be derived from a password known only to the account user 30 and the messaging communication system 10. The plurality of contact data 34 is a listing of information relating to the various account users in which the account user 30 currently using the messaging client 26 communicates, plans to communicate, or has communicated with in the past. For example, the plurality of contact data 34 can be a "buddy list" for the account user 30. The plurality of contact data 34 preferably includes a plurality of account information 37 for each of a plurality of accounts. For example, the plurality of account information 37 for an Nth account can include an Nth account identifier 38 and further can include an Nth account contact information 39 associated with the Nth account identifier 38. The Nth account contact information 39, for example, can include Nth account user presence, Nth account user availability, Nth account phone number, Nth account mailing address, or Nth account user preferred communication means. It will be appreciated by one of ordinary skill in the art that the Nth account contact information can be any of the contact information mentioned herein or an equivalent. The plurality of account information 37 can further include, for example, billing information, favorite topics, associates, group lists, age, obscenity rating, and optional services. It will be appreciated by one of ordinary skill in the art that the plurality of account information 37 can include any of the information mentioned herein or an equivalent. In one embodiment of the present invention, each of the plurality of messaging clients 12 of FIG. 1 operates using at least one account. Further, each account user can have one or more accounts. For example, the account user 30 can have a business account and a personal account both operated using the messaging client 26.

The plurality of user preferences 35 defines certain attributes settable by the account user 30 for communicating within the plurality of messaging sessions 24 using the messaging client 26. The plurality of user preferences 35, for example, can include text font attributes, filter settings, blocking settings, screen names per account identifier, alert settings per screen name, buddy list groups, electronic mailboxes, electronic voice mail, and parental control settings. It will be appreciated by one of ordinary skill in the art that the plurality of user preferences 35, in accordance with the present invention, can include any of those preferences mentioned herein or an equivalent.

Figure 3:
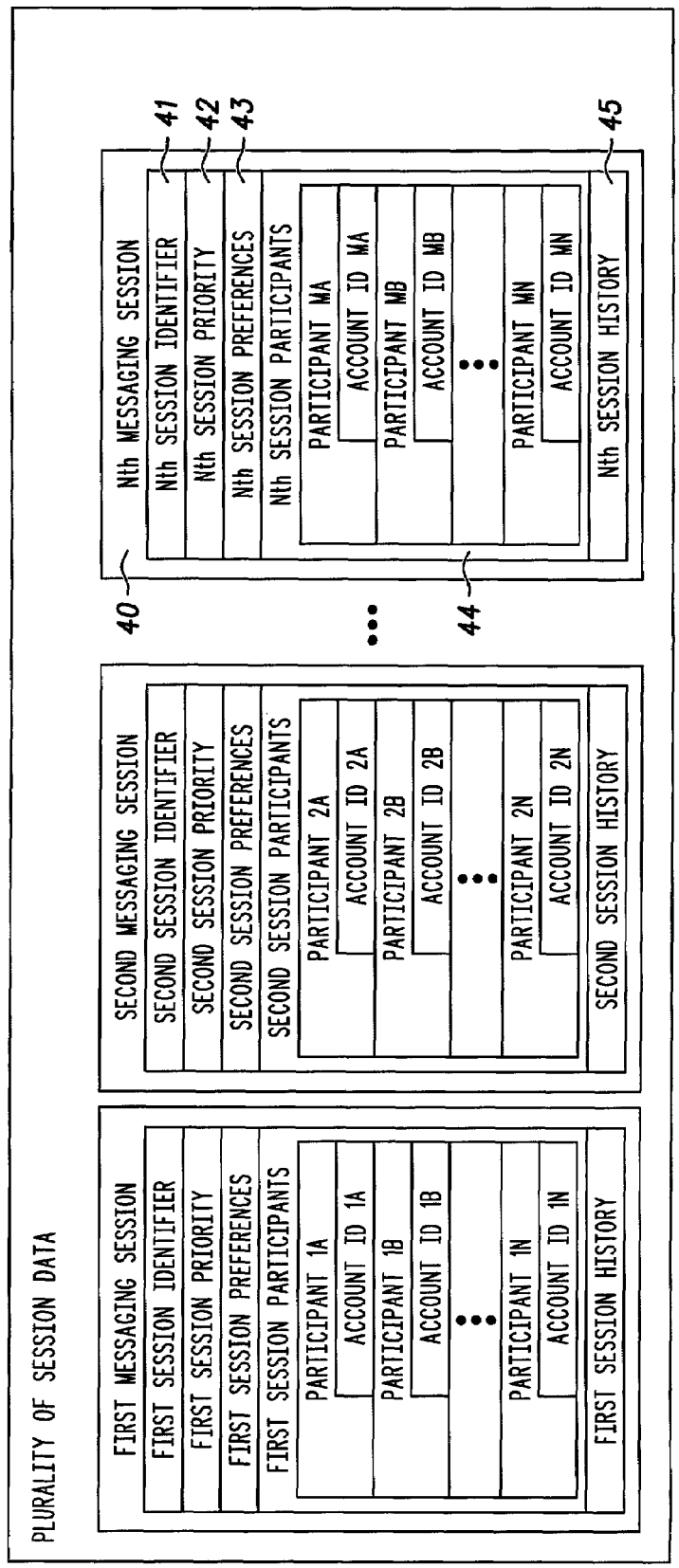
FIGS. 3 and 4 illustrate more detail of the client data of FIG. 2, in accordance with the preferred embodiment of the present invention.

The plurality of session data 36 included within the plurality of client data 25 contains information relating to each of the plurality of messaging sessions 24 for which the account user 30 is currently participating, has previously participated, or plans to participate in, using the messaging client 26. FIG. 3 illustrates a preferred embodiment of the plurality of session data 36 in accordance with the present invention. As illustrated in FIG. 3, for each messaging session 40, the plurality of session data 36 includes a session identifier 41, a session priority 42, a plurality of session preferences 43, a plurality of session participants 44, and a session history 45. It will be appreciated by one of ordinary skill in the art that the plurality of session data 36, in accordance with the present invention, can include any of the session data mentioned herein or an equivalent.

Preferably, the session identifier 41 identifies the messaging session 40 of the plurality of messaging sessions 24. In one embodiment, the messaging session 40 is assigned the session priority 42. The session priority 42 determines or identifies the priority of the messaging session 40 within the plurality of messaging sessions 24 for which the account user 30 is currently participating. The session priority 42 can be set manually by the account user 30 or through a predetermined algorithm in the messaging client 26 taking into account the various characteristics of the messaging session 40 and the messaging client 26. The session priority 42 can for example, specify a stacking order (e.g.: order of display window layering for viewing) of the messaging windows within the messaging client 26. Alternatively, when the messaging client 26 operates within a messaging device capable of only displaying one session at a time, the session priority 42 can identify the session to display at any given point in time.

The plurality of session preferences 43 defines certain attributes settable by the account user 30 for communicating within the messaging session 40 using the messaging client 26. The plurality of session preferences 43, for example, can include text font attributes, filter settings, blocking settings, alert settings, screen names, buddy list groups, electronic mailboxes, parental control settings, an alert option such as alert on receipt of a new real time message or no alert on receipt of a new real time message, guaranteed or non-guaranteed delivery, timeout setting for participation in the messaging session 40, and number of real time messages to retain in the session history 45 and to display. It will be appreciated by one of ordinary skill in the art that the plurality of session preferences 43, in accordance with the present invention, can include any of the session preferences mentioned herein or an equivalent. In one embodiment, the plurality of session preferences 43 includes a session timer. (not shown) The session timer is a preset time period upon which the messaging client 26 is active within the messaging session 40. The plurality of session preferences 43 in one embodiment is transferred to the messaging client 26 when the messaging session 40 is activated. Alternatively, the account user 30 manually can set the plurality of session preferences 43. Alternatively, a default set of session preferences can be preprogrammed in the messaging client 26 to enhance the efficiency of managing the participation in the plurality of messaging sessions 24. The plurality of session participants 44 includes each account user participating in the messaging session 40 along with the account identifier for each participating account user.

Figure 4:
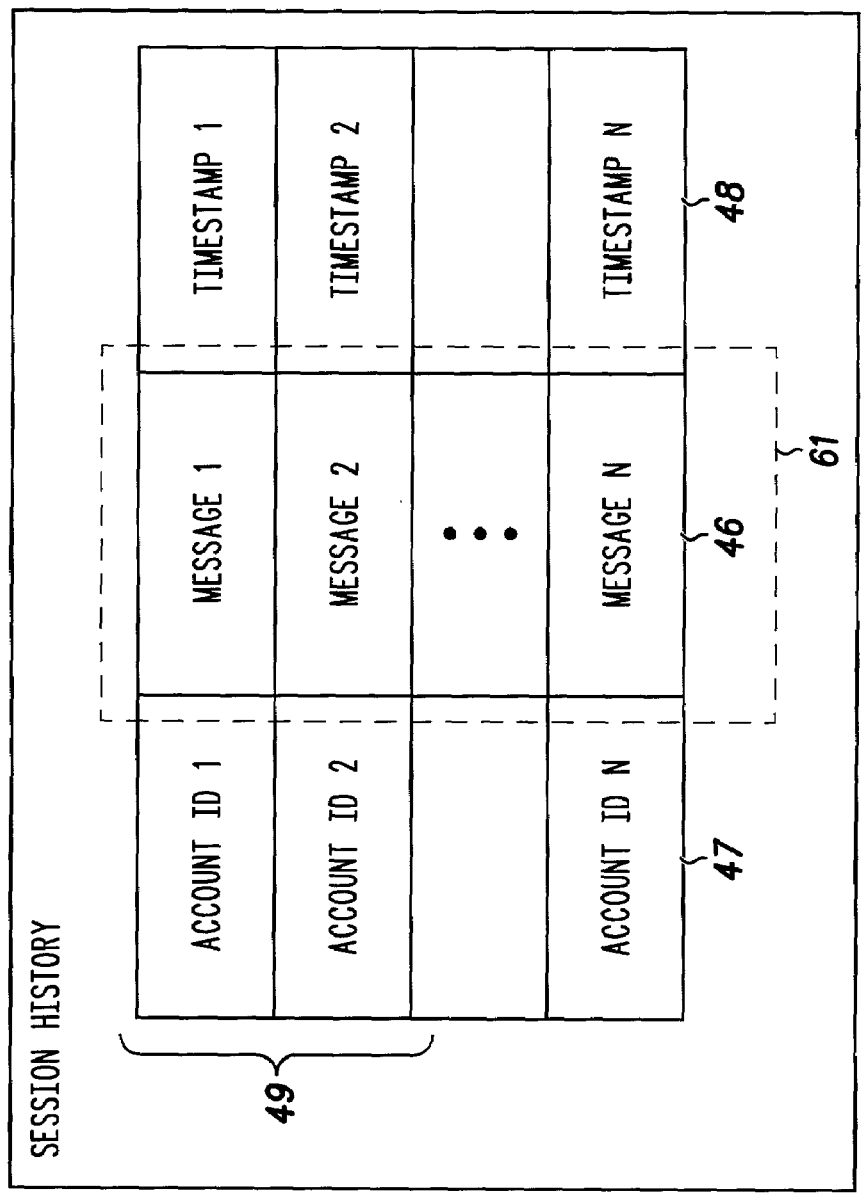

FIG. 4 illustrates a preferred embodiment of the session history 45 of FIG. 3 in accordance with the present invention. As illustrated in FIG. 4, the session history 45 preferably includes a plurality of session messages 61 in which each session message 46 is associated with a plurality of message information including an account identifier 47 for an associated message originator such as the account user 30. The associated originator for example is one of the plurality of session participants 44. Each session message 46 further can be associated with a message timestamp 48 identifying the time that the session message 46 was entered into the messaging session 40 by the message originator. The session history 45 is further composed of at least one session portion 49. Each session portion 49 comprises at least one session message 46 and associated information. It will be appreciated by one of ordinary skill in the art that although the session portion 49 is illustrated as a portion of the session history 45, alternatively, in accordance with the present invention, the session portion 49 can be any portion of the plurality of session data 36.

Figure 5:
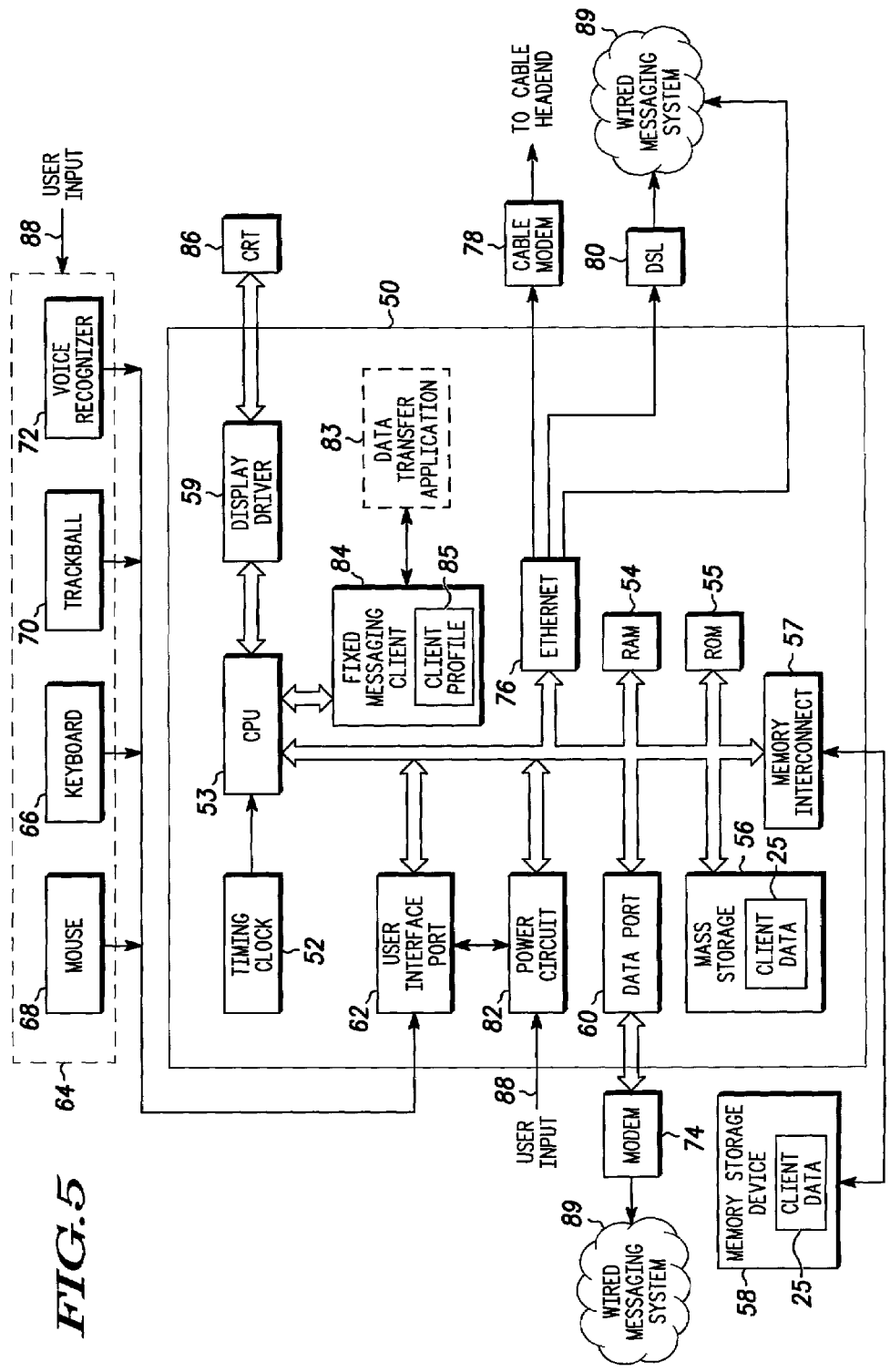
FIGS. 5, 6, and 7 are electronic block diagrams of various embodiments of a messaging device in which a messaging client of FIG. 1 operates.

FIG. 5 is an electronic block diagram of one embodiment of a messaging device in which a messaging client of FIG. 1 operates. Specifically, FIG. 5 illustrates a fixed network device 50. The fixed network device 50 can operate for example on a local area network (LAN) or a wide area network (WAN) or a combination of both. The fixed network device 50 can be one of a plurality of spatially co-located computers which are typically located within a room, building or campus of buildings and are sharing common resources and communicating with each other on a computer network in a manner well known to one of ordinary skill in the art. Typical resources shared are files on a file server, printers on a print server, and electronic message (email) services on an email server. The fixed network device 50 can operate on a network that uses a physical network such as ARCNET, Ethernet, Token-ring, Local Talk or other network media to connect the computers, which represent wired network nodes into the network. The fixed network device 50 can operate on a LAN that employs any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. Further the fixed network device 50 can operate on a WAN that uses a different physical network media such as X.25, Frame Relay, ISDN, Modem dial-up or other media to connect other computers or other local area networks. In the following description, the term "fixed network device" includes any of the messaging devices operating as described above or an equivalent.

As illustrated, the fixed network device 50 comprises a timing clock 52, a central processing unit 53, an electronic memory preferably in the form of a random access memory (RAM) 54 and/or a read only memory (ROM) 55, and a mass storage element (e.g., a disk drive or the like) 56. In one embodiment, the fixed network device 50 includes a memory interconnect 57 for operatively connecting a memory storage device 58 to the fixed network device 50. The memory interconnect 57 can, for example, comprise a structure for physically engaging external contacts on the memory storage device 58 so that the memory storage device 58 is directly connected to the fixed network device 50. It will be appreciated by one of ordinary skill in the art that the memory interconnect 57 can also be a wireless connection such as an infrared, Bluetooth or radio frequency interface. When the memory interconnect 57 is connected to the memory storage device 58, the fixed network device 50 can access a plurality of memory information such as the plurality of client data 25 from the memory storage device 58.

The fixed network device 50 further preferably comprises a display driver 59, a general I/O interface or data port 60, and a user interface port 62 that accommodates a user interface 64 including any number of input means for general information entry. In the preferred embodiment, the user interface 64, e.g., a keyboard 66, a "mouse," 68, a pen or puck activated tablet (not shown), a trackball 70, an audio activated command recognition processor 72, or the like, allows a device user to enter and manipulate information using a user input 88. After information is entered, it may be communicated to a wired messaging system 89 via a conventional modem 74 or the like. Preferably, the fixed network device 50 also includes an Ethernet connection 76 for communicating to the wired messaging system 89 or for communicating through either a conventional cable modem 78 to a cable headend, or a (Digital Subscriber Line) DSL connection 80 to the wired messaging system 89. The fixed network device 50 can be changed from an active to an inactive state or from an inactive state to an active state through the user input 88 to the power circuit 82. The power circuit 82 can be operated manually via the user input 88 directly to the power circuit 82, the user input 88 to the user interface 64, or alternatively automatically via the programming of the CPU 53.

In a preferred embodiment of the present invention, the fixed network device 50 of FIG. 5 includes a fixed messaging client 84. It will be appreciated by one of ordinary skill in the art that the fixed messaging client 84 can be the first messaging client 14, the second messaging client 20, or any other of the plurality of messaging clients 12 of FIG. 1. The fixed network device 50 performs messaging functions within the fixed messaging client 84 using a plurality of messages stored in the electronic memory of the fixed network device 50. The fixed messaging client 84 may be hard coded or programmed into the fixed network device 50 during manufacturing, may be programmed over-the-air upon customer subscription, or may be a downloadable application. It will be appreciated that other programming methods can be utilized for programming the fixed messaging client 84 into the fixed network device 50. It will be further appreciated by one of ordinary skill in the art that the fixed messaging client 84 can be hardware circuitry within the fixed network device 50.

Preferably the fixed messaging client 84 automatically updates a CRT 86 when a new message has been sent or received by sending a command to the display driver 59. This allows the message to be updated while the device user is reading it without disturbing the CRT 86. The fixed messaging client 84 uses the plurality of client data 25 stored in the electronic memory or stored in the memory storage device 58 to perform functions relating to various received and/or sent messages. It will be appreciated by one of ordinary skill in the art that fixed networked devices having software-programming capabilities may include client data that is specialized and personalized such as the plurality of user preferences 35 including display options and screens for each account user, or similarly may include the plurality of session preferences 43 for each messaging session 40. Alternatively, fixed networked devices that do not include software-programming capabilities may include the plurality of client data 25 including the plurality of user preferences 35 that are standard, pre-defined display options and screens for the plurality of messaging sessions 24.

The plurality of user preferences 35 of the plurality of client data 25 used by the fixed messaging client 84 further includes various alert options. In one embodiment, the fixed messaging client 84 notifies the CPU 53 to send a command to an alert circuit (not shown) when a new message is received. In another embodiment, the fixed messaging client 84 notifies the CPU 53 to send a command to the alert circuit when an unread message is to be deleted from the memory. Alternatively, no alert may be sent when a new message is received and stored in the memory. It will be appreciated by one of ordinary skill in the art that other alerting schemes are within the scope of the present invention. Further, the CPU 53, in response to the user input 88 to the user interface 64 through to the user interface port 62, such as a device user depressing a button or series of buttons, or in response to receipt of a message initiates an input signal to the fixed messaging client 84. The fixed messaging client 84, in response to the input signal, accesses a plurality of messages stored in the electronic memory for use in operation of the fixed messaging client 84.

Preferably, the fixed messaging client 84 includes a client profile 85. The client profile 85 includes information regarding the capabilities and limitations of the fixed messaging client 84 and also of the fixed network device 50. For example, the client profile 85 can include indication of the media supported by the fixed messaging client 84 (e.g. audio, video), indication of which features are supported by the fixed messaging client 84, device type, device display, device battery life, device battery capacity, device processing power, and access to alternate networks. It will be appreciated by one of ordinary skill in the art that the client profile 85 can include any of those mentioned above in any combination or an equivalent.

In accordance with the present invention, the fixed messaging client 84 includes software capability for transferring all or a portion of the plurality of client data 25 to one or more other messaging clients for use by the other messaging client to participate within one or more of the plurality of messaging sessions 24. The fixed messaging client 84, in accordance with the present invention, further includes software capability for receiving all or a portion of the plurality of client data 25 from at least one other messaging client to participate within one or more of the plurality of messaging sessions 24. As illustrated in FIG. 5, the software capability for transferring and/or the capability for receiving the plurality of client data 25 can be incorporated into the fixed messaging client 84, or alternatively can be contained within a separate data transfer application 83. The data transfer application 83, for example can be a third party software add-on that is compatible with existing messaging software applications (e.g. the fixed messaging client 84) already programmed into the fixed network device 50. Maintaining the data transfer software on a separate data transfer application 83 minimizes incorporation timeframes and also the cost of upgrading the fixed network device 50 to include this feature.

Figure 6:
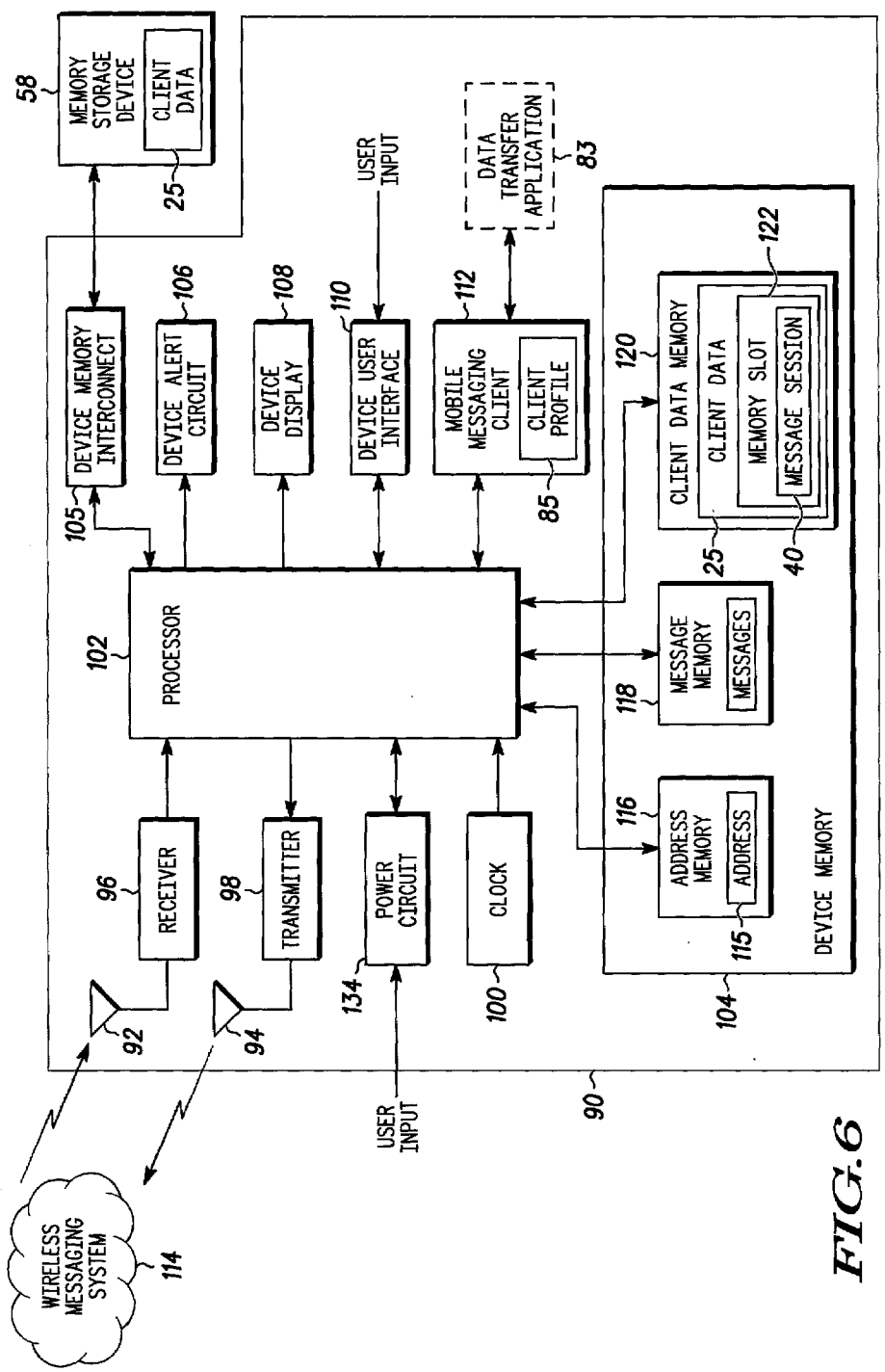

FIG. 6 is an electronic block diagram of one embodiment of a messaging device in which a messaging client of FIG. 1 operates. Specifically, FIG. 6 illustrates a mobile device 90. It will be appreciated by one of ordinary skill in the art that the mobile device 90 in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. In the following description, the term "mobile device" refers to any of the messaging devices mentioned above or an equivalent.

As illustrated in FIG. 6, the mobile device 90 includes a first antenna 92, a second antenna 94, a receiver 96, a transmitter 98, a clock 100, a processor 102, a device memory 104, a device memory interconnect 105, a device alert circuit 106, a device display 108, a device user interface 110 and a mobile messaging client 112.

The first antenna 92 intercepts transmitted signals from a wireless messaging system 114. It will be appreciated by one of ordinary skill in the art that the wireless messaging system 114, in accordance with the present invention, can function utilizing any wireless RF channel, for example, a one or two-way pager channel, a mobile cellular telephone channel, or a mobile radio channel. Similarly, it will be appreciated by one of ordinary skill in the art that the wireless messaging system 114 can function utilizing other types of communication channels such as infrared channels. In the following description, the term "wireless messaging system" refers to any of the wireless messaging systems mentioned above or an equivalent.

The first antenna 92 is coupled to the receiver 96, which employs conventional demodulation techniques for receiving the communication signals transmitted by the wireless messaging system 114. Coupled to the receiver 96, is the processor 102 utilizing conventional signal-processing techniques for processing received messages. Preferably, the processor 102 is similar to the MC68328 micro-controller manufactured by Motorola, Inc. of Schaumburg, Ill. It will be appreciated by one of ordinary skill in the art that other similar processors can be utilized for the processor 102, and that additional processors of the same or alternative type can be utilized as required to handle the processing requirements of the processor 102. The processor 102 decodes an address in the demodulated data of the received message, compares the decoded address with one or more addresses 115 stored in an address memory 116 of the device memory 104; and when a match is detected, proceeds to process the remaining portion of the received message.

To perform the necessary functions of the mobile device 90, the processor 102 is coupled to the device memory 104, which preferably includes a random access memory (RAM), a read-only memory (ROM), and an electrically erasable programmable read-only memory (EEPROM)(not shown). The device memory 104 includes the address memory 116, a message memory 118, and a client data memory 120.

Once the processor 102 has processed a received message, it stores the decoded message in the message memory 118 of the device memory 104. It will be appreciated by one of ordinary skill in the art that the message memory 118, in accordance with the present invention, can be a voicemail box or a group of memory locations in a data storage device. In the following description, the term "message memory" refers to any of the memory means mentioned above or an equivalent. Preferably, when the received message is a message for participation in one of the plurality of messaging sessions 24, for example the session message 46 of the messaging session 40, the processor 102 stores the decoded message in the client data memory 120.

In one embodiment, the mobile device 90 includes the device memory interconnect 105 for operatively connecting the memory storage device 58 to the mobile device 90. The device memory interconnect 105 can, for example, comprise a structure for physically engaging external contacts on the memory storage device 58 so that the memory storage device 58 is directly connected to the mobile device 90. It will be appreciated by one of ordinary skill in the art that the device memory interconnect 105 can also be a wireless connection such as an infrared, Bluetooth or radio frequency interface. When the device memory interconnect 105 is connected to the memory storage device 58, the mobile device 90 can access a plurality of memory information such as the plurality of client data 25 from the memory storage device 58.

The client data memory 120 includes the plurality of client data 25 as described previously in FIGS. 2 to 4. The client data memory 120 includes a memory slot 122 for each messaging session 40 in which the mobile device 90 has subscribed. The memory slot 122, in accordance with the present invention, includes the plurality of session data 36 as illustrated in FIG. 2. The plurality of session messages 61 associated with the messaging session 40 is stored together in chronological order in the memory slot 122 similar to the session history 45 of FIG. 4. The memory slot 122 is allocated a fixed amount of memory for storing associated plurality of session messages 61. The memory slot 122 holds multiple session messages in a single message memory slot. Any session message 46 received for the messaging session 40 along with its associated session message information is appended at the end of the plurality of session messages 61 already in the memory slot 122. If the amount of allocated memory for the memory slot 122 is exceeded, the older session messages are deleted. It will be appreciated by one of ordinary skill in the art that, in accordance with the present invention, the client data memory 120 and associated operation herein described, in accordance with the present invention, can be included in the fixed network device 50 of FIG. 5, a cable box 136 of FIG. 7 or any other messaging device in which the messaging client 26 operates.

Upon receipt and processing of a message, the processor 102 preferably generates a command signal to the device alert circuit 106 as a notification that the message has been received and stored. The device alert circuit 106 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the device alert circuit 106.

Upon receipt and processing of a message, the processor 102 preferably also generates a command signal to the device display 108 to generate a visual notification of the receipt and storage of the message. When the device display 108 receives the command signal from the processor 102 that the message has been received and stored in the device memory 104, a message indication is displayed. The message indication, for example can be the activation of one of a plurality of message icons on the device display 108. The device display 108 can be, for example, a liquid crystal display utilized to display text. It will be appreciated by one of ordinary skill in the art that other similar displays such as cathode ray tube displays can be utilized for the device display 108.

The mobile device 90 preferably further includes the clock 100. The clock 100 provides timing for the processor 102. The clock 100 can include the current time for use in the operation of the mobile device 90. The clock 100 also provides a source for timing of feature enhancements such as active and inactive periods of operation or periods of alerting.

In a preferred embodiment, the mobile device 90 includes the mobile messaging client 112. It will be appreciated by one of ordinary skill in the art that the mobile messaging client 112 can be the first messaging client 14, the second messaging client 20, or any other of the plurality of messaging clients 12 of FIG. 1. The mobile messaging client 112 performs messaging functions within the mobile device 90 using the plurality of client data 25 stored in the client data memory 120. The mobile messaging client 112 may be hard coded or programmed into the mobile device 90 during manufacturing, may be programmed over-the-air upon customer subscription, or may be a downloadable application. It will be appreciated that other programming methods can be utilized for programming the mobile messaging client 112 into the mobile device 90. It will be further appreciated by one of ordinary skill in the art that the mobile messaging client 112 can be hardware circuitry within the mobile device 90. Preferably the mobile messaging client 112 automatically updates the device display 108 when a new session message has been sent or received. This allows the session history 45 to be updated while the account user 30 is reading it without disturbing the device display 108. The mobile messaging client 112 uses the plurality of client data 25 stored in the electronic memory or stored in the memory storage device 58 to perform functions relating to various received and/or sent session messages. It will be appreciated by one of ordinary skill in the art that mobile devices having software-programming capabilities may include specialized and personalized display options and screens for each messaging session 40. Alternatively, mobile devices that do not include software-programming capabilities may include standard, pre-defined display options and screens for the plurality of messaging sessions 24. In accordance with the present invention, the display options for the plurality of messaging sessions 24 in which the messaging client 26 within the mobile device 90 is participating can be included in the plurality of session preferences 43 for each messaging session 40 or alternately, the display options can be stored independently within the plurality of user preferences 35 of the plurality of client data 25

The mobile messaging client 112 further operates using various alert options. In one embodiment, the mobile messaging client 112 notifies the processor 102 to send a command to the device alert circuit 106 when a new session message is added to the memory slot 122 of the client data memory 120 for the messaging session 40. In another embodiment, the mobile messaging client 112 notifies the processor 102 to send a command to the device alert circuit 106 when an unread session message is to be deleted from the memory slot 122. Alternatively, no alert may be sent when a new session message is received and stored in the client data memory 120. It will be appreciated by one of ordinary skill in the art that other alerting schemes are within the scope of the present invention. In accordance with the present invention, the alert options for the plurality of messaging sessions 24 in which the messaging client 26 within the mobile device 90 is participating can be included in the plurality of session preferences 43 for each messaging session 40 or alternately, the alert options can be stored independently within the plurality of user preferences 35 of the plurality of client data 25.

In accordance with the present invention, the mobile messaging client 112 includes software capability for transferring all or a portion of the plurality of client data 25 to at least one other messaging client for use by the other messaging client to participate within one or more of the plurality of messaging sessions 24. The mobile messaging client 112, in accordance with the present invention, further includes software capability for receiving all or a portion of the plurality of client data 25 from another messaging client to participate within one or more of the plurality of messaging sessions 24. As illustrated in FIG. 6, the software capability for transferring and receiving client data can be incorporated into the mobile messaging client 112 or alternatively contained within a separate data transfer application 83. The data transfer application 83, for example can be a third party software add-on that is compatible with existing messaging software applications (e.g. the mobile messaging client 112) already programmed into the mobile device 90. Maintaining the data transfer software on a separate data transfer application 83 minimizes incorporation timeframes and also the cost of upgrading a messaging device to include this feature.

Preferably, the device user interface 110 is coupled to the processor 102. The device user interface 110 can be one or more buttons used to generate a button press, a series of button presses, a voice response from the device user, or some other similar method of manual response initiated by the device user (such as the account user 30) of the mobile device 90. The processor 102, in response to the device user interface 110, such as a device user depressing a button or series of buttons, or in response to receipt of a session message, initiates an input signal to the mobile messaging client 112. The mobile messaging client 112, in response to the user input signal, accesses the plurality of session messages 61 stored in the client data memory 120 for use in operation of the mobile messaging client 112.

Preferably, the mobile messaging client 112 includes the client profile 85. The client profile 85 includes information regarding the capabilities and limitations of the mobile messaging client 112 and also of the mobile device 90. For example, the client profile 85 can include indication of the media supported by the mobile messaging client 112 (e.g. audio, video), indication of which features are supported by the mobile messaging client 112, device type, device protocol usage, device display, device battery life, device battery capacity, device processing power, and access to alternate networks. It will be appreciated by one of ordinary skill in the art that the client profile 85 can include any of those mentioned above in any combination or an equivalent.

The transmitter 98 is coupled to the processor 102 and is responsive to commands from the processor 102. When the transmitter 98 receives a command from the processor 102, the transmitter 98 sends a signal via the second antenna 94 to the wireless messaging system 114.

In an alternative embodiment (not shown), the mobile device 90 includes one antenna performing the functionality of the first antenna 92 and the second antenna 94. Further, the mobile device 90 alternatively includes a transceiver circuit performing the functionality of the receiver 96 and the transmitter 98. It will be appreciated by one of ordinary skill in the art that other similar electronic block diagrams of the same or alternate type can be utilized for the mobile device 90 to handle the requirements of the mobile device 90.

The mobile device 90 can be changed from an active state to an inactive state or from an inactive state to an active state through a user input to the power circuit 134. The power circuit 134 can be operated manually via the user input to the power circuit 134, the user input to the user interface 110, or alternatively automatically via the programming of the processor 102.

Figure 7:
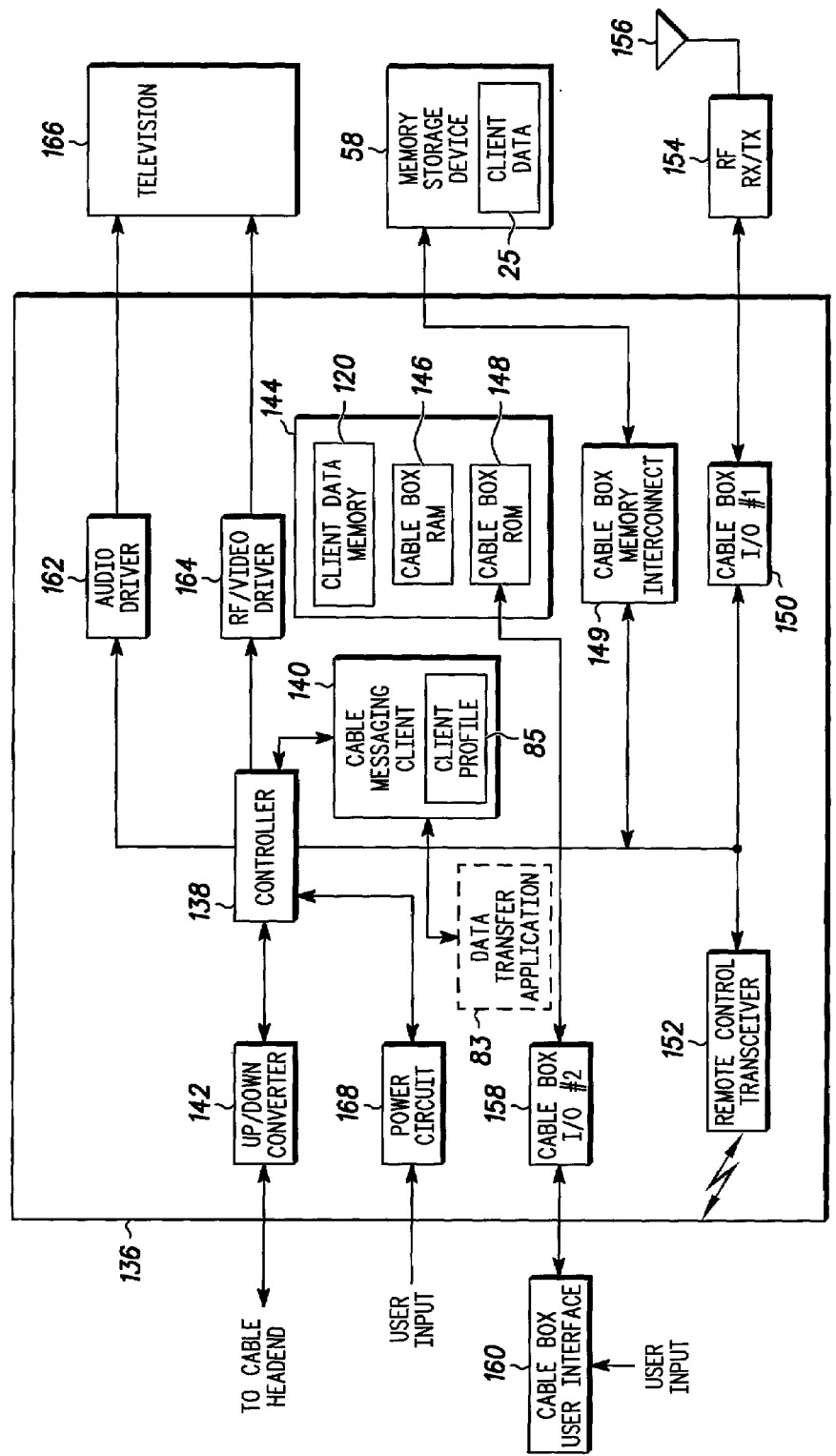

FIG. 7 is an electronic block diagram of one embodiment of a messaging device in which a messaging client of FIG. 1 operates. Specifically, FIG. 7 illustrates an interactive broadcast receiver such as the cable box 136. The cable box 136 preferably allows network operators to deploy a wide range of interactive television broadcast services and applications on their networks. Further the cable box 136 preferably offers cable operators a combined, all-in-one, hardware and software solution for deploying interactive television services on their networks, thereby creating the ability for real time electronic message communication using television sets and networks.

As illustrated in FIG. 7, the cable box 136 preferably includes a controller 138 for controlling the operation of the cable box 136. Preferably, the controller 138 is similar to the MC68328 micro-controller manufactured by Motorola, Inc. of Schaumburg, Ill. It will be appreciated by one of ordinary skill in the art that other similar processors can be utilized for the controller 138, and that additional processors of the same or alternative type can be utilized as required to handle the processing requirements of the controller 138. Preferably, the controller 138 is programmed to function with the cable messaging client 140. The cable messaging client 140, in accordance with the present invention, operates similarly to the fixed messaging client 84 of FIG. 5 and the mobile messaging client 112 of FIG. 6 as described above. It will be appreciated by one of ordinary skill in the art that the cable messaging client 140 illustrated in FIG. 7 can be the first messaging client 14, the second messaging client 20, or any other of the plurality of messaging clients 12 of FIG. 1.

In accordance with the present invention, the cable messaging client 140 includes software capability for transferring all or a portion of the plurality of client data 25 to at least one other messaging client for use by the other messaging client to participate within one or more of the plurality of messaging sessions 24. The cable messaging client 140 further includes software capability for receiving all or a portion of the plurality of client data 25 from another messaging client to participate within one or more of the plurality of messaging sessions 24. As illustrated in FIG. 7, the software capability for transferring and receiving client data can be incorporated into the cable messaging client 140 or alternatively contained within a separate data transfer application 83. The data transfer application 83, for example can be a third party software add-on that is compatible with existing messaging software applications (e.g. the cable messaging client 140) already programmed into the cable box 136. Maintaining the data transfer software on a separate data transfer application 83 minimizes incorporation timeframes and also the cost of upgrading a device to include this feature.

Preferably, the cable messaging client 140 includes the client profile 85. The client profile 85 includes information regarding the capabilities and limitations of the cable messaging client 140 and of the cable box 136. For example, the client profile 85 can include indication of the media supported by the cable messaging client 140 (e.g. audio, video), indication of which features are supported by the cable messaging client 140, device type, device protocol usage, device display, device battery life, device battery capacity, device processing power, and access to alternate networks. It will be appreciated by one of ordinary skill in the art that the client profile 85 can include any of those mentioned above in any combination or an equivalent.

The cable box 136 further includes an up/down converter 142 coupled to the controller 138 for communicating with a cable headend. To perform the necessary functions of the cable box 136, the controller 138 is further coupled to a cable box memory 144, which preferably includes a cable box random access memory (RAM) 146, a cable box read-only memory (ROM) 148, and an electrically erasable programmable read-only memory (EEPROM) (not shown). The cable box memory 144 of the cable box 136 preferably includes the client data memory 120 as previously described and illustrated in FIG. 6.

In one embodiment, the cable box 136 includes a cable box memory interconnect 149 for operatively connecting the memory storage device 58 to the cable box 136. The cable box memory interconnect 149 can, for example, comprise a structure for physically engaging external contacts on the memory storage device 58 so that the memory storage device 58 is directly connected to the cable box 136. It will be appreciated by one of ordinary skill in the art that the cable box memory interconnect 149 can also be a wireless connection such as an infrared, Bluetooth or radio frequency interface. When cable box memory interconnect 149 is connected to the memory storage device 58, the cable box 136 can access a plurality of memory information such as the plurality of client data 25 from the memory storage device 58.

Further coupled to the controller 138 is a first cable box I/O 150 for driving a remote control transceiver 152 and further for driving a radio frequency transceiver 154 connected to a cable box antenna 156. A second cable box I/O 158 for inputs from a user input via a cable box user interface 160 is further coupled to the controller 138. Also coupled to the controller 138 are an audio driver 162 and a radio frequency/video driver 164 for communicating with a television 166.

The cable box 136 can be changed from an active state to an inactive state or from an inactive state to an active state through a user input to the cable box power circuit 168. The cable box power circuit 168 can be operated manually via the user input to the cable box power circuit 168, the user input to the cable box user interface 160 or alternatively automatically via the programming of the controller 138.

Figure 8:
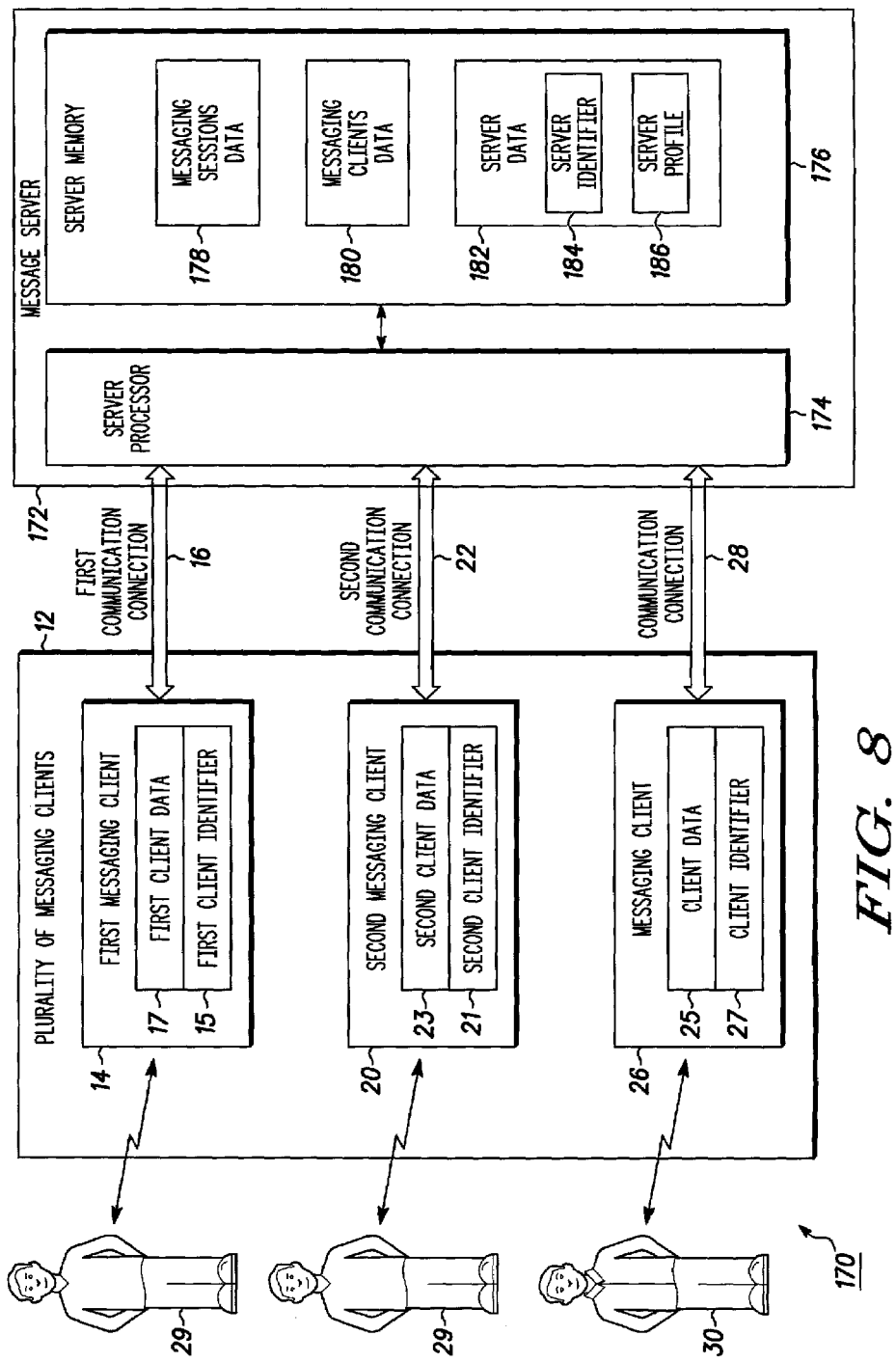
FIG. 8 is an electronic block diagram of an alternate embodiment of a messaging communication system, in accordance with the preferred embodiment of the present invention.

FIG. 8 is an electronic block diagram of an alternate embodiment of a messaging communication system 170 in accordance with the present invention. The messaging communication system 170 includes the plurality of messaging clients 12 and a message server 172.

The message server 172 manages the communication of a plurality of electronic messages among the plurality of messaging clients 12, facilitating substantially real time communication among the plurality of messaging clients 12 within the messaging communication system 170. The message server 172 provides numerous services to manage the plurality of messaging sessions 24. The message server 172 also offers various options to the plurality of session participants 44 to reduce cost or enhance the features of the plurality of messaging sessions 24.

Each messaging client 26 of the plurality of messaging clients 12 such as the first messaging client 14 and the second messaging client 20 includes client software to interface within the messaging communication system 10. It will be appreciated by one of ordinary skill in the art that in accordance with the present invention, the interface capabilities of the client software can also be designed into client hardware of a messaging client. Each mess aging client 26 of the plurality of messaging clients 12 further includes the client identifier 27. For example, the first messaging client 14 includes the first client identifier 15 and the second messaging client 20 includes the second client identifier 21. The client identifier 27 of the messaging client 26 is a unique identification within the messaging communication system 170 for providing individualized messages to be directed to a particular messaging client. For example, the client identifier 27 can be an address of the mobile device 90 or an IP address and number of the port of the fixed network device 50. To communicate within the messaging communication system 170, the messaging client 26 establishes the communication connection 28 via the message server 172. For example, the first messaging client 14 establishes the first communication connection 16 via the message server 172 for communication within at least one of the plurality of messaging sessions 24. Similarly, the second messaging client 20 establishes the second communication connection 22 via the message server 172 for communication within at least one of the plurality of messaging sessions 24. It will be appreciated by one of ordinary skill in the art that the communication connection 28, the first communication connection 16, and the second communication connection 22 can be a physical connection, or alternatively can be a logical connection where the act of connecting and disconnecting is a logical one. Each of the plurality of messaging clients 14 belongs to the account user 30. The account user 30 is an individual who uses one or more of the plurality of messaging clients 12 to communicate with other account users within the plurality of messaging sessions 24. It will be appreciated by one of ordinary skill in the art that the account user 30 can communicate using one or more of the plurality of messaging clients 12. For example, the first account user 29 can establish communication within the plurality of messaging sessions 24 using the first messaging client 14, and, in accordance with the present invention, also using the second messaging client 20.

Each messaging client 26 preferably includes the plurality of client data 25. The plurality of client data 25 includes data associated with the messaging client 26 and data associated with each messaging session for which the messaging client 26 is currently participating, has participated in, or plans to participate in. The first messaging client 14 includes the first client data 17 and the second messaging client 20 includes the second client data 23.

The message server 172 includes a server processor 174 and a server memory 176. The server processor 174 utilizes conventional signal processing techniques for processing received electronic messages. Preferably, the server processor 174 is similar to the MC68328 micro-controller manufactured by Motorola, Inc. of Schaumburg, Ill. It will be appreciated that other similar processors can be utilized for the server processor 174, and that additional processors of the same or alternative type can be added as required to handle the processing requirements of the server processor 174.

To perform the necessary functions of the message server 172, the server processor 174 is coupled to the server memory 176, which preferably includes a random access memory (RAM), a read-only memory (ROM), an electrically erasable programmable read-only memory (EEPROM), and/or a magnetic storage memory (for example a hard drive). The server memory 174 preferably includes a messaging sessions data memory 178, a messaging clients data memory 180, and a server data memory 182. The messaging sessions data memory 178 stores the plurality of session data for all messaging sessions for which the message server 172 is managing. The plurality of session data stored for each messaging session for which the message server 172 is managing is similar to the plurality of session data 36 as illustrated in FIGS. 3 and 4 and described previously. The messaging clients data memory 178 stores the plurality of client data 25 for each of the messaging clients 26 that have established the communication connection 28 with the message server 172. For example, the plurality of client data 25 can include the type of device being utilized by each messaging client 26, the account user 30 utilizing each messaging client 26, the plurality of user preferences 35 for each messaging client 26, and the messaging sessions for which each messaging client 26 is participating. It will be appreciated by one of ordinary skill in the art that the messaging client data memory 178 can store any of the plurality of client data 25 mentioned herein or an equivalent. The server memory 176 further includes the server data memory 182. The server data memory 182 preferably includes a server identifier 184 for the message server 172. The server identifier 184 can be, for example, a unique selective call address in the wireless messaging system 114. Alternatively, the server identifier 184 can be an IP address, or an IP address and associated number of the port assigned to the message server 172 of the wired messaging system 89. It will be appreciated by one of ordinary skill in the art that the server identifier 184 can be one mentioned herein or an equivalent. The server identifier 184 enables the communication between the plurality of messaging clients 12 and the message server 172 using the communication connections such as the communication connection 28, the first communication connection 16, and the second communication connection 22. The server data memory 182 also preferably includes a server profile 186.

The server profile 186 includes information regarding the capabilities of the message server 176. For example, the server profile 186 can include server processing power, server client capability, server messaging session capability, and server access to secondary networks. It will be appreciated by one of ordinary skill in the art that the server profile 186 can include any of those mentioned above in any combination or an equivalent.

Figure 9:
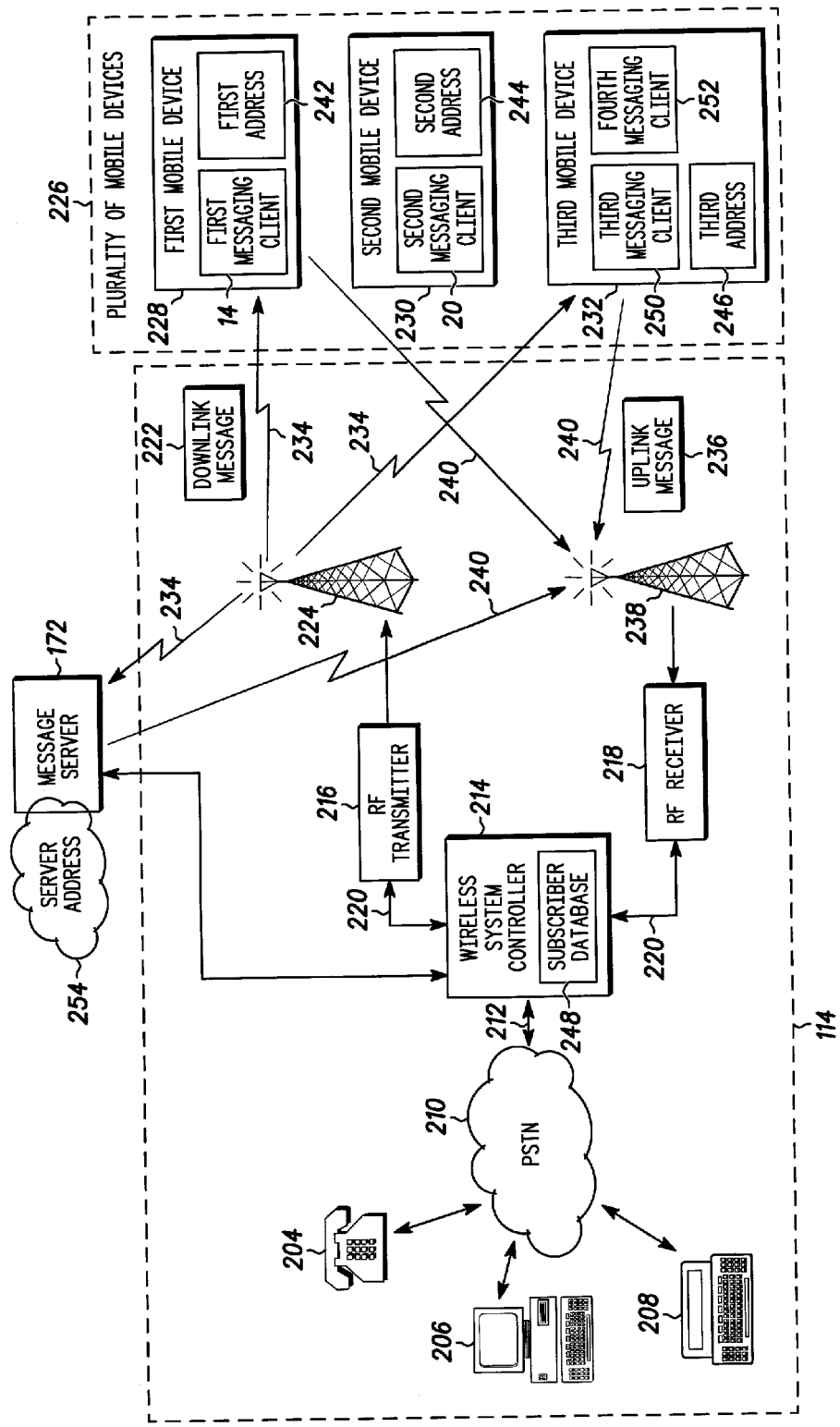
FIGS. 9 to 12 are electronic block diagrams of various embodiments of the messaging communication system of FIGS. 1 and 8, in accordance with the preferred embodiment of the present invention.

FIG. 9 is an electronic block diagram of one embodiment of the messaging communication system 10, 170 of FIGS. 1 and 8 respectively. Specifically, FIG. 9 illustrates an embodiment of the present invention in which the messaging communication system 10, 170 is the wireless messaging system 114 of FIG. 6.

The wireless messaging system 114, as illustrated in FIG. 9 includes a message input device for initiating messages into the wireless messaging system 114. The message input device can be, for example, a telephone 204, a computer 206, a desktop messaging unit 208, or the message server 172 connected through a conventional public switched telephone network (PSTN) 210 through a plurality of telephone links 212 to a wireless system controller 214. The telephone links 212, for example, can be a plurality of twisted wire pairs, a fiber optic cable, or a multiplexed trunk line.

The wireless system controller 214 is coupled to and oversees the operation of at least one radio frequency (RF) transmitter 216 and at least one radio frequency (RF) receiver 218 through one or more communication links 220. The communication links 220 typically are twisted pair telephone wires, and additionally can include radio frequency (RF), microwave, or other communication links. The RF transmitter 216 and the RF receiver 218 typically are used with message store and forward stations that encode and decode inbound and outbound messages into formats that are compatible with landline message switched computers and personal radio addressing requirements, such as cellular messages, short messaging service, or paging protocols. The wireless system controller 214 can also function to encode and decode wireless messages that are transmitted to or received by the RF transmitter 216 or the RF receiver 218. Telephony signals are typically transmitted to and received from the wireless system controller 214 by telephone sets such as the telephone 204 or a mobile device. The wireless system controller 214 encodes and schedules outbound messages such as a downlink message 222. The wireless system controller 214 then transmits the encoded outbound messages through the RF transmitter 216 via a transmit antenna 224 to a plurality of mobile devices 226 such as the mobile device 90 of FIG. 6 on at least one outbound radio frequency (RF) channel 234. The plurality of mobile devices 226, for example, includes a first mobile device 228, a second mobile device 230, and a third mobile device 232 each communicating through a wireless connection such as the outbound RF channel 234 and an inbound RF channel 240. The downlink message 222 can be, for example, a data message or a voice call such as the session message 46. Similarly, the wireless system controller 214 receives and decodes inbound messages such as an uplink message 236 received by the RF receiver 218 via a receive antenna 238 on at least one inbound radio frequency (RF) channel 240 from one of the plurality of mobile devices 226. The uplink message 236 can be, for example, a data message, a reply to a data message, a response message based on at least one data message, a voice call, or a reply to a voice call, such as the session message 46.

Each of the plurality of mobile devices 226 assigned for use in the wireless messaging system 114 has an address or identity assigned thereto which is a unique selective call address in the wireless messaging system 114. For example, the first mobile device 228 has a first address 242, the second mobile device 230 has a second address 244, and the third mobile device 232 has a third address 246. It will be appreciated by one of ordinary skill in the art that other mobile devices assigned for use in the wireless messaging system 114 have an address assigned thereto which is a unique selective call address in the wireless messaging system 114. The address enables the transmission of the downlink message 222 from the wireless system controller 214 only to the mobile device having the address, and identifies the messages and responses received at the wireless system controller 214 from the mobile device with the address. In one embodiment, each of the plurality of mobile devices 226 also has a pin number assigned thereto, the pin number being associated with a telephone number within the PSTN 210. A list of the assigned addresses and correlated telephone numbers for each of the plurality of mobile devices 226 is stored in the wireless system controller 214 in the form of a subscriber database 248.

Preferably, at least one messaging client operates within a mobile device. For example, as illustrated in FIG. 9, the first messaging client 14 operates within the first mobile device 228 and the second messaging client 20 operates within the second mobile device 230. Similarly, a plurality of messaging clients can operate within the same mobile device. For example, a third messaging client 250 and a fourth messaging client 252 operate within the third mobile device 232. It will be appreciated by one of ordinary skill in the art that, in accordance with the present invention, a mobile device can include no messaging client, one messaging client, or a plurality of messaging clients.

In one embodiment of the present invention, the message server 172 is coupled to the wireless system controller 214 of the wireless messaging system 114. The message server 172 provides a means for real time electronic message communication with the plurality of mobile devices 226. The message server 172, for example, receives a request and can in response to such receipt, sends a response, both via the wireless system controller 214. The wireless system controller 214 then routes the response to the requesting device which may be a message input device, such as the telephone 204, the computer 206, or the desktop messaging unit 208, or alternatively may be an individual or one of the plurality of mobile devices 226. In the following description, the term requester refers to any of the requesting devices mentioned above or an equivalent.

Preferably, the message server 172 includes a server address 254, which is a unique selective call address in the wireless messaging system 114. The server address 254 enables the transmission, via the inbound RF channel 240, to the message server 172 of various real time electronic communication messages such as conversation service requests, subscription requests, conversation messages, availability settings, and other information. The message server 172 similarly sends real time electronic communication messages such as sending an availability setting or the forwarding of a session message to the plurality of mobile devices 226 via the outbound RF channel 234. Furthermore, the message server 172 can also have a pin number assigned thereto, the pin number being associated with a telephone number within the PSTN 210. The server address 254 and correlated telephone number is stored in the in the subscriber database 248 of the wireless system controller 214.

The coupling of the message server 172 to the wireless messaging system 114 enhances the operation of the wireless messaging system 114 by adding intelligence for multiple mobile devices to communicate in substantially real time. The message server 114 interactively manages the messaging traffic associated with the plurality of messaging sessions 24 in an efficient manner.

Figure 10:
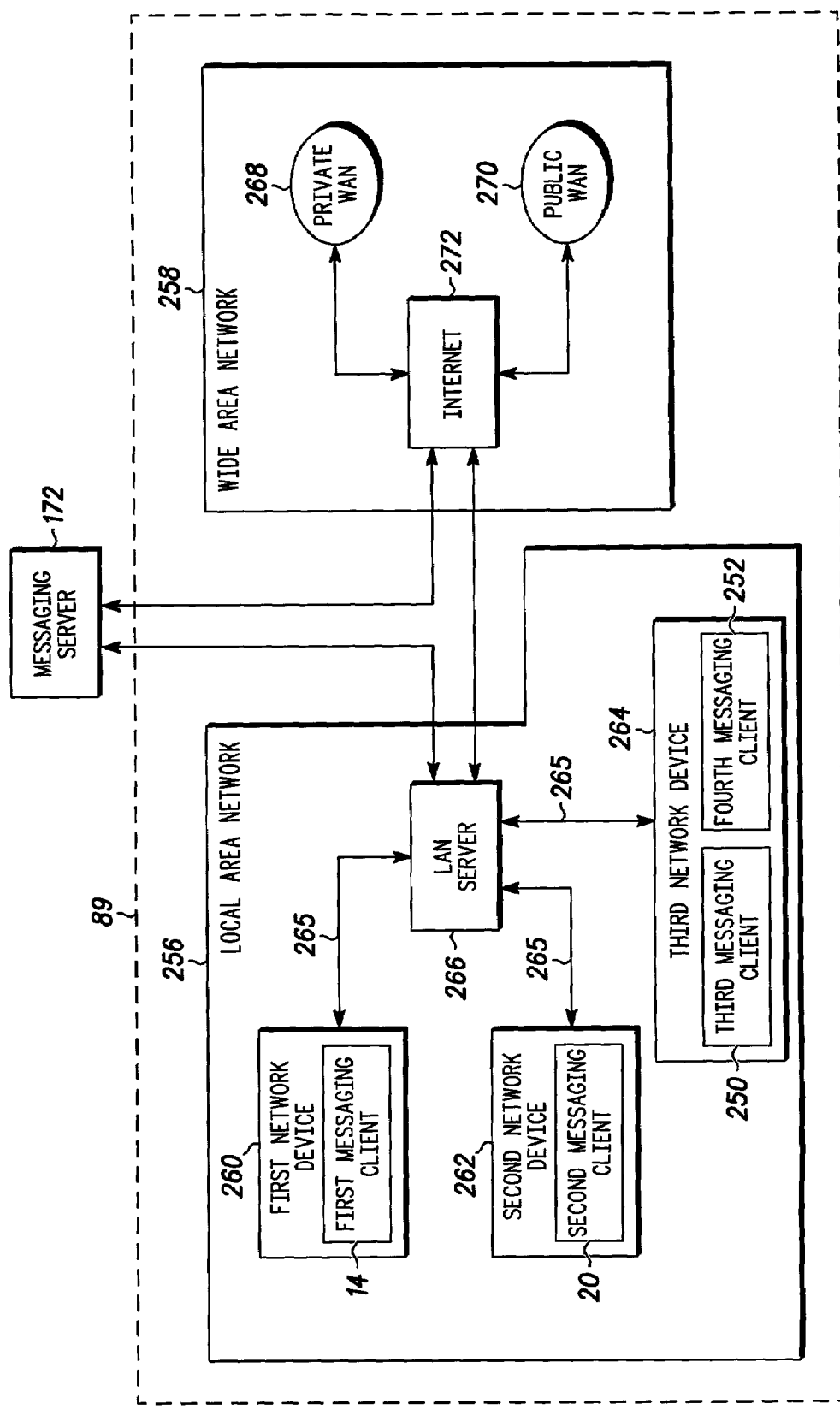

FIG. 10 is an electronic block diagram of one embodiment of the messaging communication system 10, 170 of FIGS. 1 and 8 respectively. Specifically, FIG. 10 illustrates an embodiment of the present invention in which the messaging communication system 10, 170 is the wired messaging system 89 of FIG. 5. The wired messaging system 89, for example, can include a LAN 256 (local area network), a WAN 258 (wide area network), or a combination of LAN 256 and WAN 258 networks. It will be appreciated that while only a single LAN 256 and a single WAN 258 are shown, multiple LAN 256 networks and/or WAN 258 networks can be interconnected in a manner well known to one of ordinary skill in the art for the transfer of electronic communication such as electronic mail (email), and real time electronic messaging (i.e.: instant messaging and chat messaging) including the plurality of session messages 61.

The general function and operation of the LAN 256 is one of allowing spatially co-located computers which are typically located within a room, building or campus of buildings to communicate with each other and/or share common resources on a computer network in a manner well known to one of ordinary skill in the art. The spatially co-located computers are represented pictorially in FIG. 10 as a plurality of messaging devices, such as the fixed network device 50 of FIG. 5, three of which are shown by example. (a first network device 260, a second network device 262, and a third network device 264) Each of the plurality of messaging devices communicates using a network connection 265. Preferably, at least one messaging client operates within a network device. For example, as illustrated in FIG. 10, the first messaging client 14 operates within the first network device 260 and the second messaging client 20 operates within the second network device 262. Similarly, a plurality of messaging clients can operate within the same network device. For example, the third messaging client 250 and the fourth messaging client 252 operate within the third network device 264. It will be appreciated by one of ordinary skill in the art that, in accordance with the present invention, a network device can include no messaging client, one messaging client, or a plurality of messaging clients.

Typical resources shared on the LAN 256 through a LAN server 266 are files on a file server, printers on a print server, and electronic message (email) services on an email server. The LAN 256 uses a physical network such as ARCNET, Ethernet, Token-ring, Local Talk or other network media to connect the computers, which represent wired network nodes into the network. The LAN 256 can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication between E-mail clients and the E-mail server. In the following description, the term "local area network" refers to a network utilizing any of the networking protocols mentioned above or an equivalent. The LAN 256 can also use routers (not shown) to subnet the LAN 256 organizationally or physically. In this context, the definition of the LAN 256 as described herein refers to a geographic locality of computers and the type of wired media used to interconnect the computers for communication.

The general function and operation of the WAN 258 is also one of allowing computers to share common resources. However, in this context the definition used herein is one where the computers are not spatially co-located. The typical resources shared are similar to, if not the same, as found in the LAN 256. However, the WAN 258 uses a different physical network media such as X.25, Frame Relay, ISDN, Modem dial-up or other media to connect other computers or other local area networks to the WAN 258 network. The WAN 258, for example, can include a number of well-known private wide area networks, one (268) of which is shown by example; and public wide area networks, one (270) of which is show by example, such as CompuServe™, America Online™ (AOL), the MIT computer network, the Motorola™ computer network and Prodigy™. In the following description, the term "wide area network" refers to any of the networks mentioned above or an equivalent. The WAN 258 described above can operate independently, or can be interconnected through the well-known worldwide Internet computer network 272. Likewise, the LAN 256 can also be interconnected to the WAN 258 through the worldwide Internet computer network 272, as shown, in a manner well known to one of ordinary skill in the art.

In a one embodiment of the present invention, the message server 172 is coupled to the LAN 256 and to the WAN 258 of the wired messaging system 89. The message server 172 provides a means for real time electronic message communication with all messaging devices communicating within the wired messaging system 89 such as the first network device 260, the second network device 262, and the third network device 264. The message server 172, for example, receives a request and preferably in response to such receipt, sends a response, via the LAN server 266, via the worldwide Internet computer network 272, or an equivalent. The LAN server 266, the worldwide Internet computer network 272, or the equivalent then routes the response to the requesting device, which can be an individual or one of the networked devices. In the following description, the term requester refers to any of the requesting devices mentioned above or an equivalent.

Figure 11:
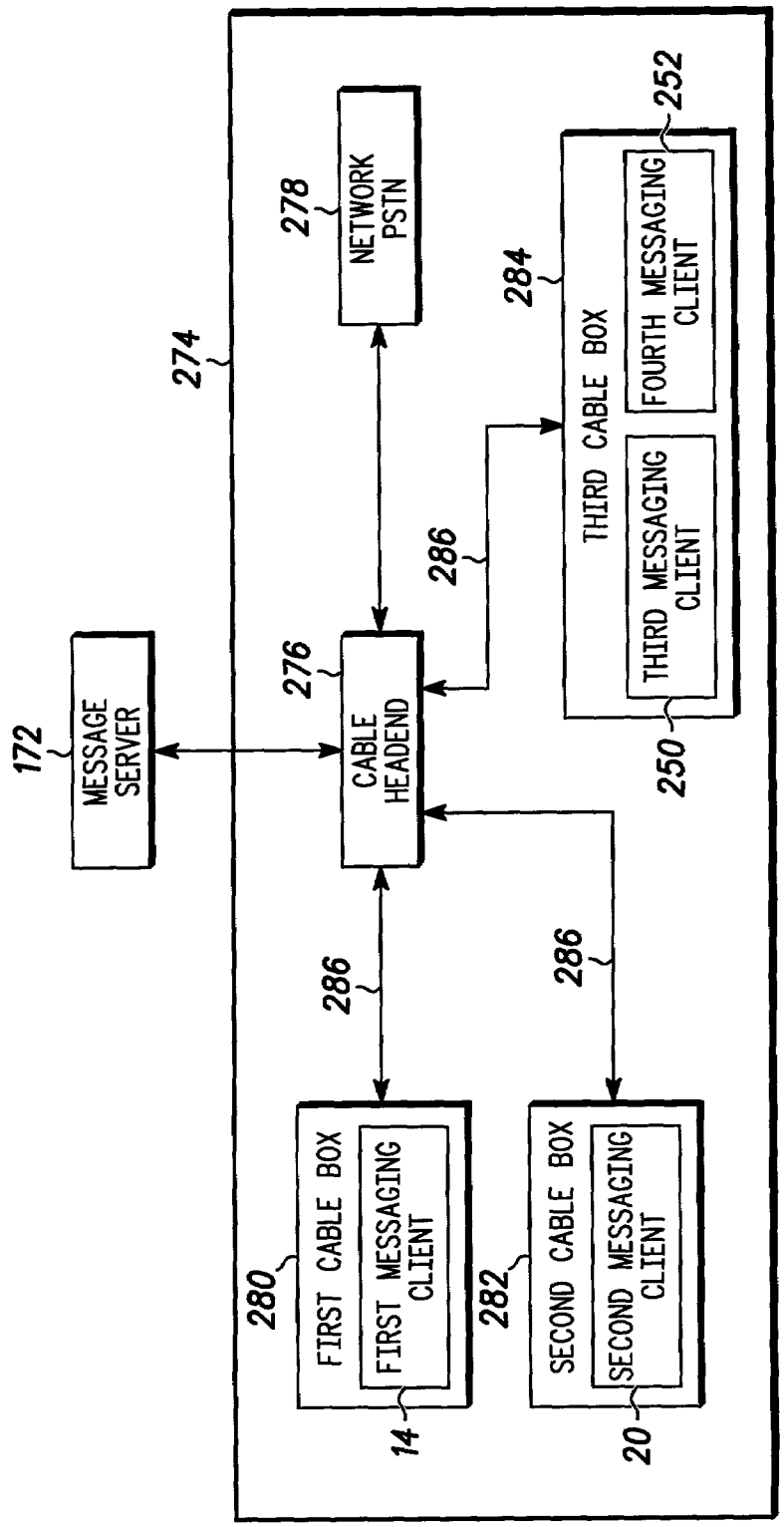

FIG. 11 is an electronic block diagram of one embodiment of the messaging communication system 10, 170 of FIGS. 1 and 8 respectively. Specifically, FIG. 11 illustrates an alternate embodiment of the present invention in which the messaging communication system 10, 170 is the wired messaging system 89 of FIG. 5. The wired messaging system 89 illustrated in FIG. 11 is, for example, a broadcast messaging system 274.

The broadcast messaging system 274 preferably includes a cable headend 276, a network PSTN 278, and a plurality of cable boxes, such as the cable box 136 of FIG. 7, three of which are shown by way of example. (a first cable box 280, a second cable box 282, and a third cable box 284. Each of the plurality of cable boxes communicates within the broadcast messaging system 274 via a wired connection 286. Preferably, at least one messaging client operates within a cable box. For example, as illustrated in FIG. 11, the first messaging client 14 operates within the first cable box 280 and the second messaging client 20 operates within the second cable box 282. Similarly, a plurality of messaging clients can operate within the same cable box. For example, the third messaging client 250 and the fourth messaging client 252 operate within the third cable box 284. It will be appreciated by one of ordinary skill in the art that, in accordance with the present invention, a cable box can include no messaging client, one messaging client, or a plurality of messaging clients.

The cable headend 276 is coupled to the first cable box 280, the second cable box 282, the third cable box 284, the network PSTN 278, and, in one embodiment, the message server 172. The cable headend 276 enables operators to deliver services such as conventional video and audio broadcasting, NVOD, VOD, Pay TV, advertising, information, interactive shopping and more. The cable headend 276 preferably offer functions such as MPEG-2/DVB encoding of local and non-compressed programs, insertion of local advertising and events data insertion, conditional access (CA) scrambling, interactive services, and monitoring and control of the entire network. At the multiplexing stage, broadcasters can create program bouquets and add PSI/SI information before the outgoing transport stream is delivered to a conditional access (CA) system for scrambling. Following processing, transport streams are modulated and then transmitted to the cable headend 276 via telecom networks, terrestrial or satellite systems.

In one embodiment of the present invention, the message server 172 is coupled to the cable headend 276 of the broadcast messaging system 274. The message server 172 provides a means for real time electronic message communication with all cable boxes communicating within the broadcast messaging system 274. The message server 172, for example, receives a request and preferably in response to such receipt, sends a response via the cable headend 276. The cable headend 276 then routes the response to the requesting device, which can be an individual, or can be a cable box. In the following description, the term requester refers to any of the requesting devices mentioned above or an equivalent.

Figure 12:
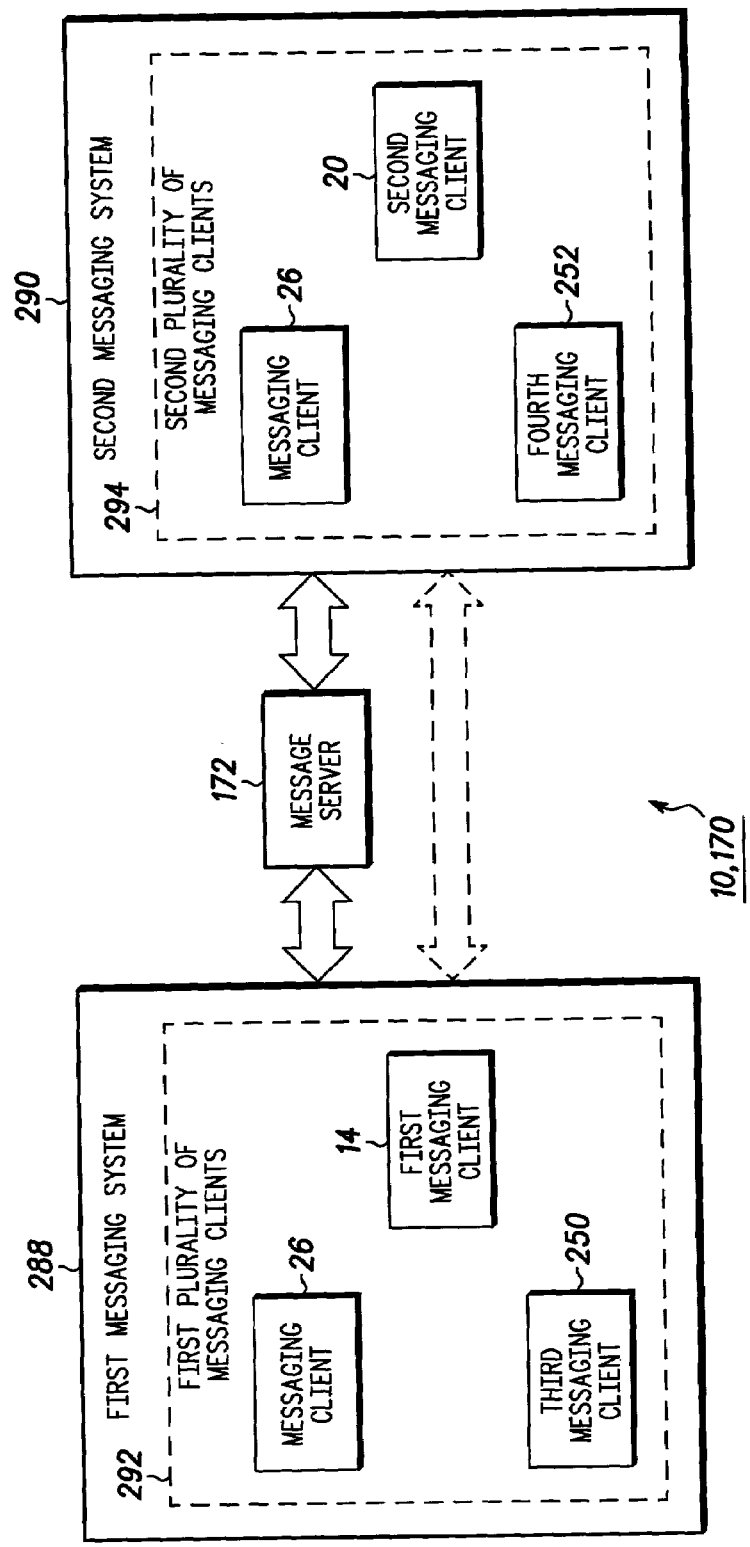

FIG. 12 is an electronic block diagram illustrating an alternative embodiment of the messaging communication system 10,170 in accordance with the present invention. As illustrated, the messaging communication system 10,170 preferably includes a first messaging system 288 having a first plurality of messaging clients 292, and a second messaging system 290 having a second plurality of messaging clients 294. In one embodiment, the messaging communication system 10,170 also includes the message server 172. It will be appreciated by one of ordinary skill in the art that while only two messaging systems are shown by way of example, multiple messaging systems can be interconnected in a manner well known to one of ordinary skill in the art for the transfer of electronic communication such as electronic mail (email), and real time electronic messaging (i.e.: instant messaging and chat messaging) either directly between the messaging systems and/or by using the messaging server 172.

It will be appreciated by one of ordinary skill in the art that, in accordance with the present invention, the first messaging system 288 and the second messaging system 290 can be the wireless messaging system 114 of FIG. 9, the wired messaging system 89 of FIG. 10, the broadcast messaging system 274 of FIG. 11 or any other equivalent messaging system. Further, in accordance with the present invention, the messaging communication system 10,170 can include a plurality of wireless messaging systems, a plurality of wired messaging systems, or any combination thereof. Similarly, each messaging client of the first plurality of messaging clients 292 and the second plurality of messaging clients 294 can operate within the mobile device 90 of FIG. 6, the fixed network device 50 of FIG. 5, or the cable box 136 of FIG. 7. The first plurality of messaging clients 292 and the second plurality of messaging clients 294, in accordance with the present invention, can include a plurality of wireless messaging devices, a plurality of wired messaging devices, a plurality of networked devices, or any combination thereof.

Figure 13:
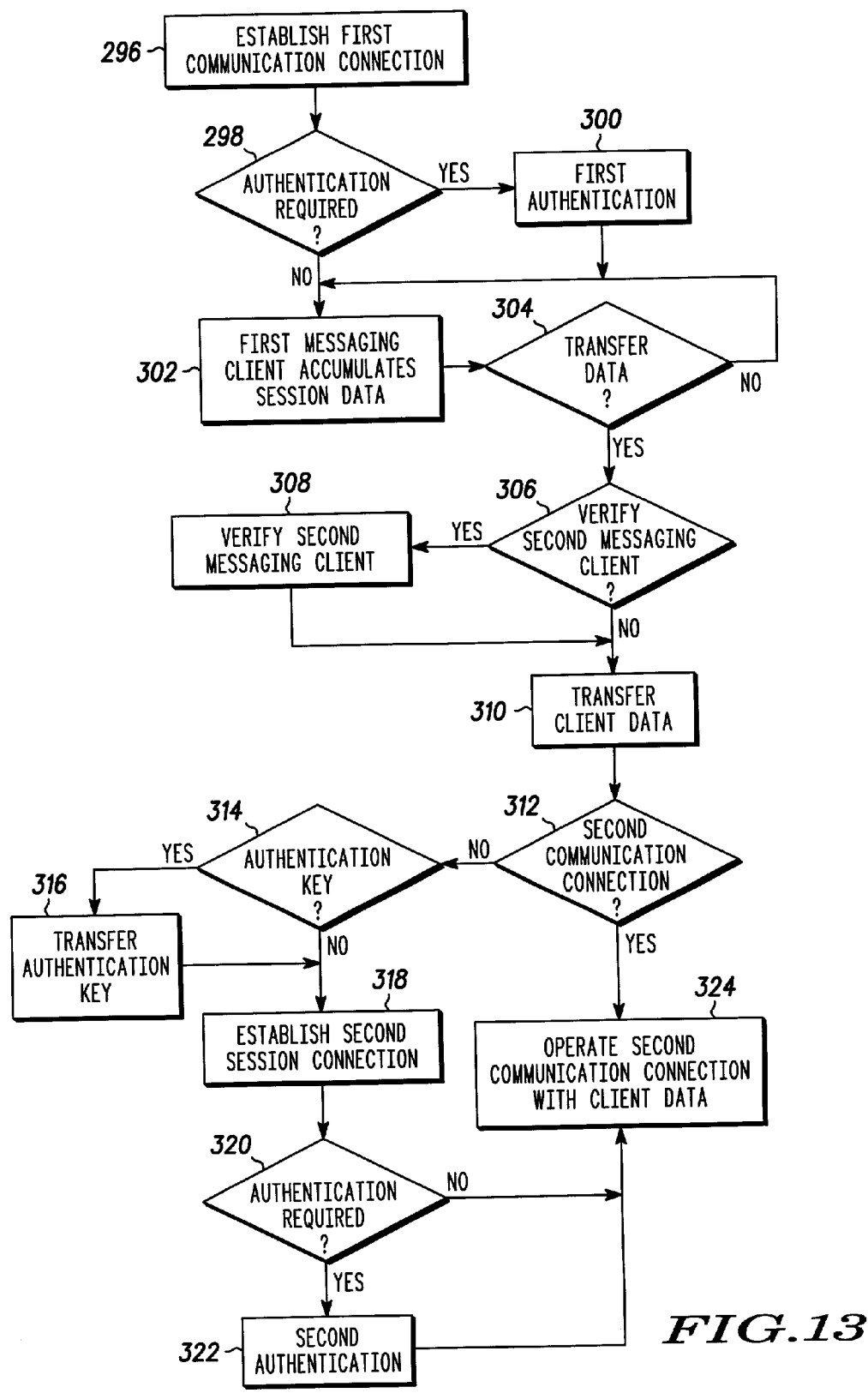
FIGS. 13 to 18 are flowcharts illustrating the operation of the messaging communication system of FIGS. 1 and 8, in accordance with the preferred embodiment of the present invention.

FIG. 13 is a flowchart illustrating the operation of the messaging communication system 10,170 in accordance with the present invention. Beginning with Step 296, the first messaging client 14 establishes the first communication connection 16 for communication within at least one of the plurality of messaging sessions 24 within the messaging communication system 10,170. For example, when the first messaging client 14 operates within the fixed network device 50, the first messaging client 14 accesses the appropriate network and notifies the messaging communication system 10,170 of its connection information (i.e.: IP address and number of the port assigned to the first messaging client 14). Next, in Step 298, the process determines whether or not an authentication is required. It will be appreciated by one of ordinary skill in the art that an authentication can be required of the first messaging client 14, of the first account user 29 utilizing the first messaging client 14, or of the messaging device in which the first messaging client 14 operates, or an equivalent. In Step 300, when an authentication is required in Step 298, a first authentication is performed. The first authentication of Step 300 checks that the first account user 29 or alternatively the first messaging client 14 is authorized to establish the first communication connection 16 and/or authorized to participate within one or more of the plurality of messaging sessions 24. Next, in Step 302, when the first authentication of Step 300 is completed, and also when the authentication is not required in Step 298, the first messaging client 14 operates using the first communication connection 16 and accumulates the plurality of session data 36 for each messaging session 40 for which the first messaging client 14 is participating. In accordance with the present invention, the plurality of session data 36 can include the session identifier 41, the session priority 42, the session preferences 43, the session participants 44, or the session history 45. It will be appreciated by one of ordinary skill in the art that the plurality of session data 36 can include any of the items mentioned herein or an equivalent. Next, in Step 304, the process determines whether a data transfer is required or requested. A data transfer, in accordance with the present invention, is the capability for a first account user 29 to change communication means within the messaging communication system 10, 170 from the first messaging client 14 to the second messaging client 20. For example, when the first account user 29 establishes the first communication connection 16 using the fixed network device 50 and thereafter needs to become mobile, the first account user 29 can transfer the first client data 17 including the plurality of session data 36 accumulated for the first communication connection 16 to the second messaging client 20 which for example can operate on the mobile device 90. When no data transfer is required or requested in Step 304, the first communication connection 16 is maintained in Step 302, whereby the first messaging client 14 continues to accumulate the plurality of session data 36 for each messaging session 40 for which the first messaging client 14 participates. In Step 306, when a data transfer is required or requested in Step 304, the process determines if it is necessary to verify the second messaging client 20 prior to transferring the first client data 17 including the plurality of session data 36 to the second messaging client 20. When verification of the second messaging client 20 is required, the second messaging client 20 is verified in step 308. For example, the first messaging client 14 and the second messaging client 20 can both be pre-configured with a private value and the first messaging client 14 can exchange messages with the second messaging client 20 that verify that the second messaging client 20 has the correct private value. Next, in Step 310, after the second messaging client 20 is verified in Step 308 or when no verification is required in Step 306, the first client data 17 including the plurality of session data 36 is transferred from the first messaging client 14 to the second messaging client 20. It will be appreciated by one of ordinary skill in the art that a portion of the first client data 17 can alternatively be transferred in Step 310. It will further be appreciated by one of ordinary skill in the art that the transfer of the first client data 17 can be accomplished using a direct connection between the first messaging client 14 and the second messaging client 20 or a connection through the message server 172, both either via a network connection, a wireless connection such as through the wireless communication system 114, a Bluetooth connection, or IRDA connection, a wired connection such as through the wired communication system 89, a network connection separate from the wireless communication system, an RS-232 connection or the broadcast messaging system 274, or an equivalent.

Next, in Step 312, the process determines whether or not the second communication connection 22 has already been established. For example, the second messaging client 20 can establish the second communication connection 22 independently from the establishment of the first communication connection 16 by the first messaging client 14. The second messaging client 20 can establish the second communication connection 22 but not yet be participating in a messaging session. Alternatively, the second messaging client 20 can independently be participating in one or more messaging session of the plurality of messaging session 24 which can be the same or different messaging sessions from the ones that the first messaging client 14 is participating. In Step 314, when no second communication connection 22 has been established for the second messaging client 20, the process determines whether or not the authentication key 33 is required. In Step 316, when the authentication key 33 is required in Step 314, the first messaging client 14 transfers the authentication key 33 to the second messaging client 20. It will be appreciated by one of ordinary skill in the art that the second messaging client 20 can include a plurality of authentication keys and that in step 316 the first messaging client 14 can send an indicator of which of the plurality of authentication keys should be used. It will be appreciated by one of ordinary skill in the art that an authentication key can be required of the second messaging client 20, of the first account user 29, or any other account user 30 utilizing the second messaging client 20, or of the particular messaging device in which the second messaging client 20 operates, or an equivalent. It will further be appreciated by one of ordinary skill in the art that the transfer of the authentication key 33 can be accomplished using a direct connection between the first messaging client 14 and the second messaging client 20 or a connection through the message server 172, both either via a network connection, a wireless connection such as through the wireless communication system 114, a Bluetooth connection, or IRDA connection, a wired connection such as through the wired communication system 89, a network connection separate from the wireless communication system, an RS-232 connection or the broadcast messaging system 274, or an equivalent. Next, in Step 318, when no authentication key is required in Step 314 or after the transfer of the authentication key in Step 316, the second communication connection 22 is established. The second messaging client 20 establishes the second communication connection 22 for communication within at least one of the plurality of messaging sessions 24 within the messaging communication system 10,170. For example, when the second messaging client 20 is the mobile device 90, the second messaging client 20 accesses the appropriate network through the wireless communication system 114 and notifies the messaging communication system 10,170 of its connection information (i.e.: the second address 244 of the second mobile device 230 when the second messaging client 20 operates within the second mobile device 230). Next, in Step 320, the process determines whether or not an authentication is required. It will be appreciated by one of ordinary skill in the art that an authentication can be required of the second messaging client 20, of the first account user 29, or any other account user 30 utilizing the second messaging client 20, or of the particular messaging device in which the second messaging client 20 operates, or an equivalent. In Step 322, when an authentication is required in Step 320, a second authentication is performed. Next, in Step 324, when the second communication connection 22 is already established in Step 312, or after the second session connection 22 is established in Step 318 and authentication is not required in Step 320, or after the second authentication in Step 322, the second communication connection 22 is operated using the first client data 17 including the plurality of session data 36 transferred from the first messaging client 14 to the second messaging client 20 in Step 310.

The method illustrated by the flowchart of FIG. 13 allows messaging sessions to be easily transferred between messaging clients while maintaining session continuity and assuring session security. The account user can switch to a different messaging client on a different messaging system without being required to re-initiate each messaging session that was in progress on the first messaging client. Session continuity is maintained within the two messaging clients, and optionally the transfer does not affect other messaging session participants.

Figure 14:
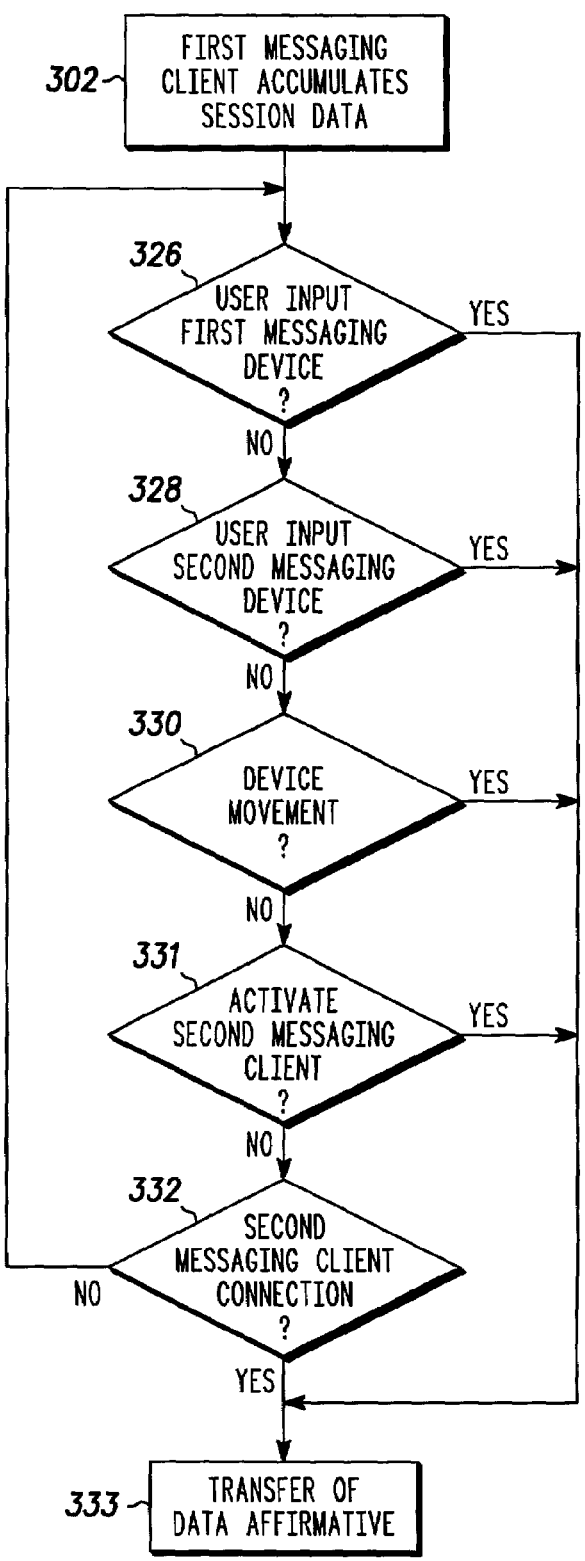

Similarly, the method illustrated by the flowchart of FIG. 13 allows messaging sessions to be easily transferred between different account users. For example, if the first account user 29 is a customer service representative and the first account user 29 is a participant in the plurality of messaging sessions 24 with customers. The first account user 29 may want to transfer a portion of the plurality of messaging sessions 24 to another account user 30 such as a second customer service representative. The second customer service representative would benefit from having access to the session history 45 of the transferred messaging sessions. For example, the second customer representative can avoid asking the customer for information already provided to the first account user 29. FIG. 14 is a flowchart illustrating more detail of the operation of the messaging communication system 10,170. Specifically, FIG. 14 illustrates various methods in which the data transfer query (Step 304 of FIG. 13) can be answered in the affirmative. The operation begins with Step 302, in which the first messaging client 14 operates using the first communication connection 16 and accumulates the plurality of session data 36 for each messaging session 40 for which the first messaging client 14 is participating. Next, in Step 326, the process determines whether or not the first messaging device in which the first messaging client 14 operates has received a user input requesting the transfer of at least a portion of the first client data 17 including the plurality of session data 36. For example, when the messaging device in which the first messaging client 14 operates is the fixed network device 50 of FIG. 5, the first account user 29 can enter and manipulate information (including requesting the transfer of the first client data 17) by the user input 88 to the user interface 64, e.g., the keyboard 66, the "mouse," 68, the pen or puck activated tablet (not shown), the trackball 70, the audio activated command recognition processor 72, or the like. Similarly, when the first messaging device in which the first messaging client 14 operates is the mobile device 90 of FIG. 6, the first account user 29 can enter a user input such as a button press, a series of button presses, a voice response, or some other similar method of manual response initiated by the first account user 29 to the device user interface 110 of the mobile device 90. Similarly, when the first messaging device in which the first messaging client 14 operates is the cable box 136 of FIG. 7, the user input is made via the cable box user interface 160. It will be appreciated by one of ordinary skill in the art that the user input can be any of the inputs mentioned herein or an equivalent. When a user input requesting the transfer of at least a portion of the first client data 17 including the plurality of session data 36 is not received by the first messaging device in which the first messaging client 14 operates, the process next, in Step 328 determines whether a user input requesting the transfer of at least a portion of the first client data 17 including the plurality of session data 36 has been received by a second messaging device in which the second messaging client 20 operates. For example, when the second messaging device in which the second messaging client 20 operates is the fixed network device 50 of FIG. 5, the first account user 29 can enter and manipulate information (including requesting the transfer of the first client data 17) by the user input 88 to the user interface 64, e.g., the keyboard 66, the "mouse," 68, the pen or puck activated tablet (not shown), the trackball 70, the audio activated command recognition processor 72, or the like. Similarly, when the second messaging device in which the second messaging client 20 operates is the mobile device 90 of FIG. 6, the first account user 29 of the mobile device 90 can enter a user input such as a button press, a series of button presses, a voice response, or some other similar method of manual response initiated by the first account user 29 to the device user interface 110 of the mobile device 90. Similarly, when the second messaging device in which the second messaging client 20 operates is the cable box 136 of FIG. 7, the user input is made via the cable box user interface 160. It will be appreciated by one of ordinary skill in the art that the user input can be any of the inputs mentioned herein or an equivalent. When a user input requesting the transfer of at least a portion of the first client data 17 including the plurality of session data 36 is not received by the second messaging device in which the second messaging client 20 operates, the process next, in Step 330 determines whether the second messaging client 20 is the mobile device 90, and if so, whether the transfer of at least a portion of the first client data 17 including the plurality of session data 36 is initiated in response to detection of a movement of the mobile device 90. For example, the server processor 174 of the message server 172 can be programmed to track the location of each of the plurality of messaging clients 12, and transfer the plurality of session data 36 to the second messaging client 20 in response to the detection of a change of location of the mobile device 90 in which the second messaging client 20 operates. Alternatively, the mobile device 90 can include location-sensing capabilities such as a Global Positioning Satellite receiver, and in response to the detection of a change of location, send a request to transfer the plurality of session data 36. Alternatively, the second messaging device in which the second messaging client 20 operates can detect its removal from a charging base. Alternatively, the second messaging device in which the second messaging client 20 operates may have a motion-sensing device such as a tilt sensor whose electrical properties change when under motion. When no device movement is detected or alternatively a device movement program is not included in either the mobile device 90 or the message server 172, in Step 330, the process continues to Step 331 in which it is determined whether or not the transfer of at least a portion of the first client data 17 including the plurality of session data 36 is required due to the activation of the second messaging client 20. The activation of the second messaging client 20 can be, for example, in response to a user input to a power circuit that powers the second messaging client 20. Alternatively, the activation of the second messaging client 20 can be in response to an instruction command to activate sent from CPU 53 to the fixed messaging client 84 of the fixed network device 50, from the processor 102 to the mobile messaging client 112 of the mobile device 90, or from the controller 138 to the cable messaging client 40 of the cable box 136. In one embodiment of the present invention, the message server 172 is programmed to detect the activation of the second messaging client 20. In an alternate embodiment, the second messaging client 20 can request the transfer of at least a portion of the first client data 17 including the plurality of session data 36 upon being activated. When the second messaging client 20 is not activated in Step 331, the process continues to Step 332 in which it is determined whether the second messaging client 20 has connected to the message server 172. When no connection of the second messaging client 20 is detected, the process returns to Step 326 and continues checking for the various methods in which the data transfer query (Step 304 of FIG. 13) can be answered in the affirmative. In Step 333, when there is an affirmative answer to any of the previous Steps 326 to 332, the query of Step 304 of FIG. 13 of whether or not to transfer data is answered in the affirmative.

Figure 15:
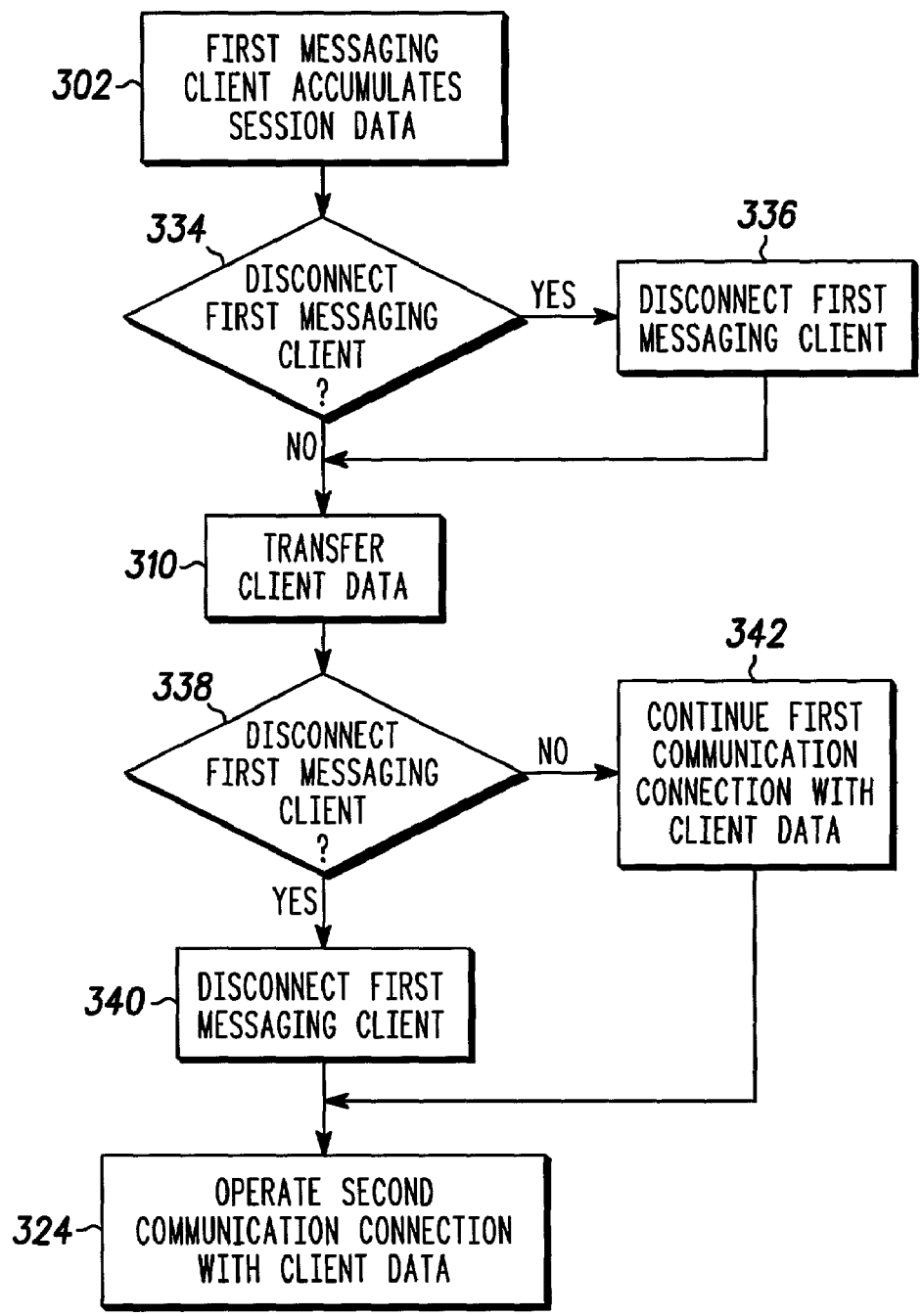

FIG. 15 is a flowchart illustrating more detail of the operation of the messaging communication system 10,170. Specifically, FIG. 15 illustrates various ways in which the first messaging client 14 can operate in relation to the transfer of the plurality of the first client data 17. The operation begins with Step 302, in which the first messaging client 14 operates using the first communication connection 16 and accumulates the plurality of session data 36 for each messaging session 40 for which the first messaging client 14 is participating. Next, in Step 334, the process determines whether it is required or requested to disconnect the first messaging client 14 from the first communication connection 16. When it is required or requested to disconnect the first messaging client 14 from the first communication connection 16, in Step 336 the first messaging client 14 is disconnected from the first communication connection 16. Next, in Step 310, when the first messaging client 14 is disconnected from the first communication connection 16 in Step 336 and when it is not desired to disconnect the first messaging client 14 from the first communication connection 16 in Step 334, at least a portion of the first client data 17 including the plurality of session data 36 is transferred from the first messaging client 14 to the second messaging client 20. Next, in Step 338, the process once again determines whether it is required or requested to disconnect the first messaging client 14 from the first communication connection 16. In Step 340, when it is required or requested to disconnect the first messaging client 14 from the first communication connection 16, the first messaging client 14 is disconnected from the first communication connection 16.

When no disconnection of the first messaging client 14 is required or requested in Step 338, the process moves to Step 342 in which the first messaging client 14 continues the first communication connection 16 using the first client data 17 and accumulating the plurality of session data 36. Next, in Step 324, and also after disconnecting the first messaging client 14 in Step 340, the second messaging client 20 operates the second communication connection 22 using the transferred portion of the first client data 17 including the plurality of session data 36.

The flowchart of FIG. 15 as described herein provides an efficient and flexible method for disconnecting the first messaging client 14 from the first communication connection 16 prior to the transfer of the first client data 17 including the plurality of session data 36 or after the transfer of the first client data 17 including the plurality of session data 36. Further, it provides a method for the continued operation of the first messaging client 14 on the first communication connection 16 and the second messaging client 20 on the second communication connection 22 using the same plurality of session data 36 included in at least a portion of the first client data 17.

Figure 16:
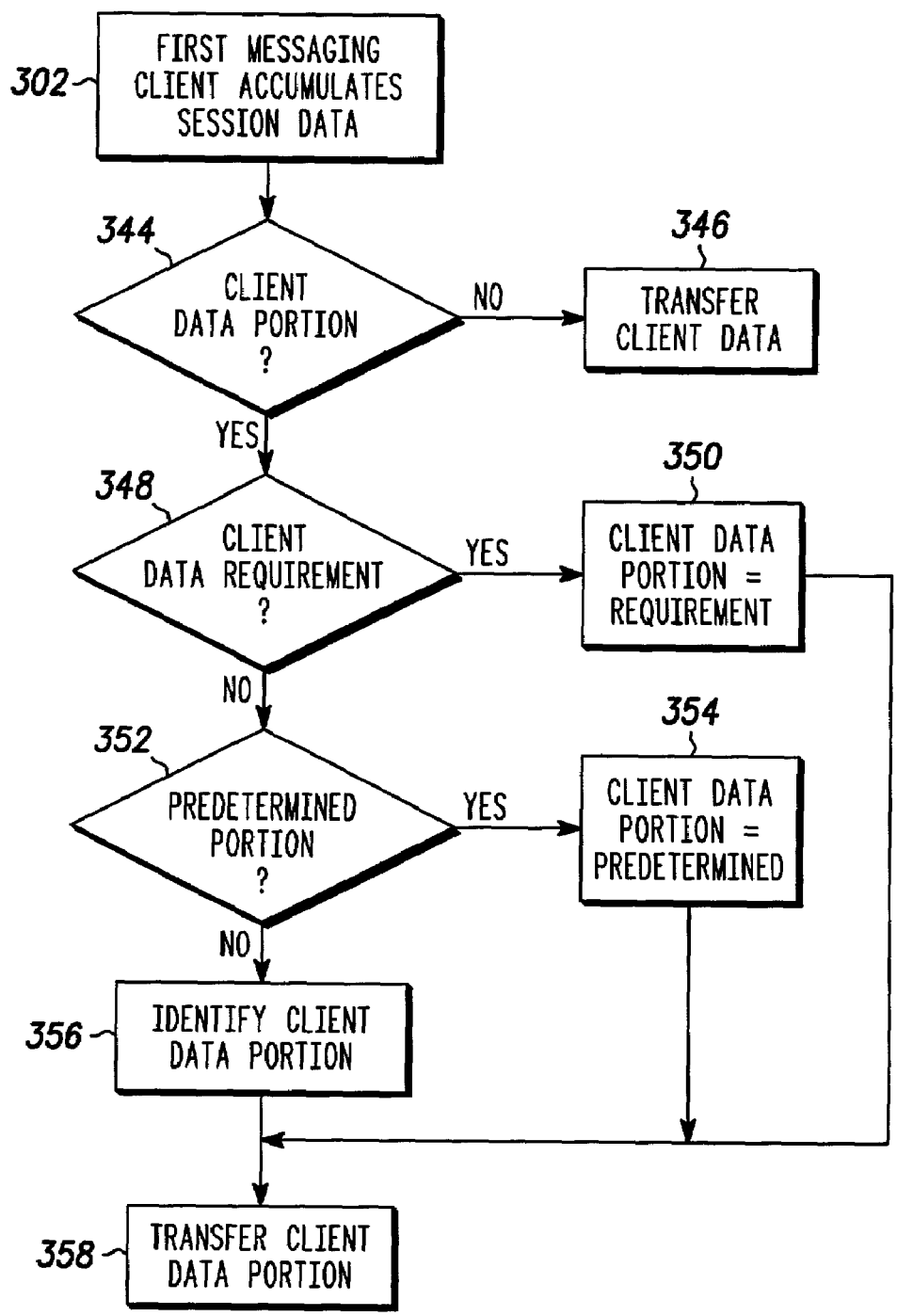

FIG. 16 is a flowchart illustrating more detail of the operation of the messaging communication system 10,170. Specifically, FIG. 16 illustrates more detail of the transfer of the first client data 17 from the first messaging client 14 to the second messaging client 20 or alternatively a portion of the first client data 17 such as the client data portion 18 or alternatively the session portion 49. The operation begins with Step 302, in which the first messaging client 14 operates using the first communication connection 16 and accumulates the plurality of session data 36 for each messaging session 40 for which the first messaging client 14 is participating. While operating within the first communication connection 16, the first client data 17 of the first messaging client 14 includes both the client data such as the first client identifier 15 as well as an accumulation of the plurality of session data 36. Next, in Step 344, the process determines whether only a portion of the first client data 17 such as the client data portion 18 or the session portion 49 is being transferred. In Step 346, when the entire first client data 17 is being transferred in Step 344, the first client data 17 is transferred from the first messaging client 14 to the second messaging client 20. Thereafter, the second client data 23 of the second messaging client 20 includes the first client data 17 along with any other client data already included within the second client data 23. It will be appreciated by one of ordinary skill in the art that the transfer of the first client data 17 can be accomplished using a direct connection between the first messaging client 14 and the second messaging client 20 or a connection through the message server 172 both either via a network connection, a wireless connection such as through the wireless communication system 114, a wired connection such as through the wired communication system 89 or the broadcast messaging system 274, or an equivalent.

Next, in Step 348, when a portion of the first client data 17 is being transferred, the process determines whether a client data requirement has been sent from the second messaging client 20 to the first messaging client 14. In Step 350, when a client data requirement has been sent from the second messaging client 20 to the first messaging client 14, the client data portion 18 is determined using the client data requirement. For example, due to memory limitations of the device in which the second messaging client 20 operates, the client data portion 18 can be a defined, limited portion of the session history 45. As another example, the client data requirement can be the plurality of user preferences 35 for the first messaging client 14 set by the first account user 29. It will be appreciated by one of ordinary skill in the art that the client data requirement can be a requirement for all or any portion of the first client data 17 sent from the second messaging client 20. When no client data requirement has been received by the first messaging client 14 from the second messaging client 20, the process moves to Step 352 in which the process determines whether a predetermined client data portion 18 has been programmed either into the first messaging client 14 or alternatively into the message server 172. In Step 354, when the predetermined client data portion 18 has been programmed, the client data portion 18 is determined using the predetermined client data portion 18. In Step 356, when no predetermined portion has been defined in Step 352, some other method is used to identify the client data portion 18. It will be appreciated by one of ordinary skill in the art that any other method can be used to identify the client data portion 18 in accordance with the present invention. Next, in Step 358, when the client data portion 18 has been identified in Step 350, 354, or 356, the client data portion 18 is transferred from the first messaging client 14 to the second messaging client 20. It will be appreciated by one of ordinary skill in the art that the transfer of the client data portion 18 can be accomplished using a direct connection between the first messaging client 14 and the second messaging client 20 or a connection through the message server 172, both either via a network connection, a wireless connection such as through the wireless communication system 114, a wired connection such as through the wired communication system 89 or the broadcast messaging system 274, or an equivalent.

The flowchart of FIG. 16 provides a method for limiting the amount of client data transferred from the first messaging client 14 to the second messaging client 20, optimizing the efficiency of the transfer of client data to maintain overall optimal system utilization.

Figure 17:
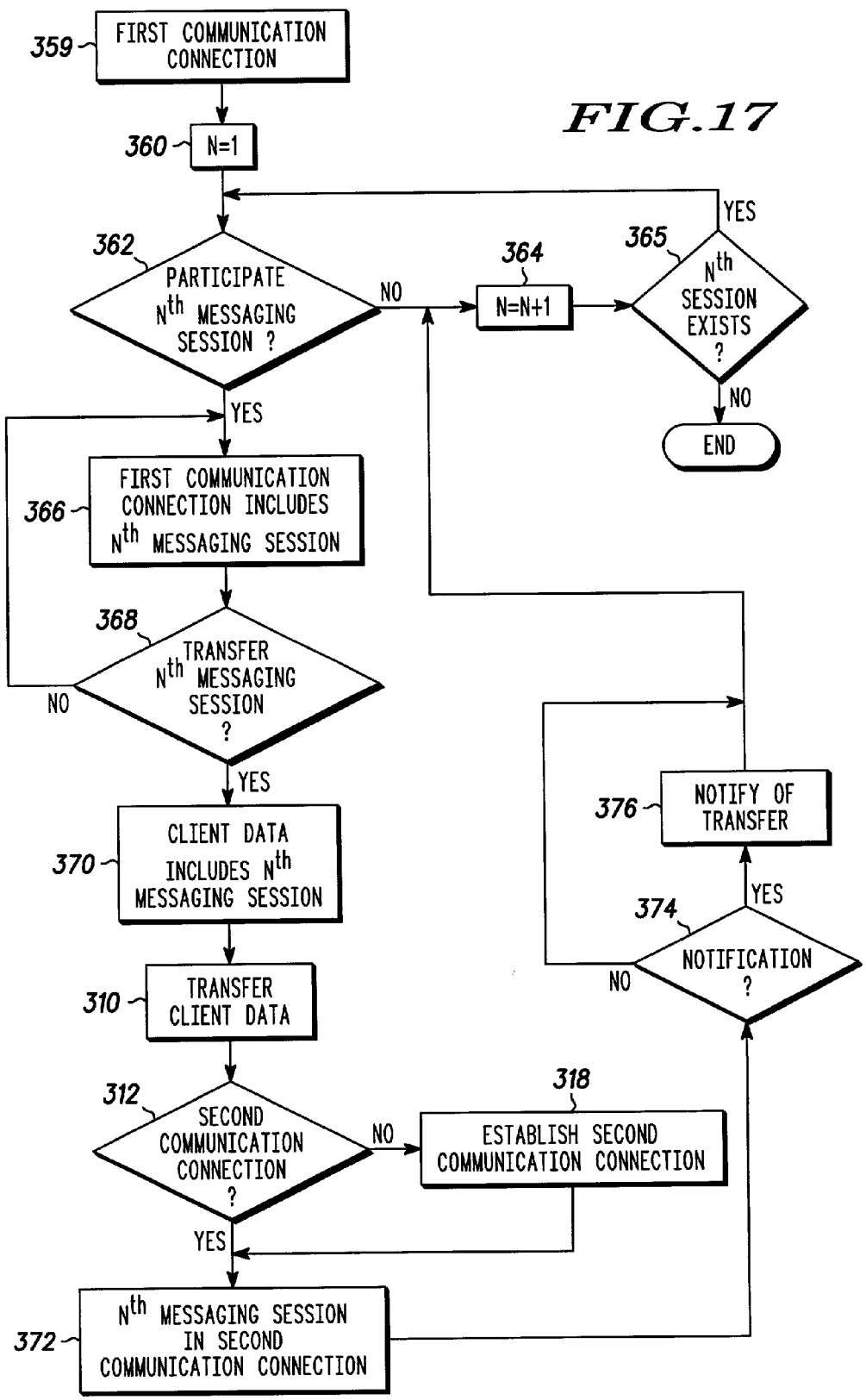

FIG. 17 is a flowchart illustrating further operation of the messaging communication system 10,170 in which the first messaging client 14 participates in a plurality of messaging sessions 24. The operation begins with Step 359 in which the first messaging client establishes the first communication connection 16. Next, in Step 360, a counter is set to N=1. Next, in Step 362, the process determines whether the first messaging client 14 is participating in an Nth messaging session. In Step 364, when the first messaging client 14 is not participating in the Nth messaging session, the counter is incremented by one (1). Next, in Step 365, the process determines whether or not the Nth messaging session exists. When the Nth session does not exist, the process ends. When the Nth messaging session does exist, the process returns to Step 362 in which it is determined whether the first messaging client 14 is participating in the Nth messaging session. In Step 366, when the first messaging client 14 is participating in the Nth messaging session in Step 362, the Nth messaging session including its associated session data is included in the first communication connection 16. Next, in Step 368, it is determined whether the Nth messaging session is requested or required to be transferred from the first messaging client 14 to the second messaging client 20. When the Nth messaging session is not requested or required to be transferred in Step 368, the process returns to Step 366 in which the first communication connection 16 continues to include the Nth messaging session. In Step 370, when, in Step 368, the Nth messaging session is being transferred, session data for the Nth messaging session is included in the plurality of session data 36 of the first client data 17. The session data included for the Nth messaging session can be, for example, the Nth session identifier 41, the Nth session priority 42, the Nth session preferences 43, the Nth session participants 44 and/or the Nth session history 45. Next, in Step 310, at least a portion of the first client data 17 including the session data for the Nth messaging session is transferred from the first messaging client 14 to the second messaging client 20. It will be appreciated by one of ordinary skill in the art that, in accordance with the present invention, the plurality of session data for each messaging session to be transferred can be transferred separately. Alternatively, in accordance with the present invention, the plurality of session data for all messaging sessions being transferred can be transferred at one time in one or more communications. Next, in Step 312, the process determines whether or not the second communication connection 22 has been established. In Step 318, when the second communication connection 22 has not been established, the second communication connection 22 is established. In Step 372, when the second communication connection 22 is already established in Step 312, or after the second communication connection 22 is established in Step 318, the Nth messaging session, along with any portion of the first client data 17 transferred, is included within the second communication connection 22 for the second messaging client 20. Next, in Step 374, the process determines whether a notification of data transfer is required or requested. In step 376, when a notification is required or requested, the notification is sent. It will be appreciated by one of ordinary skill in the art that the notification of data transfer can be sent for each messaging session separately. Alternatively, in accordance with the present invention, the notification of data transfer can be sent for all messaging sessions being transferred in one notification message. In accordance with the present invention, the notification of data transfer can be sent to at least one of the plurality of messaging clients 12 participating in the Nth messaging session. Alternatively or additionally, the notification of data transfer can be sent to the message server 172. The notification of data transfer can be sent from the first messaging client 14, from the second messaging client 20, from the message server 172, or an equivalent. Preferably, the notification includes the client profile 85 stored in the device in which the second messaging client 20 operates. The message communication system 10, 170, including one or more of the plurality of messaging clients 12 and/or the message server 172, can modify the content sent to the second messaging client 20 based on the client profile 85. Next, the process returns to Step 364 in which the counter is incremented.

Figure 18:
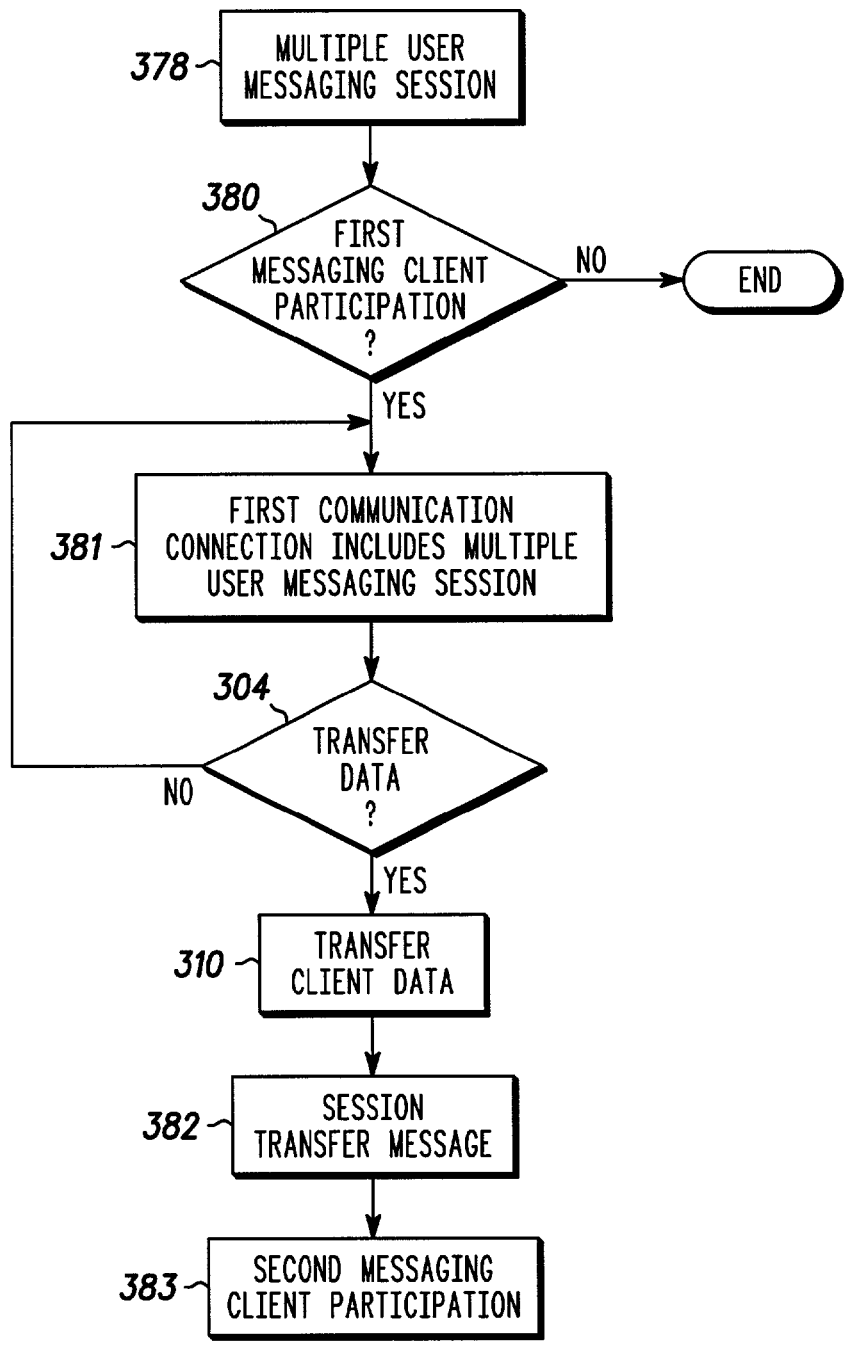

FIG. 18 is a flowchart illustrating one embodiment of the operation of the messaging communication system 170 in which the plurality of messaging sessions 24 includes the multiple user messaging session 19. The operation begins with Step 378 in which the multiple user messaging session 19 is established within the messaging communication system 170. The multiple user messaging session 19 includes the plurality of session messages 61 among the plurality of messaging clients 12. Next, in Step 380, the process determines whether the first messaging client 12 is participating in the multiple user messaging session 19. When the first messaging client 12 is not participating in the multiple user messaging session 19, the process ends. In Step 381, when the first messaging client 12 is participating in the multiple user messaging session 19, the first communication connection 16 includes the multiple user messaging session 19. Further, the data for the multiple user messaging session 19 is part of the plurality of session data 36. Data for the multiple user messaging session 19 can be, for example, the session identifier 41, the session priority 42, the session preferences 43, the session participants 44 and/or the session history 45 of the multiple user messaging session 19. Next, in Step 304, the process determines whether a data transfer is required or requested. When no data transfer is required or requested in Step 304, the first communication connection 16 including the multiple user messaging session 19 is maintained in Step 381. It will be appreciated by one of ordinary skill in the art that the plurality of session data 36 for the multiple user messaging session 19 is updated periodically as the multiple user messaging session 19 continues. (not shown) Next, in Step 310, when a data transfer is requested or required in Step 304 at least a portion of the first client data 17 including the plurality of session data 36 is transferred from the first messaging client 14 to the second messaging client 20.

Figure 19:
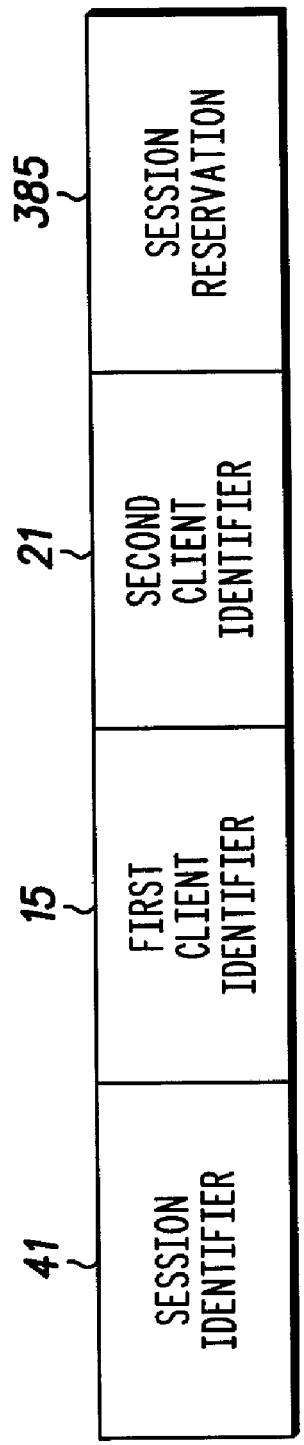
FIG. 19 illustrates a message for use within the messaging communication system of FIGS. 1 and 8, in accordance with the preferred embodiment of the present invention.

Next, in Step 382, a data transfer message 384 is sent to the message server 170. Preferably, the data transfer message 384 is as illustrated in FIG. 19. The data transfer message 384 preferably includes a session reservation 385. For example, the session reservation 385 could save a connection within the multiple user messaging session 19 for any messaging client that is being used by the same account identifier used in the first messaging client 14. As shown in FIG. 19, the data transfer message 384 alternatively includes the session identifier 41 of the multiple user messaging session 19, the first client identifier 15 of the first messaging client 14, the second client identifier 21 of the second messaging client 20, and the session reservation 385. The session reservation 385 saves a connection within the multiple user messaging session 19 for the second messaging client 20 having the second client identifier 21. It will be appreciated by one of ordinary skill in the art that the data transfer message 384 can be sent using a network connection, a wireless connection such as through the wireless communication system 114, a wired connection such as through the wired communication system 89 or the broadcast messaging system 274, or an equivalent.

Referring back to FIG. 18, next, in Step 383, the second messaging client 20 establishes the second communication connection 22 for participating within the multiple user messaging session 19. In one embodiment of the present invention, the message server 172 can require that Step 383 be performed within a specific time period after it received the data transfer message 384. (not shown) If this time is exceeded, the message server 172 can release the reserved seat to be used by any of the plurality of messaging clients 12. The operation of the message communication system 170 as illustrated in FIG. 18 provides a means for the first account user 29 to ensure that there is an opening within the multiple user messaging session 19 when the first account user 29 transfers at least a portion of the first client data 17 including the plurality of session data 36 (and accordingly the communication means) from the first messaging client 14 to the second messaging client 20. This operation is especially beneficial in situations in which there are a limited number of available openings within the multiple user messaging session 19 and the first account user 29 could lose his/her space during the transfer of data from one messaging client to another messaging client.

FIG. 20 is a signaling flow diagram illustrating an example of the interaction between the elements of the messaging communication system 10, 170, according to the present invention. Specifically, FIG. 20 illustrates the interaction between the first messaging client 14, the second messaging client 20, the messaging client 26, and the message server 172. In accordance with the present invention, as illustrated in FIG. 20, a second account user, such as the account user 30, logs onto the messaging client 26 and sends a notification signal 388 to the message server 172. Preferably, the notification signal 388 further includes the second account identifier of the second account user. The notification signal 388 for example, includes the connection information (i.e.: IP address and number of the port assigned to the messaging client) of the messaging client 26. Similarly, the first account user 29 logs onto the first messaging client 14 and sends a notification signal 386 to the message server 172. The notification signal 386 for example, includes the connection information (i.e.: IP address and number of the port assigned to the messaging client) of the first messaging client 14. Preferably, the notification signal 386 also includes the first account identifier of the first account user 29. It will be appreciated by one of ordinary skill in the art that alternatively, the notification signals 386 and 388 can be sent directly to one or more of the plurality of messaging clients 12. In response to receiving the notification signal 386 from the messaging client 26, and receiving the notification signal 388 from the first messaging client 14, the message server 172 sends a client availability signal 390 to the messaging client 26. The client availability signal 390 informs the second account user via the messaging client 26 that the first account user 29 is available for real time electronic communications such as for participation in one or more of the plurality of messaging sessions 24. Similarly, in response to receiving the notification signal 386 from the messaging client 26, and receiving the notification signal 388 from the first messaging client 14, the message server 172 sends a client availability signal 392 to the first messaging client 14. The client availability signal 392 informs the first account user 29 via the first messaging client 14 that the second account user is available for real time electronic communications such as for participation in one or more of the plurality of messaging sessions 24. Next, the first account user 29 initiates the messaging session 40 with the second account user by sending a session message 394 to the message server 172. The message server 172, acting as a store and forward device, sends a session message signal 396 containing substantially the same message information as the session message 394 to the second account user via the messaging client 26. In response to receiving the session message signal 396, a window is created on the display of the messaging device in which the second messaging client 26 operates and the session message 46, preferably along with the first account identifier of the first account user 29, is displayed in the created window. Next, the second account user via the messaging client 26 sends a response message 398 to the message server 172. The message server 172, acting as a store and forward device, sends a response message signal 400 to the first account user 29 via the first messaging client 14 containing substantially the same message information as the response message 398. In response to receiving the response message signal 400, the created messaging session window is updated on the display of the messaging device in which the first messaging client 14 operates and the session message contained within the response message 398, preferably along with the second account identifier of the second account user, is displayed. Although one session message 394 and one response message 398 is illustrated by way of example in FIG. 20, it will be appreciated by one of ordinary skill in the art that the messaging session 40 between the first account user's first messaging client 14 and the second account user's messaging client 26 can include a plurality of session messages and a plurality of response messages. Further, although the interaction of two account users and two messaging clients is illustrated by way of example in FIG. 20, it will be appreciated by one of ordinary skill in the art that the messaging session 40 can include a plurality of messaging clients and an associated plurality of account users. Further, it will be appreciated by one of ordinary skill in the art that the session message 394 can be sent directly from the first messaging client 14 to the messaging client 26; and similarly the response message 398 can be sent directly from the messaging client 26 to the first messaging client 14, without the interface of the message server 170, in accordance with the present invention.

According to the present invention, an account user can choose to initiate a data transfer. As illustrated in FIG. 20, the first account user 29 via the first messaging client 14 sends a transfer request signal 402 including at least a portion of the first client data 17 such as the plurality of session data 36 currently contained on the first account user's first messaging client 14 to the message server 172. The transfer request signal 402 preferably also includes a request to the message server 172 to transfer at least a portion of the first client data 17 including the plurality of session data 36 to a new messaging client such as the second messaging client 20. For example, the first messaging client 14 can be a fixed personal computer such as the fixed network device 50 in the office of the first account user 29. The first account user 29 has the need to become mobile. The second messaging client 20 can be a cellular telephone such as the mobile device 90. The first account user 29, according to the present invention, can pass the current messaging session from his/her personal computer to his/her cellular telephone with no loss of communication or of session data. Similarly, the transfer request signal 402 can include a request for the message server 172 to pass the plurality of session data 36 for more than one messaging session. In response to receiving the transfer request signal 402, the message server 172 determines whether the second messaging client 20 is currently connected onto the message server 172. (not shown) For example, the message server 172 determines whether the second messaging client 20 has established the second communication connection 22. When the second messaging client 20 is not currently connected with the message server 172, the message server 172 stores the plurality of session data 36 and/or the first client data 17 if so requested until the second messaging client 20 is connected. (not shown) When the second messaging client 20 is connected to the message server 172, the message server 172 sends the data signal 404 including the plurality of session data 36 and/or any portion of the first client data 17 received from the first messaging client 14 within the transfer request signal 404 to the second messaging client 20. The second messaging client 20 stores the plurality of session data 36 and/or the portion of the first client data 17 in memory and displays the session history 45 for access and use by the first account user 29 on the display of the messaging device in which the second messaging client 20 operates. It will be appreciated by one of ordinary skill in the art that the data signal 404 can include the plurality of session data 36 for one messaging session or for a plurality of messaging sessions, or can include the first client data 17 or the client data portion 18 of the first client data 17 for the first messaging client 14. Similarly the messaging device in which the second messaging client 20 operates can store one messaging session or a plurality of messaging sessions, the first client data 17 or the client data portion 18 of the first client data 17 in its memory in response to receiving the data signal 404. Preferably, in response to receiving the data signal 404, the second messaging client 20 sends an acknowledgement signal 406 to the message server 172. The message server 172 also preferably sends a transfer acknowledgement signal 410 to the first account user's first messaging client 14. The messaging session 40 seamlessly continues between the first account user 29 and the second account user through the second messaging client 20 and the messaging client 26 as illustrated by the plurality of session messages 412 to 422. The messaging session 40 continues seamlessly without the second account user being necessarily aware of the transfer of the first client data from the first account user's first messaging client 14 to his/her second messaging client 20. It will be appreciated by one of ordinary skill in the art that although only a second account user is shown in FIG. 20 by way of example, the messaging session 40 can continue seamlessly between a plurality of account users and associated plurality of messaging clients.

Preferably, the first messaging client 14 is disconnected from the messaging session 40 upon completion of the data transfer. (not shown) It will be appreciated by one of ordinary skill in the art that the first messaging client 14 can be automatically disconnected from the messaging session 40 or alternatively the first messaging client 14 can be disconnected manually by the first account user 29. Similarly, it will be appreciated by one of ordinary skill in the art the first messaging client 14 can continue to be active in the messaging session 40 along with the second messaging client 20. (not shown)

FIG. 21 is a signaling flow diagram illustrating the interaction between the elements of the messaging communication system 10,170, according to the present invention. Specifically, FIG. 21 illustrates the interaction between the first messaging client 14, the second messaging client 20, the messaging client 26, and the message server 172, according to the present invention. In accordance with the present invention, as illustrated in FIG. 21, a second account user, such as the account user 30, logs onto the messaging client 26 and sends a notification signal 388 to the message server 172. For example, the messaging client 26 establishes the communication connection 28. The notification signal 388 for example, includes the connection information (i.e.: IP address and number of the port assigned to the messaging client) of the messaging client 26. Preferably, the notification signal 388 further includes the second account identifier of the second account user. Similarly, the first account user 29 logs onto the first messaging client 14 and sends a notification signal 386 to the message server 172. For example, the first messaging client 14 establishes the first communication connection 16. The notification signal 386 for example, includes the connection information (i.e.: IP address and number of the port assigned to the messaging client) of the first messaging client 14. Preferably, the notification signal 386 also includes the first account identifier of the first account user 29. It will be appreciated by one of ordinary skill in the art that alternatively, the notification signals 386 and 388 can be sent directly to one or more of the plurality of messaging clients 12. In response to receiving the notification signal 386 from the messaging client 26, and receiving the notification signal 388 from the first messaging client 14, the message server 172 sends a client availability signal 390 to the messaging client 26. The client availability signal 390 informs the second account user via the messaging client 26 that the first account user 29 is available for real time electronic communications such as participation in one or more messaging sessions. Similarly, in response to receiving the notification signal 386 from the messaging client 26, and receiving the notification signal 388 from the first messaging client 14, the message server 172 sends a client availability signal 392 to the first messaging client 14. The client availability signal 392 informs the first account user 29 via the first messaging client 14 that the second account user is available for real time electronic communications such as participation in one or more messaging sessions. Next, the first account user 29 initiates the messaging session 40 with the second account user by sending a session message 424 to the message server 172. The message server 172, in response to receiving the session message 424 sends a messaging session participation request 426 to the second account user via the messaging client 26. The messaging client 26 asks the second account user if he/she wants to participate in the messaging session 40 with the first account user 29. When the second account user does not accept the messaging session participation request 426, the process stops. (not shown) When the second account user does accept the messaging session participation request 426, the messaging client 26 sends a messaging session participation acceptance signal 428 to the message server 172. The message server 172, in response to receiving the messaging session participation acceptance signal 428, sends a session message signal 396 containing substantially the same message information as the session message 424 to the second account user via the messaging client 26. In response to receiving the session message signal 396, a window is created on the display of the messaging device in which the messaging client 26 operates and the session message 46, preferably along with the first account identifier of the first account user 29, is displayed on the created window. Next, the second account user via the messaging client 26 sends a response message 398 to the message server 172. The message server 172, acting as a store and forward device, sends a response message signal 400 to the first account user 29 via the first messaging client 14 containing substantially the same message information as the response message 398. In response to receiving the response message signal 400, the open display window is updated on the display of the messaging device in which the first messaging client 14 operates and the session message, preferably along with the second account identifier of the second account user, is displayed. Although one session message 396 and one response message 398 is illustrated by way of example in FIG. 21, it will be appreciated by one of ordinary skill in the art that the messaging session 40 between the first account user's first messaging client 14 and the second account user's messaging client 26 can include a plurality of session messages and a plurality of response messages. Further, although the interaction of two account users and two messaging clients is illustrated by way of example in FIG. 21, it will be appreciated by one of ordinary skill in the art that the messaging session can include a plurality of messaging clients and an associated plurality of account users.

According to the present invention, an account user can choose to initiate a data transfer. As illustrated in FIG. 21, the first account user 29 via the second messaging client 20 sends a transfer request signal 430 to the first account user's first messaging client 14. In response, the first messaging client 14 sends a connection discovery and verification signal 432 to the second messaging client 20. The second messaging client 20 then sends an acknowledgement signal 434 to the first messaging client 14. The acknowledgement signal 434 preferably includes verification data in which the first messaging client 14 can verify the validity of the second messaging client 20. The first messaging client 14 then sends a data signal 436 to the second messaging client 20. In a preferred embodiment, the second messaging client 20 includes session transfer capabilities. Alternatively, the messaging device in which the second messaging client 20 operates includes the data transfer application 83. The first account user 29 launches the data transfer application 83 or alternatively the data transfer capabilities of the second messaging client 20, and utilizes the data transfer application 83 and/or the second messaging client 20 to achieve the transfer of at least a portion of the first client data 17 including the plurality of session data 36 from the first messaging client 14. The data transfer application 83 stores first client data received including the plurality of session data 36 for the messaging session 40 in the memory of the messaging device and launches the second messaging client 20 if it is not already active. The messaging device in which the second messaging client 20 operates displays the session history 45 for access and use by the first account user 29 on the messaging device in which the second messaging client 20 operates. It will be appreciated by one of ordinary skill in the art that the session data signal 436 can include the plurality of session data 36 for one messaging session or for a plurality of messaging sessions, or can include the first client data 17 or the client data portion 18 of the first client data 17 for the first messaging client 14. Similarly the messaging device in which the second messaging client 20 operates can store one messaging session or a plurality of messaging sessions, the first client data 17 or the client data portion 18 of the first client data 17 in its memory in response to receiving the session data signal 436.

The messaging session 40 continues between the first account user 29 and the second account user through the second messaging client 20 and the messaging client 26 as illustrated by the plurality of session messages 412 to 422. The messaging session 40 continues seamlessly without the second account user being necessarily aware of the transfer of the portion of the first client data 17 including the plurality of session data 36 from the first messaging client 14 to the second messaging client 20. It will be appreciated by one of ordinary skill in the art that although only a second account user is shown in FIG. 21 by way of example, the messaging session 40 can continue seamlessly between a plurality of account users and associated plurality of messaging clients.

Preferably, the first messaging client 14 is disconnected from the messaging session 40 upon completion of the data transfer. (not shown) It will be appreciated by one of ordinary skill in the art that the first messaging client 14 can be automatically disconnected from the messaging session 40 or alternatively the first messaging client 14 can be disconnected manually by the first account user 29. Similarly, it will be appreciated by one of ordinary skill in the art the first messaging client 14 can continue to be active in the messaging session 40 along with the second messaging client 20. (not shown)

FIG. 22 is a signaling flow diagram illustrating the interaction between the elements of the messaging communication system 10, 170, according to the present invention. Specifically, FIG. 22 illustrates the interaction between the first messaging client 14, the second messaging client 20, the messaging client 26, and the message server 172. In accordance with the present invention, as illustrated in FIG. 22, a second account user, such as the account user 30, logs onto the messaging client 26 and sends a notification signal 388 to the message server 172. For example, the messaging client 26 establishes the communication connection 28. The notification signal 388 for example, includes the connection information (i.e.: IP address and number of the port assigned to the messaging client) of the messaging client 26. Preferably, the notification signal 388 further includes the second account identifier of the second account user. Similarly, the first account user 29 logs onto the first messaging client 14 and sends a notification signal 386 to the message server 172. For example, the first messaging client 14 establishes the first communication connection 16. The notification signal 386 for example, includes the connection information (i.e.: IP address and number of the port assigned to the messaging client) of the first messaging client 14. Preferably, the notification signal 386 also includes the first account identifier of the first account user 29. It will be appreciated by one of ordinary skill in the art that alternatively, the notification signals 386 and 388 can be sent directly to one or more of the plurality of messaging clients 12. In response to receiving the notification signal 386 from the messaging client 26, and receiving the notification signal 388 from the first messaging client 14, the message server 172 sends a client availability signal 390 to the messaging client 26. The client availability signal 390 informs the second account user via the messaging client 26 that the first account user 29 is available for real time electronic communications such as participation in one or more of the plurality of messaging sessions 24. Similarly, in response to receiving the notification signal 386 from the messaging client 26, and receiving the notification signal 388 from the first messaging client 14, the message server 172 sends a client availability signal 392 to the first messaging client 14. The client availability signal 392 informs the first account user 29 via the first messaging client 14 that the second account user is available for real time electronic communications such as participation in one or more of the plurality of messaging sessions 24. Next, the first account user 29 initiates the messaging session 40 with the second account user by sending a session message 424 to the message server 172. The message server 172, in response to receiving the real time electronic message 424 sends a messaging session participation request 426 to the second account user via the messaging client 26. The messaging client 26 asks the second account user if he/she wants to participate in the messaging session 40 with the first account user 29. When the second account user does not accept the messaging session participation request 426, the process stops. (not shown) When the second account user does accept the messaging session participation request 426, the messaging client 26 sends a messaging session participation acceptance signal 428 to the message server 172. The message server 172, in response to receiving the messaging session participation acceptance signal 428, sends a session message signal 396 containing substantially the same message information as the session message 424 to the second account user via the messaging client 26. In response to receiving the session message signal 396, a window is created on the display of the messaging device in which the messaging client 26 operates and the session message 46, preferably along with the first account identifier of the first account user 29, is displayed. Next, the second account user via the messaging client 26 sends a response message 398 to the message server 172. The message server 172, acting as a store and forward device, sends a response message signal 400 to the first account user 29 via the first messaging client 14 containing substantially the same message information as the response message 398. In response to receiving the response message signal 400, the open display window is updated on the display of the messaging device in which the first messaging client 14 operates and the session message, preferably along with the second account identifier of the second account user, is displayed. Although one session message 396 and one response message 398 is illustrated by way of example in FIG. 22, it will be appreciated by one of ordinary skill in the art that the messaging session 40 between the first account user's first messaging client 14 and the second account user's messaging client 26 can include a plurality of session messages and a plurality of response messages. Further, although the interaction of two account users and two messaging clients is illustrated by way of example in FIG. 22, it will be appreciated by one of ordinary skill in the art that the messaging session 40 can include a plurality of messaging clients and an associated plurality of account users.

According to the present invention, an account user can choose to initiate a data transfer. As illustrated in FIG. 22, the first account user 29 via the second messaging client 20 sends a transfer request signal 430 to the first account user's first messaging client 14. In response, the first messaging client 14 sends a connection discovery and verification signal 432 to the second messaging client 20. The second messaging client 20 then sends an acknowledgement signal 434 to the first messaging client 14. The acknowledgement signal 434 preferably includes verification data in which the first messaging client 14 can verify that the validity of the second messaging client 20. In response to receiving the acknowledgement signal 434, the first messaging client 14 sends a request for a key 438 to the message server 172. Next, the message server 172 sends a key signal 440 to the first messaging client 14. The first messaging client 14 then sends the data and key signal 442 to the second messaging client 20. The key preferably includes a code by which the second messaging client 20 can access the messaging session 40. The second messaging client 20 stores the transferred portion of the first client data 17 including the plurality of session data 36 and the key for the messaging session 40 in the memory of the messaging device in which the second messaging client 20 operates, and displays the session history 45 for access and use by the first account user 29 on the display of the messaging client in which the second messaging client 20 operates. It will be appreciated by one of ordinary skill in the art that the data and key signal 442 can include session data for one messaging session or for a plurality of messaging sessions, the first client data 17 or a portion of the first client data 17; and similarly that the second messaging client 20 can store one messaging session or a plurality of messaging sessions, the first client data 17 or a portion of the first client data 17 in memory in response to receiving the data and key signal 442. The second messaging client 20 then launches the data transfer application 83 or alternatively runs the data transfer software contained within the second messaging client 20. Further, the second messaging client 20 can cause the messaging device in which the second messaging client 20 operates to display the session history 45 received from the first messaging client 14 within the data and key signal 442 for viewing by the first account user 29. Next, the second messaging client 20 sends a request for connection signal 444 to the message server 172. In response, the message server 172 sends a security challenge signal 446 to the second messaging client 20. The second messaging client 20 responds to the security challenge signal 446 with a security response signal 448 which may be calculated from the security challenge signal and the key to the message server 172. Then the message server 172 sends an acknowledgement of transfer complete signal 450 to the second messaging client 20. The messaging session 40 has now been transferred from the first messaging client 14 to the second messaging client 20. Preferably, the second messaging client 20 also sends an acknowledgement of transfer to the message server 172. (not shown)

The messaging session 40 continues between the first account user 29 and the second account user through the second messaging client 20 and the messaging client 26 as illustrated by the plurality of session messages 412 to 422. The messaging session 40 continues seamlessly without the second account user being necessarily aware of the transfer of the portion of the first client data 17 including the plurality of session data 36 from the first messaging client 14 to the second messaging client 20. It will be appreciated by one of ordinary skill in the art that although only a second account user is shown in FIG. 22 by way of example, the messaging session 40 can continue seamlessly between a plurality of account users and associated plurality of messaging clients.

Preferably, the first messaging client 14 is disconnected from the messaging session 40 upon completion of the data transfer. (not shown) It will be appreciated by one of ordinary skill in the art that the first messaging client 14 can be automatically disconnected from the messaging session 40 or alternatively the first messaging client 14 can be disconnected manually by the first account user 29. Similarly, it will be appreciated by one of ordinary skill in the art that the first messaging client 14 can continue to be active in the messaging session 40 along with the second messaging client 20. (not shown)

FIG. 23 is a signaling flow diagram illustrating the interaction between the elements of the messaging communication system 10,170, according to the present invention. Specifically, FIG. 23 illustrates the interaction between the first messaging client 14, the second messaging client 20, the messaging client 26, and the message server 172. In accordance with the present invention, as illustrated in FIG. 23, a second account user, such as the account user 30, logs onto the messaging client 26 and sends a notification signal 388 to the message server 172. For example, the messaging client 26 establishes the communication connection 28. The notification signal 388 for example, includes the connection information (i.e.: IP address and number of the port assigned to the messaging client) of the messaging client 26. Preferably, the notification signal 388 further includes the second account identifier of the second account user. Similarly, a first account user 29 logs onto the first messaging client 14 and sends a notification signal 386 to the message server 172. For example, the first messaging client 14 establishes the first communication connection 16. The notification signal 386 for example, includes the connection information (i.e.: IP address and number of the port assigned to the messaging client) of the first messaging client 14. Preferably, the notification signal 386 also includes the first account identifier of the first account user 29. It will be appreciated by one of ordinary skill in the art that alternatively, the notification signals 386 and 388 can be sent directly to one or more of the plurality of messaging clients 12. In response to receiving the notification signal 386 from the messaging client 26, and receiving the notification signal 388 from the first messaging client 14, the message server 172 sends a client availability signal 390 to the messaging client 26. The client availability signal 390 informs the second account user via the messaging client 26 that the first account user 29 is available for real time electronic communications such as for participation in one or more of the plurality of messaging sessions 24. Similarly, in response to receiving the notification signal 386 from the messaging client 26, and receiving the notification signal 388 from the first messaging client 14, the message server 172 sends a client availability signal 392 to the first messaging client 14. The client availability signal 392 informs the first account user 29 via the first messaging client 14 that the second account user is available for real time electronic communications such as participation in one or more of the plurality of messaging sessions 24. Next, the first account user 29 initiates the messaging session 40 with the second account user by sending a session message 424 to the message server 172. The message server 172, in response to receiving the session message 424 sends a messaging session participation request 426 to the second account user via the messaging client 26. The messaging client 26 asks the second account user if he/she wants to participate in the messaging session 40 with the first account user 29. When the second account user does not accept the messaging session participation request 426, the process stops. (not shown) When the second account user does accept the messaging session participation request 426, the messaging client 26 sends a messaging session participation acceptance signal 428 to the message server 172. The message server 172, in response to receiving the messaging session participation acceptance signal 428, sends a session message signal 396 containing substantially the same message information as the session message 424 to the second account user via the messaging client 26. In response to receiving the session message signal 396, a window is created on the display of the messaging device in which the messaging client 26 operates and the session message, preferably along with the first account identifier of the first account user 29, is displayed. Next, the second account user via the messaging client 26 sends a response message 398 to the message server 172. The message server 172, acting as a store and forward device, sends a response message signal 400 to the first account user 29 via the first messaging client 14 containing substantially the same message information as the response message 398. In response to receiving the response message signal 400, the open window is updated on the display of the messaging device in which the first messaging client 14 operates and the session message, preferably along with the second account identifier of the second account user, is displayed. Although one session message 396 and one response message 398 is illustrated by way of example in FIG. 23, it will be appreciated by one of ordinary skill in the art that the messaging session 40 between the first account user's first messaging client 14 and the second account user's messaging client 26 can include a plurality of session messages and a plurality of response messages. Further, although the interaction of two account users and two messaging clients is illustrated by way of example in FIG. 23, it will be appreciated by one of ordinary skill in the art that the messaging session 40 can include a plurality of messaging clients and an associated plurality of account users.

According to the present invention, an account user can choose to launch data transfer software. As illustrated in FIG. 23, the first account user 29 launches the data transfer software within the second messaging client 20 or alternatively the data transfer application 83. Upon launching the data transfer application 83 or alternatively the data transfer software within the second messaging client 20, the second messaging client 20 sends a notification of availability signal 452 to the message server 172. In response, the message server 172 sends an availability signal 454 to the first messaging client 14 and an availability signal 456 to the messaging client 26. Preferably the signals 452 and 454 include identification information for the second messaging client 20 such as the second client identifier 21. As illustrated, after receiving the availability notification signal 454, the first messaging client 14 sends a data signal 458 to the second messaging client 20. The second messaging client 20 stores the received portion of the first client data 17 including the plurality of session data 36 for the messaging session 40 in the memory of its associated messaging device and causes the session history 45 to be displayed on the display of the messaging device in which the second messaging client 20 operates for access and use by the first account user 29. It will be appreciated by one of ordinary skill in the art that the data signal 458 can include session data for one messaging session or for a plurality of messaging sessions, the first client data 17, or a portion of the first client data 17; and similarly that the second messaging client 20 can store one messaging session or a plurality of messaging sessions, the first client data 17, or a portion of the first client data 17 in its memory in response to receiving the session data signal 458.

The messaging session 40 continues between the first account user 29 and the second account user through the second messaging client 20 and the messaging client 26 as illustrated by the plurality of session messages 412 to 422. The messaging session 40 continues seamlessly. It will be appreciated by one of ordinary skill in the art that although only a second account user is shown in FIG. 23 by way of example, the messaging session 40 can continue seamlessly between a plurality of account users and associated plurality of messaging clients.

Preferably, the first messaging client 14 is disconnected from the messaging session 40 upon completion of the data transfer. (not shown) It will be appreciated by one of ordinary skill in the art that the first messaging client 14 can be automatically disconnected from the messaging session 40 or alternatively the first messaging client 14 can be disconnected manually by the first account user 29. Similarly, it will be appreciated by one of ordinary skill in the art the first messaging client 14 can continue to be active in the messaging session 40 along with the second messaging client 20. (not shown)

FIG. 24 is a signaling flow diagram illustrating the interaction between the elements of the messaging communication system 10, 170, according to the present invention. Specifically, FIG. 24 illustrates the interaction between the first messaging client 14, the second messaging client 20, the messaging client 26, and the message server 172. In accordance with the present invention, as illustrated in FIG. 24, a second account user, such as the account user 30, logs onto the messaging client 26 and sends a notification signal 388 to the message server 172. The notification signal 388 for example, includes the connection information (i.e.: IP address and number of the port assigned to the messaging client) of the messaging client 26. Preferably, the notification signal 388 further includes the second account identifier of the second account user. Similarly, a first account user 29 logs onto the first messaging client 14 and sends a notification signal 386 to the message server 172. The notification signal 386 for example, includes the connection information (i.e.: IP address and number of the port assigned to the messaging client) of the first messaging client 14. Preferably, the notification signal 386 also includes the first account identifier of the first account user 29. It will be appreciated by one of ordinary skill in the art that alternatively, the notification signals 386 and 388 can be sent directly to one or more of the plurality of messaging clients 12. In response to receiving the notification signal 386 from the messaging client 26, and receiving the notification signal 388 from the first messaging client 14, the message server 172 sends a client availability signal 390 to the messaging client 26. The client availability signal 390 informs the second account user via the messaging client 26 that the first account user 29 is available for real time electronic communications such as participation in one or more of the plurality of messaging sessions 24. Similarly, in response to receiving the notification signal 386 from the messaging client 26, and receiving the notification signal 388 from the first messaging client 14, the message server 172 sends a client availability signal 392 to the first messaging client 14. The client availability signal 392 informs the first account user 29 via the first messaging client 14 that the second account user is available for real time electronic communications such as participation in one or more of the plurality of messaging sessions 24. Next, the first account user 29 initiates the messaging session 40 with the second account user by sending a session message 424 to the message server 172. The message server 172, in response to receiving the session message 424 sends a messaging session participation request 426 to the second account user via the messaging client 26. The messaging client 26 asks the second account user if he/she wants to participate in the messaging session 40 with the first account user 29. When the second account user does not accept the messaging session participation request 426, the process stops. (not shown) When the second account user does accept the messaging session participation request 426, the messaging client 26 sends a messaging session participation acceptance signal 428 to the message server 172. The message server 172, in response to receiving the messaging session participation acceptance signal 428, sends a session message signal 396 containing substantially the same message information as the session message 424 to the second account user via the messaging client 26. In response to receiving the real time electronic message signal 396, a window is created on the display of the messaging device in which the messaging client 26 operates and the session message 46, preferably along with the first account identifier of the first account user 29, is displayed. Next, the second account user via the messaging client 26 sends a response message 398 to the message server 172. The message server 172, acting as a store and forward device, sends a response message signal 400 to the first account user 29 via the first messaging client 14 containing substantially the same message information as the response message 398. In response to receiving the response message signal 400, the open window is updated on the display of the messaging device in which the first messaging client 14 operates and the session message, preferably along with the second account identifier of the second account user, is displayed. Although one session message 396 and one response message 398 is illustrated by way of example in FIG. 23, it will be appreciated by one of ordinary skill in the art that the messaging session 40 between the first account user's first messaging client 14 and the second account user's messaging client 26 can include a plurality of session messages and a plurality of response messages. Further, although the interaction of two account users and two messaging clients is illustrated by way of example in FIG. 23, it will be appreciated by one of ordinary skill in the art that the messaging session 40 can include a plurality of messaging clients and an associated plurality of account users.

According to the present invention, an account user can choose to launch data transfer software. As illustrated in FIG. 24, the first account user 29 launches the transfer software within the second messaging client 20 or alternatively the data transfer application 83. Upon launching the data transfer application 83 or alternatively the transfer software within the second messaging client 20, the second messaging client 20 sends a notification of availability signal 452 to the message server 172. In response, the message server 172 sends an availability signal 454 to the first messaging client 14 and an availability signal 456 to the messaging client 26. Preferably the signals 452 and 454 include identification information for the second messaging client 20 such as the second messaging client identification 382. As illustrated, after receiving the availability signal 454, the first messaging client 14 sends a data signal 460 to the message server 172. In response, the message server 172 sends a data signal 462 to the second messaging client 20. The second messaging client 20 stores the received portion of the first client data 17 including the plurality of session data 36 for the messaging session 40 in memory and causes the session history 45 to be displayed on the display of the messaging device in which the second messaging client 20 operates for access and use by the first account user 29 on the second messaging client 20. It will be appreciated by one of ordinary skill in the art that the data signals 460 and 462 can include session data for one messaging session or for a plurality of messaging sessions, the first client data 17, or a portion of the first client data 17; and similarly that the second messaging client 20 can store one messaging session or a plurality of messaging sessions, the first client data 17, or a portion of the first client data 17 in memory in response to receiving the data signals 460 and 462.

The messaging session 40 continues between the first account user 29 and the second account user through the second messaging client 20 and the messaging client 26 as illustrated by the plurality of session messages 412 to 422. It will be appreciated by one of ordinary skill in the art that although only the first account user 29 and a second account user are shown in FIG. 23 by way of example, the messaging session 40 can continue seamlessly between a plurality of account users and associated plurality of messaging clients.

Preferably, the first messaging client 14 is disconnected from the messaging session 40 upon completion of the data transfer. (not shown) It will be appreciated by one of ordinary skill in the art that the first messaging client 14 can be automatically disconnected from the messaging session 40 or alternatively the first messaging client 14 can be disconnected manually by the first account user 29. Similarly, it will be appreciated by one of ordinary skill in the art the first messaging client 14 can continue to be active in the messaging session 40 along with the second messaging client 20. (not shown)

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. Within a messaging communication system having a message server for managing the communication of a plurality of messages among a plurality of messaging clients, a method for providing continuity between the plurality of messaging clients comprising:

establishing a first communication connection including a plurality of client data between a first messaging client and the message server;

transferring the plurality of client data from the first messaging client to a second messaging client; and establishing a second communication connection including the plurality of client data between the second messaging client and the message server.

2. A method for providing continuity between a plurality of messaging clients as recited in claim 1 wherein the first messaging client further includes at least one user preference, the method further comprising:

transferring the at least one user preference from the first messaging client to the second messaging client; and operating within the second communication connection by the second messaging client using the at least one user preference.

3. A method for providing continuity between a plurality of messaging clients as recited in claim 1 wherein the first messaging client operates within a first messaging device, and further wherein the first messaging device includes a user interface, the method further comprising prior to the transferring step:

requesting the transfer of the plurality of client data by a user input to the user interface of the first messaging device.

4. A method for providing continuity between a plurality of messaging clients as recited in claim 1 wherein the second messaging client operates within a second messaging device, and further wherein the second messaging device includes a user interface, the method further comprising prior to the transferring step:

requesting the transfer of the plurality of client data by a user input to the user interface of the second messaging device.

5. A method for providing continuity between a plurality of messaging clients as recited in claim 1 wherein the second messaging client operates within a mobile device, wherein in the transferring step the transfer of the plurality of client data is in response to a movement of the mobile device.

6. A method for providing continuity between a plurality of messaging clients as recited in claim 1 wherein in the transferring step the transfer of the plurality of client data is in response to an activation of the second messaging client.

7. A method for providing continuity between a plurality of messaging clients as recited in claim 1 wherein the second messaging client operates within a second messaging device, wherein the second messaging device includes a data transfer application, and further wherein in the transferring step the transfer of the plurality of client data is in response to an activation of the data transfer application.

8. A method for providing continuity between a plurality of messaging clients as recited in claim 1 wherein the first messaging client operates within a first messaging device, wherein the first messaging device includes a data transfer application, and further wherein in the transferring step the transfer of the plurality of client data is in response to an activation of the data transfer application.

9. A method for providing continuity between a plurality of messaging clients as recited in claim 1 wherein in the transferring step the transfer of the plurality of client data is in response to the second messaging client establishing the second communication connection.

10. A method for providing continuity between a plurality of messaging clients as recited in claim 1 wherein the second messaging client operates within a second messaging device, and further wherein in the transferring step the transfer of the plurality of client data is in response to activating the second messaging device.

11. A method for providing continuity between a plurality of messaging clients as recited in claim 1 further comprising:
disconnecting the first messaging client from the first communication connection prior to the transferring step.

12. A method for providing continuity between a plurality of messaging clients as recited in claim 1 further comprising:
disconnecting the first messaging client from the first communication connection after the transferring step.

13. A method for providing continuity between a plurality of messaging clients as recited in claim 1, wherein the plurality of client data includes at least one client data portion, and further wherein the transferring step comprises transferring the at least one client data portion.

14. A method for providing continuity between a plurality of messaging clients as recited in claim 13 further comprising prior to the transferring step, sending from the second messaging client to the first messaging client a client data requirement, wherein the client data portion is determined using the client data requirement.

15. Within a messaging communication system having a plurality of messaging clients and a message server, a method for providing continuity between the plurality of messaging clients comprising:
establishing for a first messaging client a first communication connection with the message server including a plurality of client data;
establishing for a second messaging client a second communication connection with the message server; and
transferring the plurality of client data from the first messaging client to the second messaging client in response to the second communication connection.

16. Within a messaging communication system having a plurality of messaging clients and a message server, a method for providing continuity between the plurality of messaging clients comprising:
establishing for a first messaging client a first communication connection with the message server including a plurality of client data, wherein the first messaging client includes a first account identifier;
providing the first account identifier for the first messaging client to the messaging communication system;
transferring the plurality of client data from the first messaging client to a second messaging client, wherein the second messaging client includes a second account identifier;
providing the second account identifier from the second messaging client to the messaging communication system; and
establishing for the second messaging client a second communication connection with the message server including the plurality of client data using the second account identifier.

17. A method for providing continuity between a plurality of messaging clients as recited in claim 1 further comprising:
authenticating an account user by the first messaging client using an authentication key prior to the transferring step,
transferring the authentication key from the first messaging client to the second messaging client; and
authenticating the account user by the second messaging client using the authentication key.

18. A method for providing continuity between a plurality of messaging clients as recited in claim 1 wherein the plurality of client data includes a plurality of contact data, and further wherein the plurality of contact data comprises at least one account identifier.

19. A method for providing continuity between a plurality of messaging clients as recited in claim 18 wherein the plurality of contact data further comprises a contact information for the at least one account identifier.

20. A method for providing continuity between a plurality of messaging clients as recited in claim 1 wherein the plurality of client data includes at least one user preference.

21. A method for providing continuity between a plurality of messaging clients as recited in claim 1 wherein the message server includes a sewer identity, wherein the plurality of client data includes the server identity, and further wherein the second communication connection is established using the server identity received within the plurality of client data.

22. Within a messaging communication system having a plurality of messaging clients, a method for providing continuity between the plurality of messaging clients comprising:
establishing a first communication connection for a first messaging client;
establishing at least one messaging session having a session identifier between the first messaging client and at least one other messaging client of the plurality of messaging clients;
transferring a plurality of session data for the first session connection including the session identifier from the first messaging client to a second messaging client;
establishing a second communication connection including the plurality of session data for the second messaging client; and
participating in the at least one messaging session in the second communication connection using the session identifier.

23. A method for providing continuity between a plurality of messaging clients as recited in claim 22 further comprising:
sending a notification of session data transfer to at least one other messaging client participating in the at least one messaging session.

24. A method for providing continuity between a plurality of messaging clients as recited in claim 23 wherein the notification includes a client profile of the second messaging client.

25. A method for providing continuity between a plurality of messaging clients as recited in claim 23 wherein the notification is sent from the first messaging client.

26. A method for providing continuity between a plurality of messaging clients as recited in claim 23 wherein the notification is sent from the second messaging client.

27. A method for providing continuity between a plurality of messaging clients as recited in claim 23 wherein the messaging communication system further includes a messaging server, and further wherein the notification is sent from the messaging server.

28. A method for providing continuity between a plurality of messaging clients as recited in claim 23 further comprising:
informing an account user of the session data transfer by the at least one other messaging client in response to receiving the notification.

29. A method for providing continuity between a plurality of messaging clients as recited in claim 22 wherein the messaging session includes a session history having at least one session portion, and further wherein the plurality of session data further includes the session portion.

30. A method for providing continuity between a plurality of messaging clients as recited in claim 29 further comprising prior to the transferring step, sending from the second messaging client to the first messaging client a session data requirement, wherein the session portion is determined using the session data requirement.

31. A method for providing continuity between a plurality of messaging clients as recited in claim 22 wherein the plurality of session data further includes a session priority indicator, wherein the session priority indicator determines a priority of the messaging session within the messaging communication system.

32. A method for providing continuity between a plurality of messaging clients as recited in claim 22 wherein the plurality of session data further includes a session priority indicator, wherein the session priority indicator determines a priority of the messaging session within the second messaging client.

33. A method for providing continuity between a plurality of messaging clients as recited in claim 22 wherein the plurality of session data includes at least one user preference.

34. A method for providing continuity between a plurality of messaging clients as recited in claim 22 further comprising:
sending a notification of session data transfer, wherein the notification includes a client profile for the second messaging client; and
sending a plurality of content to the second messaging client using the client profile.

35. A method for providing continuity between a plurality of messaging clients as recited in claim 34 wherein the notification is sent from the first messaging client and the plurality of content is sent from at least one other messaging client.

36. Within a messaging communication system having a plurality of messaging clients, a method for providing continuity between the plurality of messaging clients comprising:
establishing a first communication connection for a first messaging client;
establishing a plurality of messaging sessions each having a session identifier between the first messaging client and at least one of the plurality of messaging clients;
transferring a plurality of client data for the first communication connection including at least one session identifier for at least one messaging session from the first messaging client to a second messaging client;
establishing a second communication connection including the plurality of client data for the second messaging client; and
participating in the at least one messaging session in the second communication connection using the session identifier.

37. A method for providing continuity between a plurality of messaging clients as recited in claim 36 further comprising:
sending a notification of data transfer to at least one of the plurality of messaging clients participating in the at least one messaging session.

38. A method for providing continuity between a plurality of messaging clients as recited in claim 37 wherein the notification is sent from the first messaging client.

39. A method for providing continuity between a plurality of messaging clients as recited in claim 37 wherein the notification is sent from the second messaging client.

40. A method for providing continuity between a plurality of messaging clients as recited in claim 37 wherein the notification includes a client profile of the second messaging client.

41. A method for providing continuity between a plurality of messaging clients as recited in claim 36 further comprising:
sending a notification of data transfer, wherein the notification includes a client profile for the second messaging client; and
sending a plurality of content to the second messaging client using the client profile.

42. A method for providing continuity between a plurality of messaging clients as recited in claim 36 wherein the messaging session includes a session history having at least one session portion, and further wherein the plurality of client data further includes the session portion.

43. A method for providing continuity between a plurality of messaging clients as recited in claim 36 further comprising prior to the transferring step, sending from the second messaging client to the first messaging client a client data requirement, wherein the session portion is determined using the client data requirement.

44. A method for providing continuity between a plurality of messaging clients as recited in claim 36 wherein the plurality of client data further includes a session priority indicator, wherein the session priority indicator determines the priority of the messaging session within the messaging communication system.

45. A method for providing continuity between a plurality of messaging clients as recited in claim 36 wherein the plurality of client data includes at least one user preference.

46. Within a messaging communication system having a plurality of messaging clients, a method for providing continuity between the plurality of messaging clients comprising:
establishing a first communication connection for a first messaging client;
establishing at least one messaging session having a session identifier between the first messaging client and at least one other messaging client of the plurality of messaging clients;
transferring a plurality of client data for the first communication connection including the session identifier from the first messaging client to a second messaging client;
establishing a second communication connection including the plurality of client data for the second messaging client; and
adding the second messaging client to the at least one messaging session using the session identifier.

47. Within a messaging communication system having a message server for managing a plurality of multiple user messaging sessions, wherein the multiple user messaging sessions comprise communication of a plurality of session messages among a plurality of messaging clients, a method for providing continuity between the plurality of messaging clients comprising:
establishing a first communication connection for a first messaging client within a multiple user messaging session of the message server;
transferring a plurality of client data for the first communication connection from the first messaging client to a second messaging client;

sending a data transfer message to the message server wherein the data transfer message includes a session reservation for the second messaging client; and establishing a second communication connection for the second messaging client within the multiple user messaging session of the message server using the plurality of client data.

48. A method for providing continuity between a plurality of messaging clients as recited in claim 47 wherein the first messaging client has a first client identifier, wherein the multiple user messaging session has a session identifier, wherein the second messaging client has a second client identifier, wherein the plurality of client data includes the session identifier, and further wherein the data transfer message includes the session identifier, the first client identifier, and the second client identifier.

49. A method for providing continuity between a plurality of messaging clients as recited in claim 48, wherein the multiple user messaging session includes at least one other messaging client, the method further comprising:

sending a notification of data transfer to the at least one other messaging client.

50. A plurality of messaging clients within a messaging communication system for providing continuity between the plurality of messaging clients comprising:

a first messaging client, for establishing a first communication connection including a plurality of client data with a message server; and a second messaging client for receiving the plurality of client data from the first messaging client and for establishing a second communication connection including the plurality of client data with the message server.

51. A plurality of messaging clients as recited in claim 60 wherein the first messaging client operates within a first messaging device and the second messaging client operates within a second messaging device.

52. A plurality of messaging clients as recited in claim 51 wherein the first messaging device includes:

a memory coupled to the first messaging client for storing the plurality of client data, wherein the first messaging client accesses the plurality of client data from the memory, and further wherein the first messaging client transfers the plurality of client data to the second messaging device.

53. A plurality of messaging clients as recited in claim 51 wherein the first messaging device includes:

a memory coupled to the first messaging client for storing the plurality of client data, wherein the first messaging client accesses the plurality of client data from the memory, and a data transfer application coupled to the first messaging client for transferring the plurality of client data to the second messaging device.

54. A plurality of messaging clients as recited in claim 51 wherein the second messaging device includes:

a memory coupled to the second messaging client, wherein the second messaging client receives the plurality of client data and stores the plurality of client data in the memory.

55. A plurality of messaging clients as recited in claim 51 wherein the second messaging device includes:

data transfer application coupled to the second messaging client for receiving the plurality of client data, wherein the second messaging client processes the received plurality of client data, and a memory coupled to the second messaging client for storing the plurality of client data.

56. A plurality of messaging clients as recited in claim 51 wherein the first messaging device is a fixed device and further wherein the second device is a mobile device.

57. A plurality of messaging clients as recited in claim 51 wherein the first messaging device includes a first memory interconnect for connecting the first messaging device to a memory storage device, wherein the second messaging device includes a second memory interconnect for connecting the second messaging device to the memory storage device, wherein the first messaging device stores the plurality of client data on the memory storage device, and further wherein the second messaging device receives the plurality of client data from the memory storage device connecting to the second memory interconnect.

58. A plurality of messaging clients as recited in claim 57 wherein the first messaging client and the second messaging client operate within a messaging device.

59. A messaging communication system for providing continuity between a plurality of messaging clients comprising:

the plurality of messaging clients including:
a first messaging client,
a second messaging client, and
at least one other messaging client;

a message server for managing the communication of a plurality of session messages among the plurality of messaging clients, wherein the message server is programmed to:

establish a first communication connection for the first messaging client establish at least one messaging session having a session identifier between the first messaging client and the at least one other messaging client, transfer a plurality of client data for the first communication connection including the session identifier from the first messaging client to the second messaging client, establish a second communication connection including the plurality of client data for the second messaging client, and transfer the at least one messaging session from the first messaging client to the second messaging client using the session identifier.

60. A messaging communication system for providing continuity between a plurality of messaging clients as recited in claim 59 wherein the message server includes a server memory, wherein the first messaging client stores the plurality of client data in the server memory, and further wherein the second messaging client retrieves the plurality of client data from the server memory for use in the operation of the second communication connection.

61. A messaging communication system as recited in claim 59 wherein the first messaging client operates within a first messaging device and the second messaging client operates within a second messaging device.

62. A messaging communication system as recited in claim 59 wherein the first messaging client and the second messaging client operate within a messaging device.

63. A messaging communication system as recited in claim 59 wherein the messaging communication system comprises a first messaging system and a second messaging system, wherein the first messaging client functions within the first messaging system, and further wherein the second messaging client functions within the second messaging system.

64. A messaging communication system as recited in claim 63 wherein the first messaging system comprises a wired messaging system and further wherein the second messaging system comprises a wireless messaging system.

65. A messaging communication system as recited in claim 63 wherein the first messaging system comprises a wireless messaging system and further wherein the second messaging system comprises a wired messaging system.

66. A messaging communication system for providing continuity between a plurality of messaging clients comprising:

the plurality of messaging clients including:
  a first messaging client for establishing a first communication connection including a plurality of client data, and
  a second messaging client for establishing a second communication connection including the plurality of client data; and
a server memory coupled to the plurality of messaging clients, wherein the first messaging client stores the plurality of client data in the server memory, and further wherein the second messaging client retrieves the plurality of client data from the server memory for use in the operation of the second communication connection.

67. A messaging communication system as recited in claim 66 wherein the server memory is contained within a message server of the messaging communication system.

* * * * *